US011962384B2

(12) United States Patent
Zhou

(10) Patent No.: US 11,962,384 B2
(45) Date of Patent: Apr. 16, 2024

(54) APPARATUS FOR CORRECTING DEVIATION BETWEEN A PLURALITY OF TRANSMISSION CHANNELS AND WIRELESS COMMUNICATIONS DEVICE

(71) Applicant: Huawei Technologies Co., Ltd., Shenzhen (CN)

(72) Inventor: Mu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 202 days.

(21) Appl. No.: 17/563,703

(22) Filed: Dec. 28, 2021

(65) Prior Publication Data

US 2022/0123814 A1 Apr. 21, 2022

Related U.S. Application Data

(63) Continuation of application No. PCT/CN2019/093899, filed on Jun. 28, 2019.

(51) Int. Cl.
*H04K 1/10* (2006.01)
*H04B 7/06* (2006.01)
*H04B 17/21* (2015.01)
*H04L 27/28* (2006.01)

(52) U.S. Cl.
CPC ......... *H04B 7/0663* (2013.01); *H04B 7/0634* (2013.01); *H04B 17/21* (2015.01)

(58) Field of Classification Search
CPC .... H04B 7/0663; H04B 17/21; H04B 7/0634; H04B 17/12; G01R 29/105; H04L 17/12; G06K 7/10009

USPC ................................. 375/299, 267, 232, 260
See application file for complete search history.

(56) References Cited

U.S. PATENT DOCUMENTS

| 2011/0134001 | A1* | 6/2011 | Sakata | G01R 29/105 343/703 |
| 2012/0028587 | A1* | 2/2012 | Ferguson | H04B 17/12 455/67.14 |
| 2012/0062369 | A1* | 3/2012 | Ishizaki | G06K 7/10009 375/259 |
| 2015/0249563 | A1* | 9/2015 | Luo | H04L 27/36 375/300 |

(Continued)

FOREIGN PATENT DOCUMENTS

| CN | 103229471 A | 7/2013 |
| CN | 203406882 U | 1/2014 |

(Continued)

OTHER PUBLICATIONS

Li Yang, et al., "Fast Field Array Manifold Calibration for GNSS Antenna Arrays," May 2018, 6 pages.

*Primary Examiner* — Phuong Phu
(74) *Attorney, Agent, or Firm* — Conley Rose, P.C.

(57) ABSTRACT

An apparatus includes a first splitter configured to feed a first signal onto a first transmission channel and a second transmission channel, where the first splitter is located in a symmetrical position between the first transmission channel and the second transmission channel, and a vector detection component configured to, when the first splitter feeds the first signal, detect a first signal vector based on a first feedback signal from the first transmission channel, and detect a second signal vector based on a second feedback signal from the second transmission channel.

20 Claims, 40 Drawing Sheets

Top view

PCB

Side view

Chip

AOB

(56) References Cited

U.S. PATENT DOCUMENTS

2019/0028155 A1 1/2019 Hofrichter et al.
2019/0109627 A1 4/2019 Sridharan et al.

FOREIGN PATENT DOCUMENTS

| CN | 104426615 A | 3/2015 |
| CN | 105515686 A | 4/2016 |
| CN | 106450796 A | 2/2017 |
| CN | 106936522 A | 7/2017 |
| CN | 107959533 A | 4/2018 |
| CN | 109245836 A | 1/2019 |
| WO | 2013074189 A1 | 5/2013 |
| WO | 2019039671 A1 | 2/2019 |

* cited by examiner

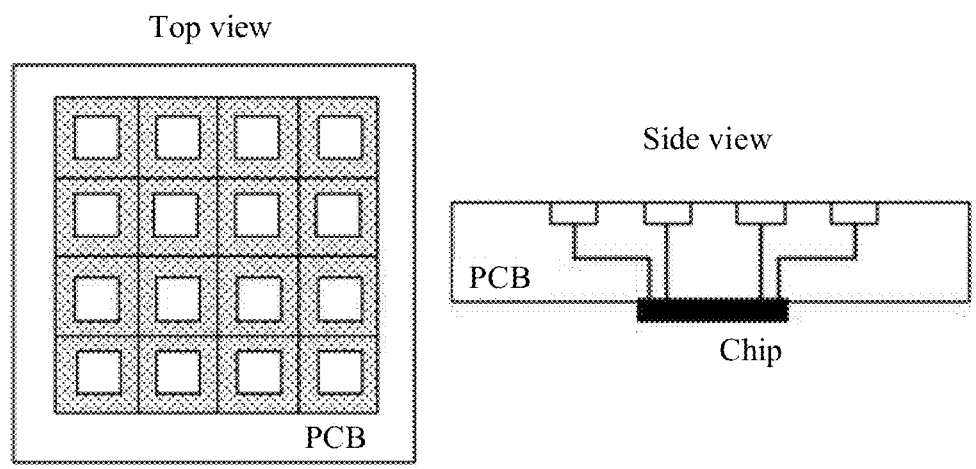
FIG. 1A AOB
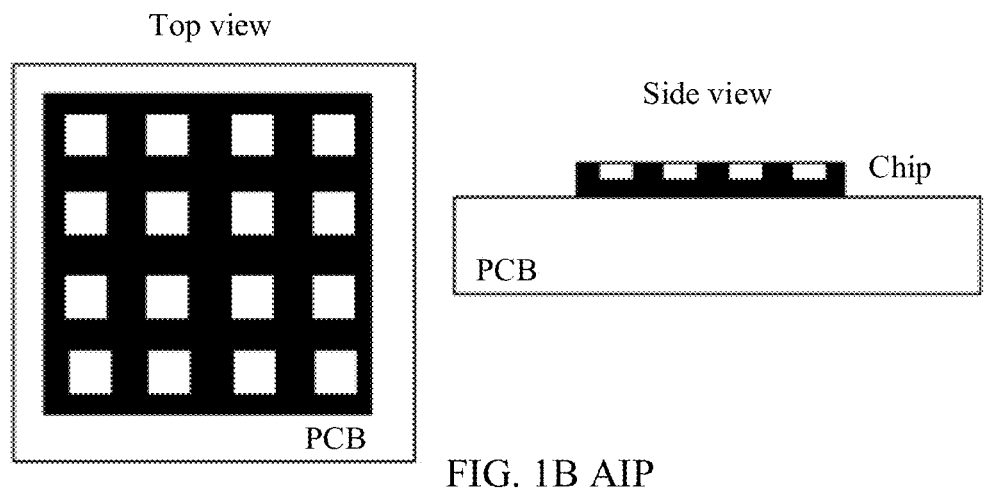
FIG. 1B AIP

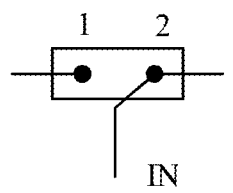 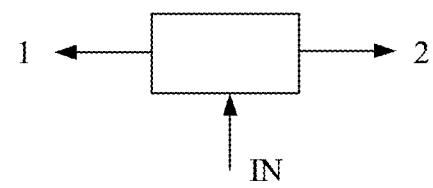
Three-port switch        Three-port balun
FIG. 6

FIG. 13B TRX module of a transmit/receive shared PS

FIG. 13A TRX module of a transmit/receive independent PS

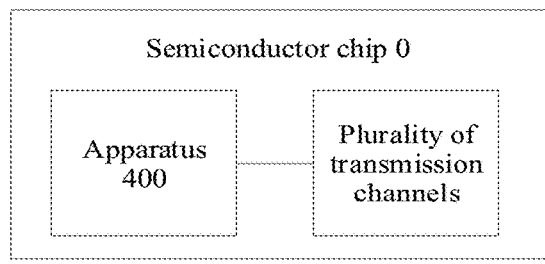
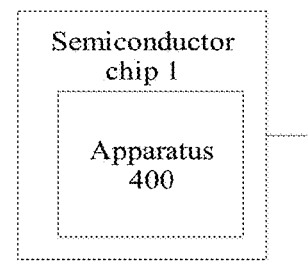
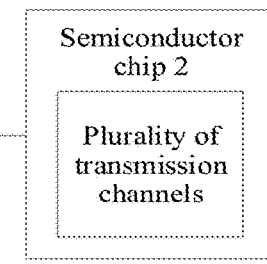
FIG. 17A  FIG. 17B
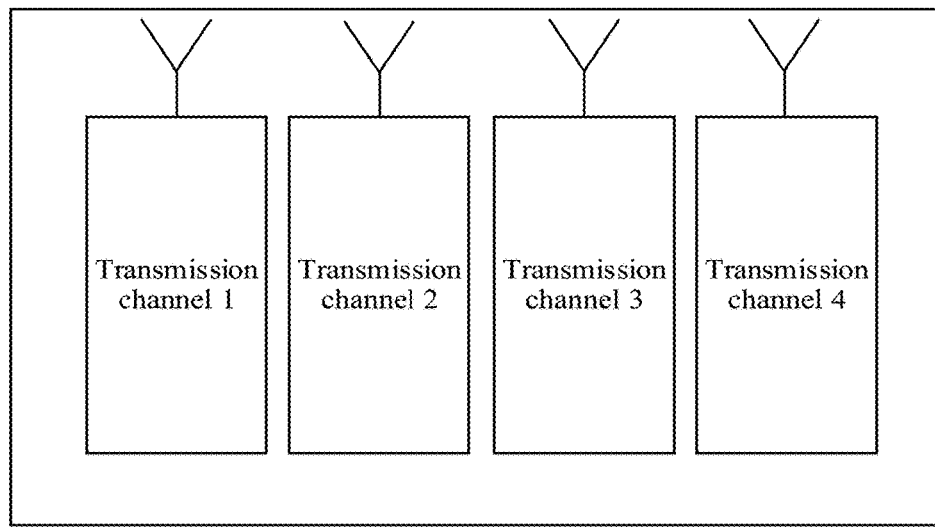
FIG. 18A

APPARATUS FOR CORRECTING DEVIATION BETWEEN A PLURALITY OF TRANSMISSION CHANNELS AND WIRELESS COMMUNICATIONS DEVICE

CROSS-REFERENCE TO RELATED APPLICATIONS

This is a continuation of International Patent Application No. PCT/CN2019/093899 filed on Jun. 28, 2019, the disclosure of which is hereby incorporated by reference in its entirety.

TECHNICAL FIELD

This disclosure relates to the field of communications technologies, and in particular, to an apparatus for correcting a deviation between a plurality of transmission channels and a wireless communications device.

BACKGROUND

A phased array is a phase-controlled electronically scanned array, and is constituted by arranging a large quantity of antenna units. Each antenna unit may be controlled by an independent switch, and a radiation direction of an electromagnetic wave is modulated by controlling an amplitude and a phase of the antenna unit in the array, to synthesize a directional scanning-focused beam.

In a fifth generation (5G) communications system, millimeter waves are used as a signal carrier. Because attenuation of millimeter waves propagated in the atmosphere greatly increases compared with that of low-frequency electromagnetic waves, directionality and equivalent omnidirectional radiation power of signals in the 5G communications system can be enhanced by introducing a large phased array technology, thereby increasing a system communications distance and a system capacity. In the large phased array technology, a large quantity of signal transmission channels is integrated into one or more chips. A high-performance phased array requires channels to be highly consistent. However, during production and use of the channels, deviations are generated between the transmission channels, which need to be corrected.

For correction between channels in a chip, a signal generator and a quadrature receiver are usually disposed inside the chip. The signal generator generates a reference signal, and the reference signal is fed onto transmission channels through one end of a transmission cable of the reference signal. Then signals output from the transmission channels and the reference signal generated by the signal generator are input into the quadrature receiver, to obtain a phase of each transmission channel. A final phase correction value between the transmission channels is obtained by subtracting an estimated transmission delay resulting from the transmission cable from a difference between phases of two transmission channels. However, deviations are also generated during production and use of the transmission cable. The estimated transmission delay resulting from the transmission cable has low accuracy. Consequently, there is a large error in the obtained phase correction value corresponding to each transmission channel, and further this causes low accuracy of correction between the transmission channels.

SUMMARY

Embodiments of this application provide an apparatus for correcting a deviation between a plurality of transmission channels and a wireless communications device, to improve accuracy for correcting a deviation between transmission channels.

According to a first aspect, an embodiment of this application provides an apparatus for correcting a deviation between a plurality of transmission channels. The plurality of transmission channels includes a first transmission channel and a second transmission channel. The apparatus includes a first splitter configured to feed a first signal onto the first transmission channel and the second transmission channel, where the first splitter is located in a symmetrical position between the first transmission channel and the second transmission channel, and a vector detection unit configured to, when the first splitter feeds the first signal, detect a first signal vector based on a first feedback signal from the first transmission channel, and detect a second signal vector based on a second feedback signal from the second transmission channel, where the first signal vector and the second signal vector are used to determine a first deviation correction value between the first transmission channel and the second transmission channel, and the first deviation correction value is used to correct a deviation between the first transmission channel and the second transmission channel.

In the apparatus, a transmission channel (for example, the first transmission channel or the second transmission channel) may include a plurality of devices such as a phase shifter, a power amplifier, a low noise amplifier, and a filter. Therefore, a position of the transmission channel in the apparatus cannot be simply defined as a point. In the apparatus provided in the first aspect, the position of the transmission channel may be understood as a position of an antenna corresponding to the transmission channel.

The description that the first splitter is located in a symmetrical position between the first transmission channel and the second transmission channel may be understood as follows. Assuming that the first transmission channel corresponds to a first antenna, and the second transmission channel corresponds to a second antenna, the first splitter may be located on a perpendicular bisector of a line connecting the first antenna and the second antenna, that is, the first antenna and the second antenna are symmetrically distributed on two sides of the perpendicular bisector.

According to the foregoing solution, when the first transmission channel and the second transmission channel are both receive channels, the first splitter located in the symmetrical position between the first transmission channel and the second transmission channel feeds the first signal onto the first transmission channel and the second transmission channel. Because of the position relationship between the first splitter and the two transmission channels, the first signal transmitted from the first splitter to the first transmission channel and the first signal transmitted from the first splitter to the second transmission channel have a same degree of attenuation. In other words, feedback signals output by the first transmission channel and the second transmission channel do not have deviations resulting from path losses. Therefore, directly determining the first deviation correction value between the first transmission channel and the second transmission channel based on detected signal vectors of feedback signals can improve accuracy of correction between receive channels.

In the apparatus provided in the first aspect, the first transmission channel and the second transmission channel may be two transmission channels in a same semiconductor chip that are far away from each other, or may be two transmission channels in different semiconductor chips. For example, millimeter (mm) waves are used as a signal carrier in a 5G communications system. Transmission and reception of a millimeter wave signal may be implemented by using a plurality of antenna modules, and the antenna modules are distributed in different positions of a mainboard of a wireless communications device (for example, a terminal). The first transmission channel and the second transmission channel may be transmission channels in different antenna modules.

In addition, the apparatus may further include a processing unit configured to determine the first deviation correction value based on the first signal vector and the second signal vector.

In a possible design, the plurality of transmission channels further includes a first correction coupling channel and a second correction coupling channel. A first endpoint of the first correction coupling channel is connected to the first transmission channel, and a second endpoint of the second correction coupling channel is connected to the second transmission channel. The first splitter is further configured to feed the first signal onto the first transmission channel through the first endpoint, and feed the first signal onto the second transmission channel through the second endpoint.

That is, the first transmission channel and the second transmission channel may be connected to two correction coupling channels respectively, so that lengths of the correction coupling channels are reduced. In this case, a large error resulting from severe signal attenuation on a transmission cable can be avoided when two transmission channels far away from each other are calibrated.

A first distance between the first splitter and the first endpoint may be equal to a second distance between the first splitter and the second endpoint on a transmission path of the first signal.

It should be understood that each correction coupling channel may be connected to one or more transmission channels. If each correction coupling channel is connected to a plurality of transmission channels, when the plurality of transmission channels is calibrated, because transmission channels connected to a same correction coupling channel are generally close to each other, a delay and an error resulting from a transmission cable are small when a signal transmission distance is short. Therefore, calibration may be performed by using conventional calibration technologies.

In the case in which each correction coupling channel is connected to a plurality of transmission channels, when the plurality of transmission channels connected to one correction coupling channel are calibrated, signals may be input from two ends of the correction coupling channel (for example, the first signal is input from the first endpoint of the first correction coupling channel, and the second signal is input from a third endpoint of the first correction coupling channel). Then, feedback signals output by the plurality of transmission channels are separately obtained after the first signal and the second signal are input, and the plurality of transmission channels are calibrated based on the feedback signals.

In a possible design, the plurality of transmission channels further includes a third transmission channel and a fourth transmission channel. A third endpoint of the first correction coupling channel is connected to the third transmission channel, and a fourth endpoint of the second correction coupling channel is connected to the fourth transmission channel. The first splitter is located in a symmetrical position between the third transmission channel and the fourth transmission channel. The first correction coupling channel feeds the first signal onto the third transmission channel through the third endpoint, and the second correction coupling channel feeds the first signal onto the fourth transmission channel through the fourth endpoint. The vector detection unit is further configured to, when the first signal is fed onto the third transmission channel, detect a third signal vector based on a third feedback signal from the third transmission channel, and when the first signal is fed onto the fourth transmission channel, detect a fourth signal vector based on a fourth feedback signal from the fourth transmission channel. The third signal vector and the fourth signal vector are used to determine a second deviation correction value between the third transmission channel and the fourth transmission channel, and the second deviation correction value is used to correct a deviation between the third transmission channel and the fourth transmission channel.

The description that the first splitter is located in a symmetrical position between the third transmission channel and the fourth transmission channel may be understood as follows. Assuming that the third transmission channel corresponds to a third antenna, and the fourth transmission channel corresponds to a fourth antenna, the first splitter may be located on a perpendicular bisector of a line connecting the third antenna and the fourth antenna, that is, the third antenna and the fourth antenna are symmetrically distributed on two sides of the perpendicular bisector.

According to the foregoing solution, each correction coupling channel may be connected to a plurality of transmission channels. Because the first splitter is also located in the symmetrical position between the third transmission channel and the fourth transmission channel, the third transmission channel and the fourth transmission channel may also be calibrated in the same manner of calibrating the deviation between the first transmission channel and the second transmission channel.

Further, the apparatus may further include a second splitter configured to feed a second signal onto the third transmission channel through the third endpoint, and feed the second signal onto the fourth transmission channel through the fourth endpoint. The second splitter is located in a symmetrical position between the third transmission channel and the fourth transmission channel. The first correction coupling channel feeds the second signal onto the first transmission channel through the first endpoint, and the second correction coupling channel feeds the second signal onto the second transmission channel through the second endpoint. The vector detection unit is further configured to, when the second splitter feeds the second signal, detect a fifth signal vector based on a fifth feedback signal from the first transmission channel, detect a sixth signal vector based on a sixth feedback signal from the second transmission channel, detect a seventh signal vector based on a seventh feedback signal from the third transmission channel, and detect an eighth signal vector based on an eighth feedback signal from the fourth transmission channel. Transmission directions of the third feedback signal and the fifth feedback signal are opposite on the first correction coupling channel, and transmission directions of the fourth feedback signal and the sixth feedback signal are opposite on the second correction coupling channel. The first signal vector, the third signal vector, the fifth signal vector, and the seventh signal vector are used to correct a deviation between the first transmission channel and the third transmission channel. The second signal vector, the fourth signal vector, the sixth signal vector, and the eighth signal vector are used to correct a deviation between the second transmission channel and the fourth transmission channel.

According to the foregoing solution, because the transmission directions of the third feedback signal and the fifth feedback signal are opposite on the first correction coupling channel, a deviation correction value between the first transmission channel and the third transmission channel may be directly obtained by cancelling a transmission deviation of the first correction coupling channel. Similarly, because the transmission directions of the fourth feedback signal and the sixth feedback signal are opposite on the second correction coupling channel, a deviation correction value between the second transmission channel and the fourth transmission channel may be directly obtained by cancelling a transmission deviation of the second correction coupling channel.

In a possible design, the vector detection unit includes a quadrature receiver. The first transmission channel, the second transmission channel, the third transmission channel, and the fourth transmission channel are combined by using a first combiner. The quadrature receiver is connected to the first combiner through a coupler. When the first signal is fed into the first endpoint and the second endpoint, the quadrature receiver performs frequency mixing processing on the first signal and the first feedback signal, the first signal and the second feedback signal, the first signal and the third feedback signal, and the first signal and the fourth feedback signal, to obtain the first signal vector, the second signal vector, the third signal vector, and the fourth signal vector respectively. When the second signal is fed into the third endpoint and the fourth endpoint, the quadrature receiver performs frequency mixing processing on the second signal and the fifth feedback signal, the second signal and the sixth feedback signal, the second signal and the seventh feedback signal, and the second signal and the eighth feedback signal, to obtain the fifth signal vector, the sixth signal vector, the seventh signal vector, and the eighth signal vector respectively.

According to the foregoing solution, the quadrature receiver may perform frequency mixing processing, to obtain signal vectors used for calibration between a plurality of transmission channels.

In addition, the apparatus may further include a switching unit configured to receive the first signal and the second signal, and output the first signal to the first splitter and the quadrature receiver, or output the second signal to the second splitter and the quadrature receiver.

According to the foregoing solution, the switching unit may be used to implement that the transmission directions of the third feedback signal and the fifth feedback signal are opposite on the first correction coupling channel, and that the transmission directions of the fourth feedback signal and the sixth feedback signal are opposite on the second correction coupling channel.

In a first possible design, the apparatus is a radio frequency signal input apparatus. The first signal and the second signal are radio frequency signals, and are external radio frequency signals. Alternatively, the apparatus further includes a signal generator connected to the switching unit, the signal generator is configured to generate radio frequency signals, and the radio frequency signals include the first signal and the second signal.

In a second possible design, the apparatus is an intermediate frequency signal input apparatus. The apparatus further includes a frequency mixer connected to the switching unit, and the frequency mixer is configured to perform frequency mixing processing on an intermediate frequency signal and a correction signal, to obtain the first signal and the second signal, where the correction signal is an external signal.

Alternatively, the apparatus further includes a signal generator, and the signal generator is configured to generate the correction signal.

In a third possible design, the apparatus is a baseband signal input apparatus. The first signal and the second signal are external signals. Alternatively, the apparatus further includes a signal generator connected to the switching unit, and the signal generator is configured to generate the first signal and the second signal.

According to the foregoing three solutions, a first measured channel and a second measured channel can be calibrated on a premise that a radio frequency signal, an intermediate frequency signal, and a baseband signal are input.

In a possible design, the apparatus and a plurality of transmission channels are integrated into a same semiconductor chip.

According to a second aspect, a wireless communications device is provided. The wireless communications device includes the apparatus according to any one of the first aspect or the possible implementations of the first aspect. Optionally, the device may be a base station or a terminal.

According to a third aspect, an embodiment of this application provides an apparatus for correcting a deviation between a plurality of transmission channels. The plurality of transmission channels includes a first transmission channel and a second transmission channel. The apparatus includes a first combiner and a vector detection unit. The first combiner is configured to, when a first signal is input, output a combined signal to a vector detection unit after combining a first feedback signal output by the first transmission channel and a second feedback signal output by the second transmission channel. The first combiner is located in a symmetrical position between the first transmission channel and the second transmission channel. The vector detection unit is configured to detect a first signal vector based on a first feedback signal, and detect a second signal vector based on a second feedback signal. The first signal vector and the second signal vector are used to determine a first deviation correction value between the first transmission channel and the second transmission channel, and the first deviation correction value is used to correct a deviation between the first transmission channel and the second transmission channel.

In the apparatus, a transmission channel (for example, the first transmission channel or the second transmission channel) may include a plurality of devices such as a phase shifter, a power amplifier, a low noise amplifier, and a filter. Therefore, a position of the transmission channel in the apparatus cannot be simply defined as a point. In the apparatus provided in the second aspect, the position of the transmission channel may be understood as a position of an antenna corresponding to the transmission channel.

The description that the first combiner is located in a symmetrical position between the first transmission channel and the second transmission channel may be understood as follows. Assuming that the first transmission channel corresponds to a first antenna, and the second transmission channel corresponds to a second antenna, the first combiner may be located on a perpendicular bisector of a line connecting the first antenna and the second antenna, that is, the first antenna and the second antenna are symmetrically distributed on two sides of the perpendicular bisector.

According to the foregoing solution, when the first transmission channel and the second transmission channel are both transmit channels, the first combiner located in the symmetrical position between the first transmission channel and the second transmission channel outputs the combined signal to the vector detection unit after combining the first feedback signal output by the first transmission channel and the second feedback signal output by the second transmission channel. Because of the position relationship between the first combiner and the two transmission channels, the first signal transmitted from the first transmission channel to the first combiner and the first signal transmitted from the second transmission channel to the first combiner have a same degree of attenuation. In other words, feedback signals output by the first transmission channel and the second transmission channel do not have deviations resulting from path losses. Therefore, directly determining the first deviation correction value between the first transmission channel and the second transmission channel based on detected signal vectors of feedback signals can improve accuracy of correction between transmit channels.

In the apparatus provided in the second aspect, the first transmission channel and the second transmission channel may be two transmission channels in a same semiconductor chip that are far away from each other, or may be two transmission channels in different semiconductor chips. For example, mm waves are used as a signal carrier in a 5G communications system. Transmission and reception of a millimeter wave signal may be implemented by using a plurality of antenna modules, and the antenna modules are distributed in different positions of a mainboard of a wireless communications device (for example, a terminal). The first transmission channel and the second transmission channel may be transmission channels in different antenna modules.

In addition, the apparatus may further include a processing unit configured to determine the first deviation correction value based on the first signal vector and the second signal vector.

In a possible design, the plurality of transmission channels further includes a first correction coupling channel and a second correction coupling channel. A first endpoint of the first correction coupling channel is connected to the first transmission channel, and a second endpoint of the second correction coupling channel is connected to the second transmission channel. The first combiner is further configured to output the combined signal to the vector detection unit after combining the first feedback signal output through the first endpoint and the second feedback signal output through the second endpoint.

That is, the first transmission channel and the second transmission channel are connected to two correction coupling channels respectively, so that lengths of the correction coupling channels are reduced. In this case, a large error resulting from severe signal attenuation on a transmission cable can be avoided when two transmission channels far away from each other are calibrated.

A first distance between the first endpoint and the first combiner may be equal to a second distance between the second endpoint and the first combiner on a transmission path of the first signal.

It should be understood that each correction coupling channel may be connected to one or more transmission channels. If each correction coupling channel is connected to a plurality of transmission channels, when the plurality of transmission channels is calibrated, because transmission channels connected to a same correction coupling channel are generally close to each other, a delay and an error resulting from a transmission cable are small when a signal transmission distance is short. Therefore, calibration may be performed by using conventional calibration technologies.

Certainly, in the case in which each correction coupling channel is connected to a plurality of transmission channels, for example, in a case in which the first correction coupling channel is connected to a plurality of transmission channels, when the plurality of transmission channels connected to the first correction coupling channel are calibrated, when the first signal is input, the first combiner may obtain feedback signals output by the plurality of transmission channels, and when a second signal is input, another combiner (for example, a second combiner) may obtain feedback signals output the plurality of transmission channels. The second combiner is connected to the two end points of the first correction coupling channel. Then, the plurality of transmission channels is calibrated based on the feedback signals obtained when the first signal is input and the second signal are input.

In a possible design, the plurality of transmission channels further includes a third transmission channel and a fourth transmission channel. A third endpoint of the first correction coupling channel is connected to the third transmission channel, and a fourth endpoint of the second correction coupling channel is connected to the fourth transmission channel. The first combiner is located in a symmetrical position between the third transmission channel and the fourth transmission channel. When the first signal is input, the third endpoint outputs a third feedback signal, and the fourth endpoint outputs a fourth feedback signal. The first combiner is further configured to output a combined signal to the vector detection unit after combining the third feedback signal output through the first endpoint and the fourth feedback signal output through the second endpoint. The vector detection unit is further configured to detect a third signal vector based on the third feedback signal, and detect a fourth signal vector based on the fourth feedback signal. The third signal vector and the fourth signal vector are used to determine a second deviation correction value between the third transmission channel and the fourth transmission channel. The second deviation correction value is used to correct a deviation between the third transmission channel and the fourth transmission channel.

The description that the first combiner is located in a symmetrical position between the third transmission channel and the fourth transmission channel may be understood as follows. Assuming that the third transmission channel corresponds to a third antenna, and the fourth transmission channel corresponds to a fourth antenna, the first combiner may be located on a perpendicular bisector of a line connecting the third antenna and the fourth antenna, that is, the third antenna and the fourth antenna are symmetrically distributed on two sides of the perpendicular bisector.

According to the foregoing solution, each correction coupling channel may be connected to a plurality of transmission channels. Because the first combiner is also located in the symmetrical position between the third transmission channel and the fourth transmission channel, the third transmission channel and the fourth transmission channel may also be calibrated in the same manner of calibrating the deviation between the first transmission channel and the second transmission channel.

Further, the apparatus further includes a second combiner configured to, when the second signal is input, output a combined signal to the vector detection unit after combining a fifth feedback signal and a sixth feedback signal that are output through the third endpoint and combining a seventh feedback signal and an eighth feedback signal that are output through the fourth endpoint. The second combiner is located in a symmetrical position between the third transmission channel and the fourth transmission channel. The fifth feedback signal, the sixth feedback signal, the seventh feedback signal, and the eighth feedback signal are signals that are output by inputting the second signal onto the first transmission channel, the second transmission channel, the third transmission channel, and the fourth transmission channel. Transmission directions of the third feedback signal and the fifth feedback signal are opposite on the first correction coupling channel. Transmission directions of the fourth feedback signal and the sixth feedback signal are opposite on the second correction coupling channel. The vector detection unit is further configured to detect a fifth signal vector based on the fifth feedback signal, detect a sixth signal vector based on the sixth feedback signal, detect a seventh signal vector based on the seventh feedback signal, and detect an eighth signal vector based on the eighth feedback signal. The first signal vector, the third signal vector, the fifth signal vector, and the seventh signal vector are used to correct a deviation between the first transmission channel and the third transmission channel. The second signal vector, the fourth signal vector, the sixth signal vector, and the eighth signal vector are used to correct a deviation between the second transmission channel and the fourth transmission channel.

According to the foregoing solution, because the transmission directions of the third feedback signal and the fifth feedback signal are opposite on the first correction coupling channel, a deviation correction value between the first transmission channel and the third transmission channel may be directly obtained by cancelling a transmission deviation of the first correction coupling channel. Similarly, because the transmission directions of the fourth feedback signal and the sixth feedback signal are opposite on the second correction coupling channel, a deviation correction value between the second transmission channel and the fourth transmission channel may be directly obtained by cancelling a transmission deviation of the second correction coupling channel.

In a possible design, the vector detection unit includes a quadrature receiver. The quadrature receiver is connected to both the first combiner and the second combiner. When the first signal is input, the quadrature receiver performs frequency mixing processing on the first signal and the first feedback signal, the first signal and the second feedback signal, the first signal and the third feedback signal, and the first signal and the fourth feedback signal, to obtain the first signal vector, the second signal vector, the third signal vector, and the fourth signal vector respectively. When the second signal is input, the quadrature receiver performs frequency mixing processing on the second signal and the fifth feedback signal, the second signal and the sixth feedback signal, the second signal and the seventh feedback signal, and the second signal and the eighth feedback signal, to obtain the fifth signal vector, the sixth signal vector, the seventh signal vector, and the eighth signal vector respectively.

According to the foregoing solution, the quadrature receiver may perform frequency mixing processing, to obtain signal vectors used for calibration between a plurality of transmission channels.

In addition, the apparatus may further include a switching unit. The switching unit is configured to receive the first signal and the second signal, and output the first signal to a third combiner and the quadrature receiver, or output the second signal to the third combiner and the quadrature receiver. The first transmission channel, the second transmission channel, the third transmission channel, and the fourth transmission channel are combined by using the third combiner.

According to the foregoing solution, the switching unit may be used to implement that the transmission directions of the third feedback signal and the fifth feedback signal are opposite on the first correction coupling channel, and that the transmission directions of the fourth feedback signal and the sixth feedback signal are opposite on the second correction coupling channel.

In a first possible design, the apparatus is a radio frequency signal input apparatus. The first signal and the second signal are radio frequency signals, and are external radio frequency signals. Alternatively, the apparatus further includes a signal generator connected to the switching unit, the signal generator is configured to generate radio frequency signals, and the radio frequency signals include the first signal and the second signal.

In a second possible design, the apparatus is an intermediate frequency signal input apparatus. The apparatus further includes a frequency mixer connected to the switching unit, and the frequency mixer is configured to perform frequency mixing processing on an intermediate frequency signal and a correction signal, to obtain the first signal and the second signal, where the correction signal is an external signal. Alternatively, the apparatus further includes a signal generator, and the signal generator is configured to generate the correction signal.

In a third possible design, the apparatus is a baseband signal input apparatus. The first signal and the second signal are external signals. Alternatively, the apparatus further includes a signal generator connected to the switching unit, and the signal generator is configured to generate the first signal and the second signal.

According to the foregoing three solutions, a first measured channel and a second measured channel can be calibrated on a premise that a radio frequency signal, an intermediate frequency signal, and a baseband signal are input.

In a possible design, the apparatus and a plurality of transmission channels are integrated into a same semiconductor chip.

According to a fourth aspect, a wireless communications device is provided. The wireless communications device includes the apparatus according to any one of the third aspect or the possible implementations of the third aspect. Optionally, the device may be a base station or a terminal.

BRIEF DESCRIPTION OF DRAWINGS

FIG. 1A and FIG. 1B are schematic diagrams depicting structures of combinations of an antenna unit and a chip according to an embodiment of this application;

FIG. 6 is a schematic diagram depicting structures of a switching unit according to an embodiment of this application;

FIG. 17A and FIG. 17B are schematic diagrams depicting structures of semiconductor chips according to an embodiment of this application;

FIG. 18A, FIG. 18B, and FIG. 18C are schematic diagrams of distribution of antenna arrays according to an embodiment of this application;

DESCRIPTION OF EMBODIMENTS

A phased array is a phase-controlled electronically scanned array, and is constituted by arranging a large quantity of antenna units. Each antenna unit may be controlled by an independent switch, and a radiation direction of an electromagnetic wave is modulated by controlling an amplitude and a phase of the antenna unit in the array, to synthesize a directional scanning-focused beam. A device (for example, a base station or a terminal) in a communications system for which a phased array technology is used may include antenna units and a chip. A chip may include a plurality of radio frequency channels. A radio frequency channel and an antenna unit may constitute a channel used for transmitting or receiving a signal in the device. In the embodiments of this application, a radio frequency channel and a channel constituted by a radio frequency channel and an antenna unit may be collectively referred to as a transmission channel.

As shown in FIG. 1A and FIG. 1B, for example, an antenna unit is a patch antenna and a phased array is a 4×4 antenna array. There may be two combinations for antenna units in the phased array and a chip in a print design: AOB (antenna on printed circuit board (PCB)) and antenna in package (AIP). As shown in FIG. 1A, AOB means that antenna units are located on a PCB. The antenna units and the chip may be separately located on two surfaces of the PCB (that is, the antenna units are printed on one surface of the PCB, and the chip is attached to the other surface of the PCB), or may be located on a same surface of the PCB (that is, the antenna units are printed on a surface of the PCB, and the chip is also attached to the surface). In FIG. 1A and FIG. 1B, an example in which the antenna units and the chip are located on different surfaces is used for description. As shown in FIG. 1B, AIP means that antenna units are located in a package of a chip. The antenna units are packaged together with the chip. The antenna units may be located at the top of the package of the chip, and the chip is attached to the PCB.

Figure 2:
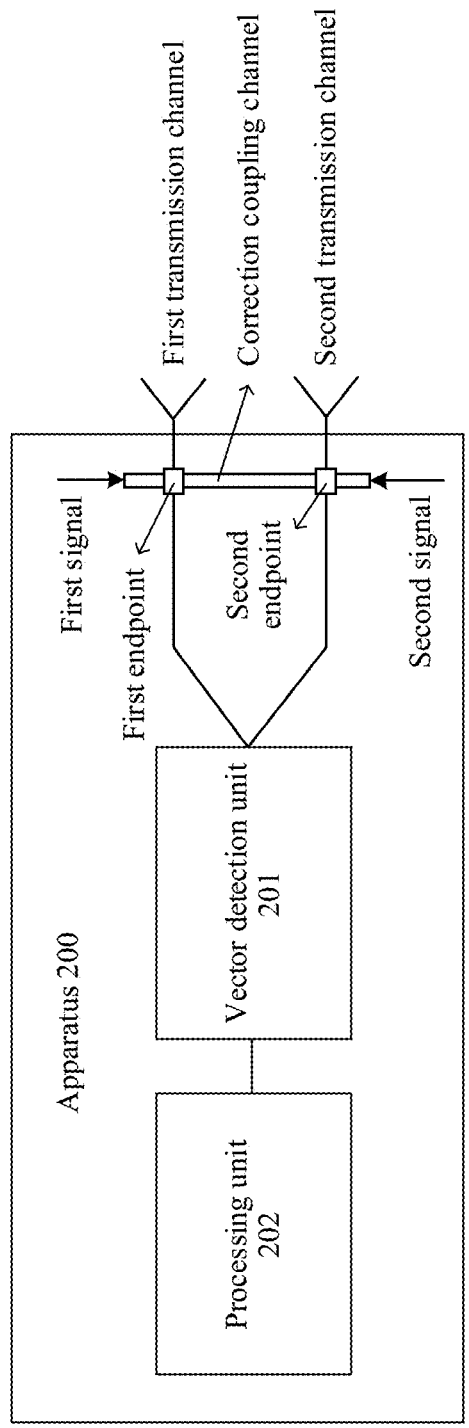
FIG. 2 is a schematic diagram depicting a structure of a first apparatus according to an embodiment of this application.

FIG. 2 is an apparatus for correcting a deviation between a plurality of transmission channels according to an embodiment of this application. The plurality of transmission channels includes a first transmission channel, a second transmission channel, and a correction coupling channel. A first endpoint of the correction coupling channel is connected to the first transmission channel, and a second endpoint of the correction coupling channel is connected to the second transmission channel. The first transmission channel and the second transmission channel are both receive channels. As shown in FIG. 2, the apparatus 200 includes a vector detection unit 201 and a processing unit 202.

The vector detection unit 201 is configured to, when a first signal is fed at the first endpoint, detect a first signal vector based on a first feedback signal from the first transmission channel, and detect a second signal vector based on a second feedback signal from the second transmission channel.

The vector detection unit 201 is further configured to, when a second signal is fed at the second endpoint, detect a third signal vector based on a third feedback signal from the first transmission channel, and detect a fourth signal vector based on a fourth feedback signal from the second transmission channel. Transmission directions of the second feedback signal and the third feedback signal are opposite on the correction coupling channel.

The vector detection unit 201 may be a unit configured to detect a signal amplitude and/or a signal phase, where the signal amplitude and the signal phase may constitute a vector. Optionally, the vector detection unit 201 may output two component signals, which may be used to determine the signal amplitude and the signal phase. For example, the vector detection unit 201 may include a quadrature receiver or a Hilbert filter. The quadrature receiver and the Hilbert filter may be configured to output two component signals (I and Q), and determine a signal amplitude A and a signal phase θ according to the following Formulas (a) and (b), or may be directly configured to output the signal amplitude A and the signal phase θ:

$$A = 10 \lg(I^2 + Q^2), \text{ and} \quad (a)$$

$$\theta = \arctan\left(\frac{Q}{I}\right). \quad (b)$$

In addition, the correction coupling channel may be configured to feed signals to the first transmission channel and the second transmission channel. For example, the correction coupling channel feeds the first signal at the first endpoint, and feeds the second signal at the second endpoint. The first transmission channel and the second transmission channel may receive the signals fed by the correction coupling channel. The correction coupling channel may be a transmission cable. The first transmission channel may be connected to the first endpoint of the correction coupling channel through a coupler (CP), and the second transmission channel may be connected to the second endpoint of the correction coupling channel through a coupler.

When the first signal is fed at the first endpoint of the correction coupling channel, after the first signal is transmitted through the first transmission channel, the vector detection unit 201 may receive the first feedback signal, and the vector detection unit 201 may obtain the first signal vector by detecting the first feedback signal. In addition, after the first signal is transmitted through the correction coupling channel and the second transmission channel, the vector detection unit 201 may receive the second feedback signal, and the vector detection unit 201 may obtain the second signal vector by detecting the second feedback signal.

When the second signal is fed at the second endpoint of the correction coupling channel, after the second signal is transmitted through the correction coupling channel and the first transmission channel, the vector detection unit 201 may receive the third feedback signal, and the vector detection unit 201 may obtain the third signal vector by detecting the third feedback signal. After the second signal is transmitted through the second transmission channel, the vector detection unit 201 may receive the fourth feedback signal, and the vector detection unit 201 may obtain the fourth signal vector by detecting the fourth feedback signal.

A transmission direction of the first signal between the first endpoint and the second endpoint of the correction coupling channel is from the first endpoint to the second endpoint, and a transmission direction of the second signal between the first endpoint and the second endpoint of the correction coupling channel is from the second endpoint to the first endpoint. Therefore, transmission directions of the second feedback signal and the third feedback signal received by the vector detection unit 201 are opposite between the first endpoint and the second endpoint of the correction coupling channel.

In addition, the vector detection unit 201 may detect each received feedback signal once or for a plurality of times. The vector detection unit 201 obtains one signal vector when detecting the feedback signal once, or obtain a plurality of signal vectors when detecting the feedback signal for a plurality of times. For example, the vector detection unit 201 detects the first feedback signal once to obtain one first signal vector. Alternatively, the vector detection unit 201 detects the first feedback signal for a plurality of times to obtain a plurality of first signal vectors.

The processing unit 202 is configured to determine a deviation correction value between the first transmission channel and the second transmission channel based on the detected signal vectors, where the deviation correction value is used to correct a deviation between the first transmission channel and the second transmission channel.

When each detected signal vector includes one signal vector, the processing unit 202 may determine the deviation correction value between the first transmission channel and the second transmission channel based on one first signal vector, one second signal vector, one third signal vector, and one fourth signal vector. When each detected signal vector includes a plurality of signal vectors, the processing unit 202 may determine the deviation correction value between the first transmission channel and the second transmission channel based on a plurality of first signal vectors, a plurality of second signal vectors, a plurality of third signal vectors, and a plurality of fourth signal vectors.

In addition, each signal vector may include amplitude information and phase information. The deviation correction value may include an amplitude correction value between the first transmission channel and the second transmission channel and a phase correction value between the first transmission channel and the second transmission channel. The processing unit 202 may determine the amplitude correction value based on amplitude information in the detected signal vectors, and may determine the phase correction value based on phase information in the detected signal vectors.

Because the transmission directions of the second feedback signal and the third feedback signal are opposite on the correction coupling channel between the first endpoint and the second endpoint, the deviation correction value between the first transmission channel and the second transmission channel may be directly obtained by canceling a transmission deviation of the correction coupling channel.

For ease of understanding, an example in which each signal vector is detected once is used for description herein. If the first signal vector is $(A_1, \theta_1)$, the second signal vector is $(A_2, \theta_2)$, the third signal vector is $(A_3, \theta_3)$, and the fourth signal vector is $(A_4, \theta_4)$, the processing unit 202 may determine the amplitude correction value $\Delta A$ between the first transmission channel and the second transmission channel based on $A_1, A_2, A_3,$ and $A_4$, and determine the phase correction value $\Delta\theta$ based on $\theta_1, \theta_2, \theta_3,$ and $\theta_4$. For example, the processing unit 202 may determine $\Delta A$ according to the following Formula (1), and determine $\Delta\theta$ between the first transmission channel and the second transmission channel according to the following Formula (2):

$$\Delta A = \frac{1}{2}(A_2 - A_1 + A_4 - A_3), \text{ and} \quad (1)$$

$$\Delta\theta = \frac{1}{2}(\theta_2 - \theta_1 + \theta_4 - \theta_3). \quad (2)$$

Optionally, the transmission deviation of the correction coupling channel may include a transmission amplitude deviation and a transmission phase deviation. The processing unit 202 may be further configured to determine, based on detected signal vectors, a transmission amplitude deviation and a transmission phase deviation caused to signals by the correction coupling channel between the first endpoint and the second endpoint. For example, the processing unit 202 may determine, according to the following Formulas (3) and (4), the transmission amplitude deviation $\gamma$ and the transmission phase deviation $\beta$ caused to signals by the correction coupling channel:

$$\gamma = \frac{1}{2}(A_1 - A_2 + A_4 - A_3), \text{ and} \quad (3)$$

$$\beta = \frac{1}{2}(\theta_1 - \theta_2 + \theta_4 - \theta_3) \quad (4)$$

The foregoing Formulas (1) to (4) are merely examples. The processing unit 202 may alternatively determine, based on detected signal vectors in another manner, the amplitude correction value and the phase correction value between the first transmission channel and the second transmission channel, and the transmission amplitude deviation and the transmission phase deviation caused to signals by the correction coupling channel.

After the amplitude correction value and the phase correction value between the first transmission channel and the second transmission channel are determined, the first transmission channel or the second transmission channel may be compensated based on the amplitude correction value, to correct an amplitude deviation between the first transmission channel and the second transmission channel, and/or the first transmission channel or the second transmission channel may be compensated based on the phase correction value, to correct a phase deviation between the first transmission channel and the second transmission channel. For example, a phase shifter (PS) is disposed on the first transmission channel and/or the second transmission channel, and the amplitude correction value and the phase correction value between the first transmission channel and the second transmission channel are set by using the PS.

In this embodiment of this application, when the first transmission channel and the second transmission channel are both receive channels, when the first signal is fed at the first endpoint and the second signal is fed at the second endpoint, a plurality of signal vectors are detected separately based on a plurality of feedback signals from the first transmission channel and based on a plurality of feedback signals from the second transmission channel. Because the transmission directions of the second feedback signal and the third feedback signal are opposite between the first endpoint and the second endpoint of the correction coupling channel, the deviation correction value between the first transmission channel and the second transmission channel may be determined based on detected signal vectors of feedback signals, so that a transmission deviation of the correction coupling channel is cancelled, and further performing correction based on the deviation correction value can improve accuracy of correction of the receive channels.

Figure 3:
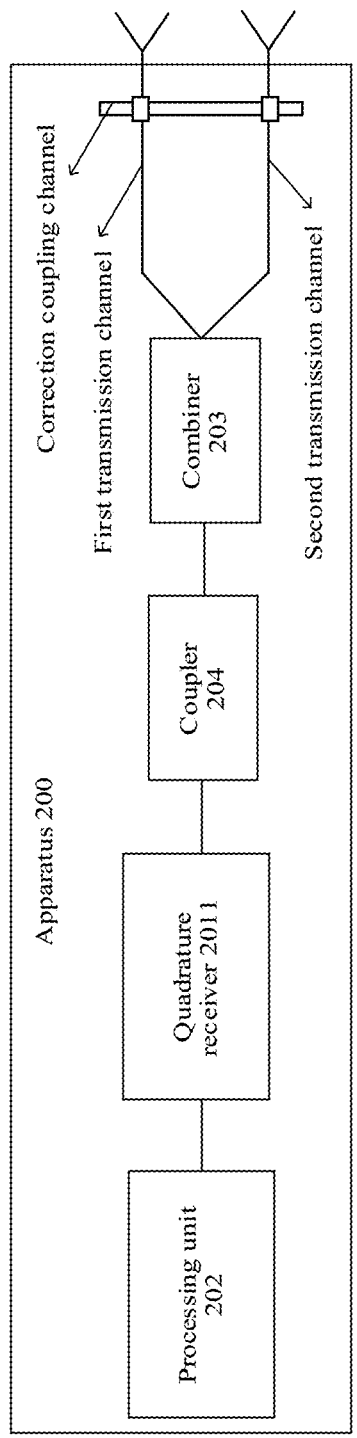
FIG. 3 is a schematic diagram depicting a structure of a second apparatus according to an embodiment of this application.

Further, as shown in FIG. 3, the vector detection unit 201 may include a quadrature receiver 2011. The first transmission channel and the second transmission channel are combined by using a combiner 203, and the quadrature receiver 2011 is connected to the combiner 203 through a coupler 204.

The first signal is fed at the first endpoint, and the quadrature receiver 2011 performs frequency mixing processing on the first signal and the first feedback signal, and the first signal and the second feedback signal, to obtain the first signal vector and the second signal vector respectively. The second signal is fed at the first endpoint, and the quadrature receiver 2011 performs frequency mixing processing on the second signal and the third feedback signal, and the second signal and the fourth feedback signal, to obtain the third signal vector and the fourth signal vector respectively.

Further, the first signal is fed at the first endpoint. When the first transmission channel is enabled and the second transmission channel is disabled, the first signal is transmitted to the combiner 203 through the first transmission channel. The quadrature receiver 2011 receives the first feedback signal coupled by the coupler 204 from the combiner 203. The quadrature receiver 2011 performs frequency mixing processing on the first signal and the first feedback signal to obtain the first signal vector. When the first transmission channel is disabled and the second transmission channel is enabled, the first signal is transmitted to the combiner 203 through the correction coupling channel between the first endpoint and the second endpoint and the second transmission channel. The quadrature receiver 2011 receives the second feedback signal coupled by the coupler 204 from the combiner 203. The quadrature receiver 2011 performs frequency mixing processing on the first signal and the second feedback signal to obtain the second signal vector. Similarly, the second signal is fed at the second endpoint. When the first transmission channel is enabled and the second transmission channel is disabled, the second signal is transmitted to the combiner 203 through the correction coupling channel between the first endpoint and the second endpoint and the first transmission channel. The quadrature receiver 2011 receives the third feedback signal coupled by the coupler 204 from the combiner 203. The quadrature receiver 2011 performs frequency mixing processing on the second signal and the third feedback signal to obtain the third signal vector. When the first transmission channel is disabled and the second transmission channel is enabled, the second signal is transmitted to the combiner 203 through the second transmission channel. The quadrature receiver 2011 receives the fourth feedback signal coupled by the coupler 204 from the combiner 203. The quadrature receiver 2011 performs frequency mixing processing on the second signal and the fourth feedback signal to obtain the fourth signal vector.

Figure 4:
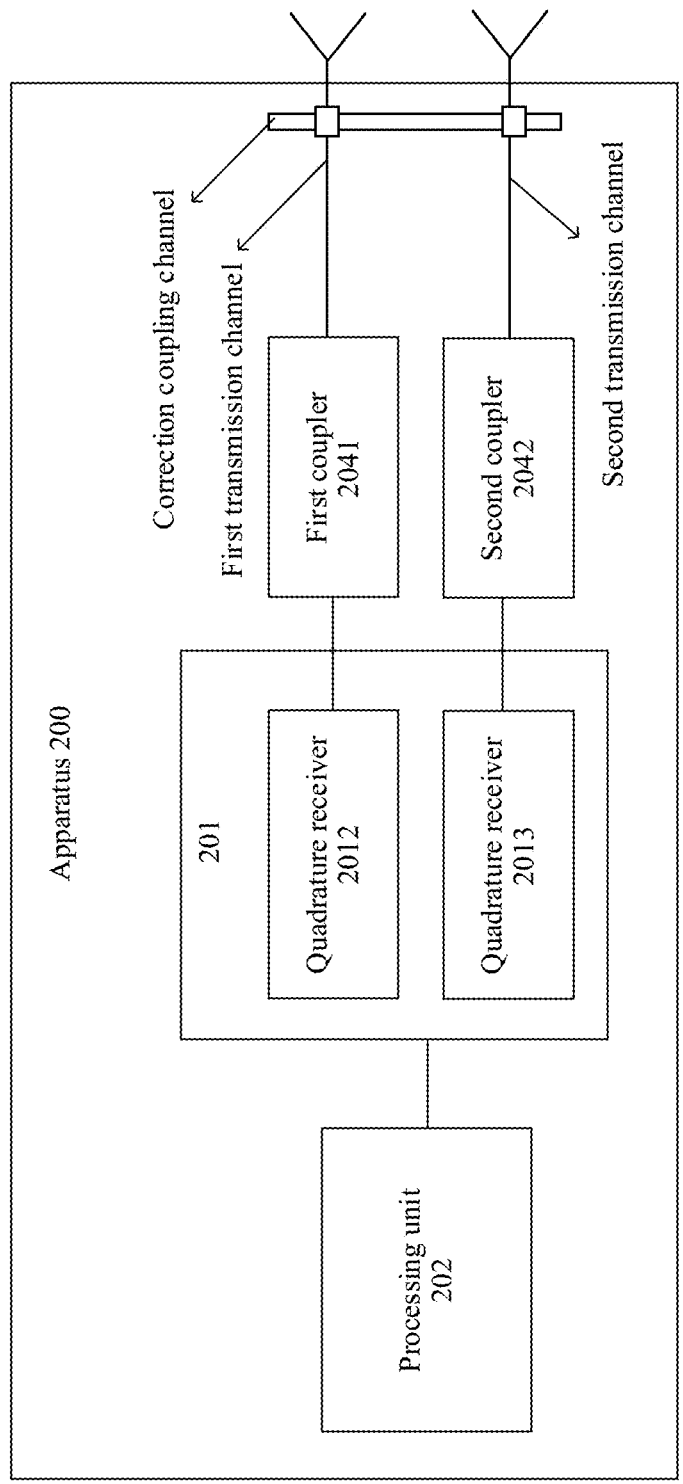
FIG. 4 is a schematic diagram depicting a structure of a third apparatus according to an embodiment of this application.

Alternatively, as shown in FIG. 4, the vector detection unit 201 may include a first quadrature receiver 2012 and a second quadrature receiver 2013. The first quadrature receiver 2012 is connected to the first transmission channel through a first coupler 2041, and the second quadrature receiver 2013 is connected to the second transmission channel through a second coupler 2042. The first signal is fed at the first endpoint. After the first signal is transmitted through the first transmission channel, the first quadrature receiver 2012 receives the first feedback signal coupled by the first coupler 2041 from the first transmission channel, and performs frequency mixing processing on the first signal and the first feedback signal to obtain the first signal vector. After the first signal is transmitted through the correction coupling channel between the first endpoint and the second endpoint and the second transmission channel, the second quadrature receiver 2013 receives the second feedback signal coupled by the second coupler 2042 from the second transmission channel, and performs frequency mixing processing on the first signal and the second feedback signal to obtain the second signal vector. The second signal is fed at the second endpoint. After the second signal is transmitted through the correction coupling channel between the second endpoint and the first endpoint and the first transmission channel, the first quadrature receiver 2012 receives the third feedback signal coupled by the first coupler 2041 from the first transmission channel, and performs frequency mixing processing on the second signal and the third feedback signal to obtain the third signal vector. After the second signal is transmitted through the second transmission channel, the second quadrature receiver 2013 receives the fourth feedback signal coupled by the second coupler 2042 from the second transmission channel, and performs frequency mixing processing on the second signal and the fourth feedback signal to obtain the fourth signal vector.

Figure 5:
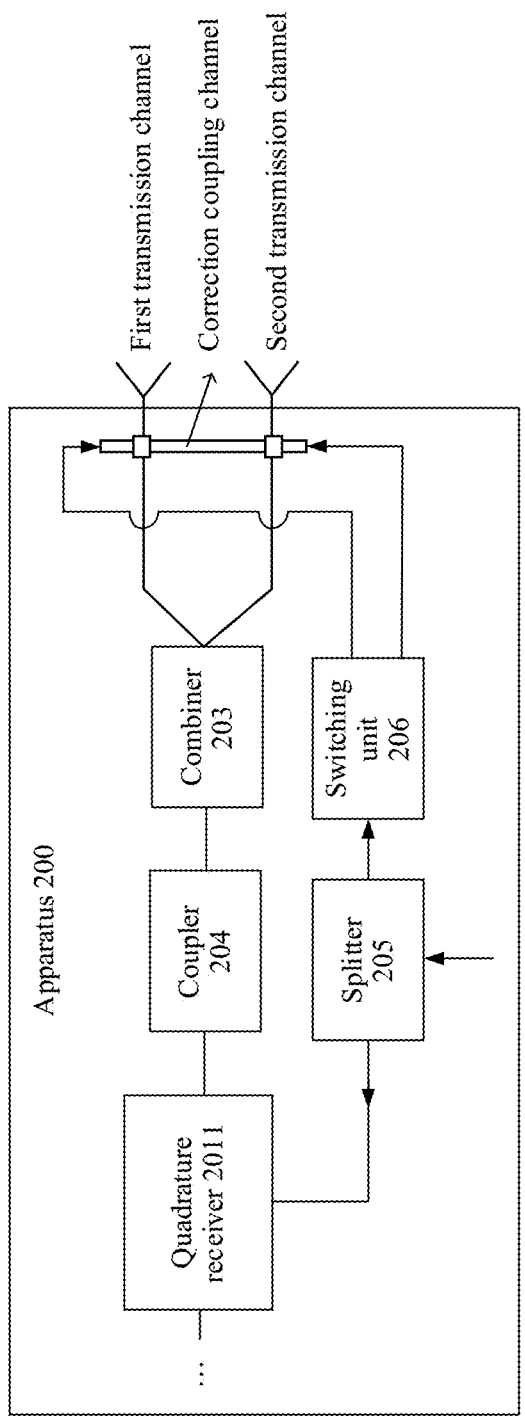
FIG. 5 is a schematic diagram depicting a structure of a fourth apparatus according to an embodiment of this application.

Further, with reference to FIG. 3, as shown in FIG. 5, the apparatus further includes a splitter 205. The splitter 205 is connected to the quadrature receiver 2011, and is further connected to the first endpoint and the second endpoint of the correction coupling channel through a switching unit 206. Optionally, as shown in FIG. 6, the switching unit 206 may be a three-port switch or a three-port balun. A port IN is connected to the splitter 205, and a port 1 and a port 2 are respectively connected to the first endpoint and the second endpoint.

When the splitter 205 is connected to the first endpoint of the correction coupling channel through the switching unit 206, the splitter 205 is configured to split the first signal to the quadrature receiver 2011 and the first endpoint. The first signal shunted to the quadrature receiver 2011 is used to for frequency mixing processing with the first feedback signal and the second feedback signal. The first signal shunted to the first endpoint is to be fed from the first endpoint. When the splitter 205 is connected to the second endpoint through the switching unit 206, the splitter 205 is configured to split the second signal to the quadrature receiver 2011 and the second endpoint. The second signal shunted to the quadrature receiver 2011 is used for frequency mixing processing with the third feedback signal and the fourth feedback signal. The second signal shunted to the second endpoint is to be fed from the second endpoint.

Figure 7:
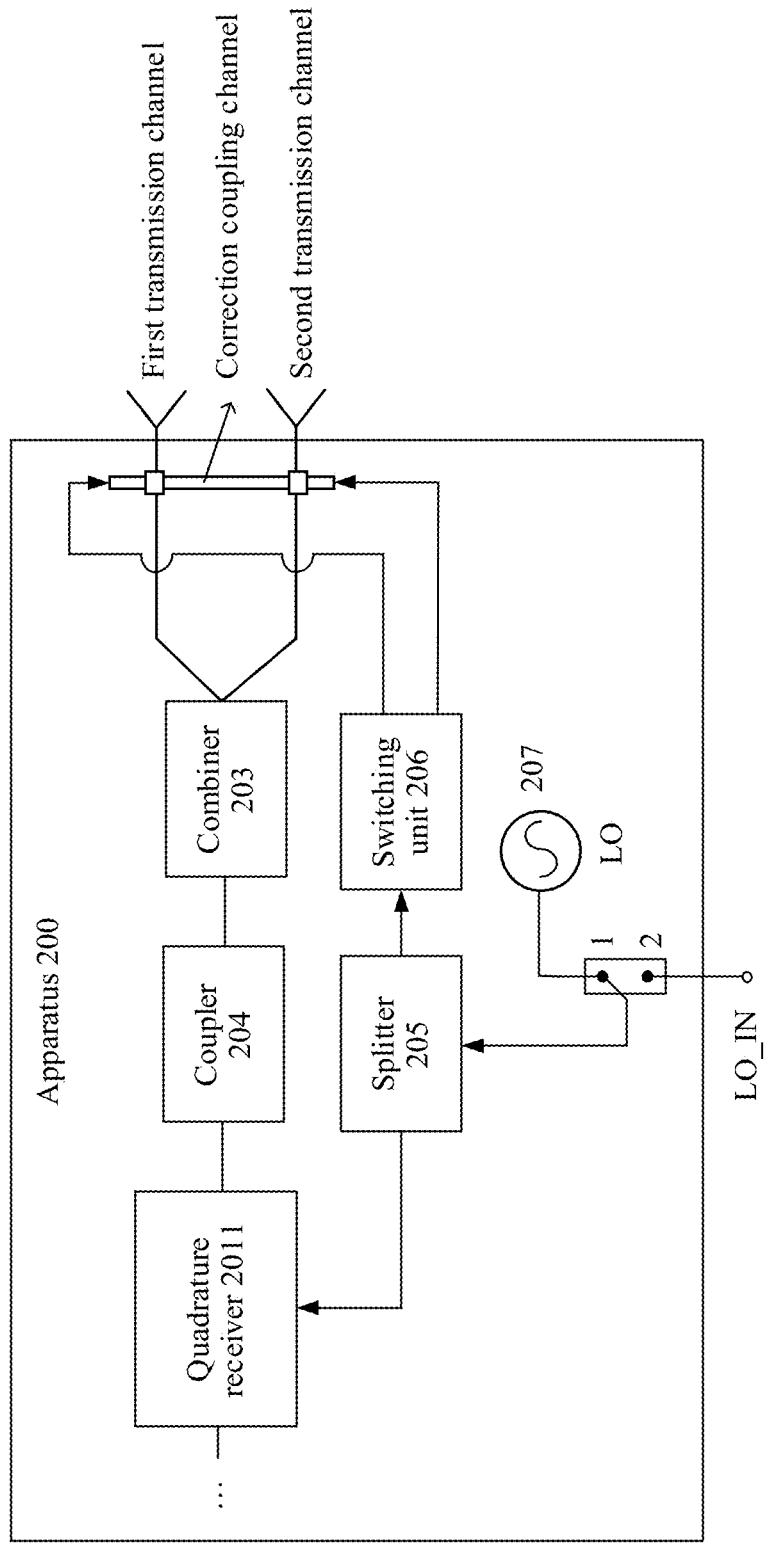
FIG. 7 is a schematic diagram depicting a structure of a fifth apparatus according to an embodiment of this application.

Further, with reference to FIG. 5, as shown in FIG. 7, the apparatus 200 may be a radio frequency (RF) signal input apparatus. For example, the radio frequency apparatus is a radio frequency chip or a radio frequency module. The first signal and the second signal may be external radio frequency signals. For example, the external radio frequency signals may be generated by an external local oscillator (LO). Alternatively, the apparatus further includes a signal generator 207 connected to the splitter 205. The signal generator 207 is configured to generate radio frequency signals, and the radio frequency signals include the first signal and the second signal. Optionally, the signal generator 207 may be a local oscillator. In FIG. 7, an example in which the signal generator 207 is an LO is used for description, and LO_IN represents an input port of an external LO.

Figure 8:
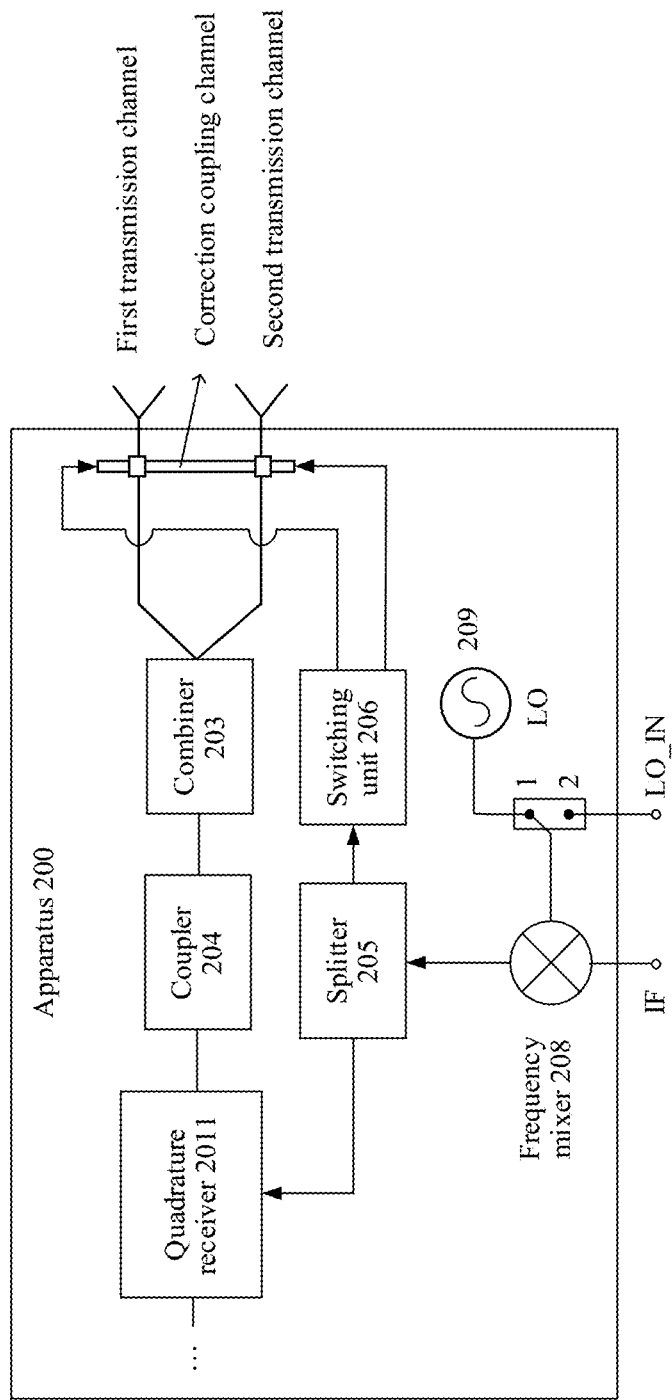
FIG. 8 is a schematic diagram depicting a structure of a sixth apparatus according to an embodiment of this application.

Further, with reference to FIG. 5, as shown in FIG. 8, the apparatus 200 may be an intermediate frequency (IF) signal input apparatus. For example, the apparatus includes an intermediate frequency chip or an intermediate frequency module, and may further include a frequency mixer 208. The frequency mixer 208 is configured to perform frequency mixing processing on an intermediate frequency signal and a correction signal, to obtain the first signal and the second signal. The correction signal may an external signal. For example, the external correction signal may be generated by an external LO. Alternatively, the apparatus further includes a signal generator 209 that is connected to the splitter 205 through the frequency mixer 208. The signal generator 209 is configured to generate a correction signal. Optionally, the signal generator 209 may be an LO. In FIG. 8, an example in which the signal generator 209 is an LO is used for description. LO_IN represents an input port of an external LO, and IF represents an input port of the intermediate frequency signal.

Figure 9:
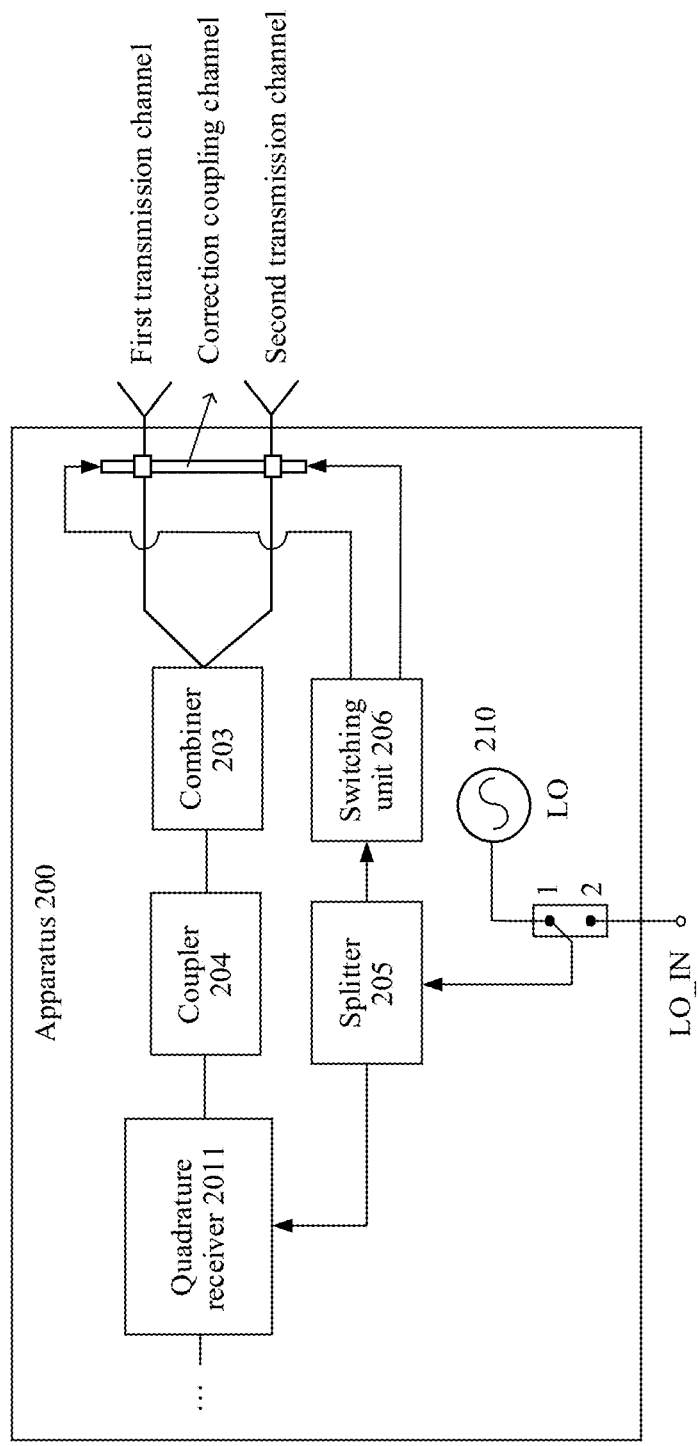
FIG. 9 is a schematic diagram depicting a structure of a seventh apparatus according to an embodiment of this application.

Further, with reference to FIG. 5, as shown in FIG. 9, the apparatus 200 may be a baseband signal input apparatus. For example, the apparatus includes a baseband chip or a baseband module. The first signal and the second signal are external signals. For example, the first signal and the second signal may be generated by an external LO. Alternatively, the apparatus further includes a signal generator 210 connected to the splitter 205, and the signal generator 210 is configured to generate the first signal and the second signal. In FIG. 9, an example in which the signal generator 210 is an LO is used for description, and LO_IN represents an input port of an external LO.

During actual application, the baseband signal input apparatus may generally include a baseband module, an intermediate frequency module, and a radio frequency module. When the apparatus is the baseband signal input apparatus, the first signal and the second signal may be provided by the radio frequency module, the intermediate frequency module, or the baseband module. This is not limited in this embodiment of this application.

Further, the plurality of transmission channels further includes a third transmission channel, and the third transmission channel is connected to a third endpoint of the correction coupling channel. The apparatus is further configured to correct a deviation between the first transmission channel and the third transmission channel, and/or correct a deviation between the second transmission channel and the third transmission channel.

An example in which a deviation between the first transmission channel and the third transmission channel is corrected is used for description herein. The vector detection unit 201 is further configured to, when the first signal is fed at the first endpoint, detect a fifth signal vector based on a fifth feedback signal from the first transmission channel, and detect a sixth signal vector based on a sixth feedback signal from the third transmission channel. The vector detection unit 201 is further configured to, when the third signal is fed at the third endpoint, detect a seventh signal vector based on a seventh feedback signal from the first transmission channel, and detect an eighth signal vector based on an eighth feedback signal from the third transmission channel. Transmission directions of the sixth feedback signal and the seventh feedback signal are opposite on the correction coupling channel. The processing unit 202 is further configured to determine a deviation correction value between the first transmission channel and the third transmission channel based on detected signal vectors, where transmission deviations on the correction coupling channel are cancelled with each other, and the deviation correction value is used to correct the deviation between the first transmission channel and the third transmission channel.

It should be noted that a specific implementation of correcting the deviation between the first transmission channel and the third transmission channel and/or correcting the deviation between the second transmission channel and the third transmission channel by the apparatus 200 is similar to that of correcting the deviation between the first transmission channel and the second transmission channel. For details, refer to related descriptions of correcting the deviation between the first transmission channel and the second transmission channel. Details are not described herein again in this embodiment of this application.

Figure 10:
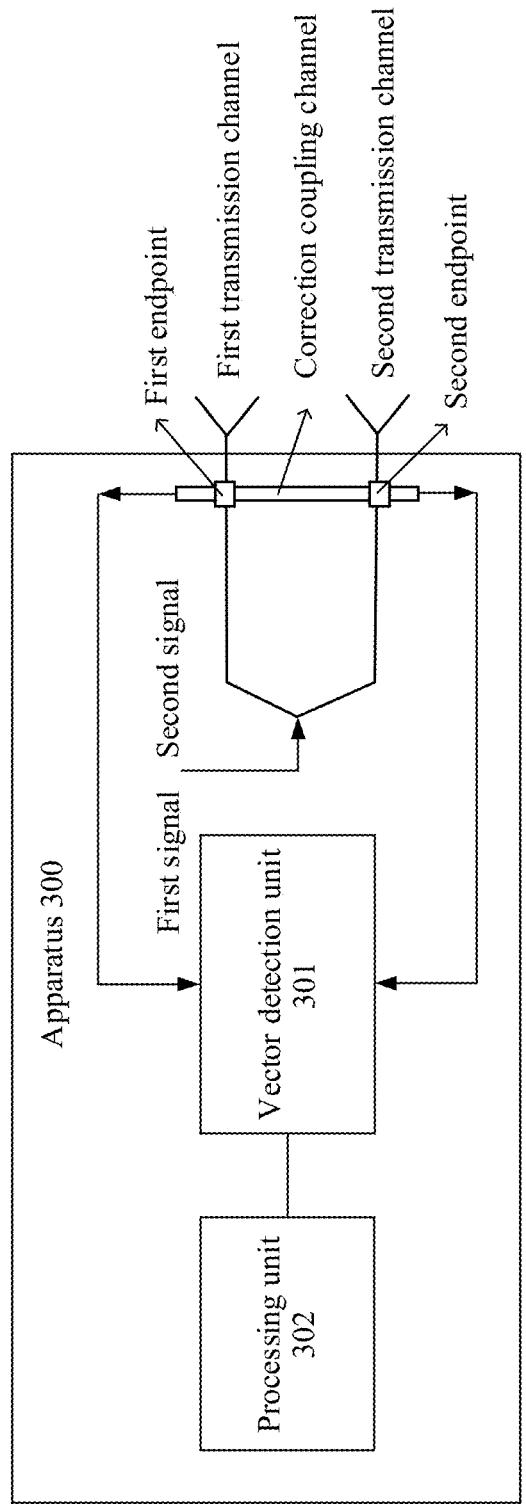
FIG. 10 is a schematic diagram depicting a structure of an eighth apparatus according to an embodiment of this application.

FIG. 10 is another apparatus for correcting a deviation between a plurality of transmission channels according to an embodiment of this application. The plurality of transmission channels include a first transmission channel, a second transmission channel, and a correction coupling channel. A first endpoint of the correction coupling channel is connected to the first transmission channel, and a second endpoint of the correction coupling channel is connected to the second transmission channel. The first transmission channel and the second transmission channel are both transmit channels. As shown in FIG. 10, the apparatus 300 includes a vector detection unit 301 and a processing unit 302.

The vector detection unit 301 is configured to, when a first signal is input onto the first transmission channel and the second transmission channel, detect a first signal vector based on a first feedback signal output by the first transmission channel from the first endpoint, and detect a second signal vector based on a second feedback signal output by the second transmission channel from the first endpoint.

The vector detection unit 301 is further configured to, when a second signal is input onto the first transmission channel and the second transmission channel, detect a third signal vector based on a third feedback signal output by the first transmission channel from the second endpoint, and detect a fourth signal vector based on a fourth feedback signal output by the second transmission channel from the second endpoint. Transmission directions of the second feedback signal and the third feedback signal are opposite on the correction coupling channel.

The vector detection unit 301 may be a unit configured to detect a signal amplitude and/or a signal phase, where the signal amplitude and the signal phase may constitute a vector. Optionally, the vector detection unit 301 may output two component signals. The two component signals may be used to determine the signal amplitude and the signal phase.

In addition, the first transmission channel and the second transmission channel are both transmit channels, and may transmit the first signal and the second signal that are used for correction. The correction coupling channel may be configured to receive signals transmitted by the first transmission channel and the second transmission channel. Optionally, the correction coupling channel may be a transmission cable. The first transmission channel may be connected to the first endpoint of the correction coupling channel through a CP, and the second transmission channel may be connected to the second endpoint of the correction coupling channel through a coupler.

When the first signal is input onto the first transmission channel and the second transmission channel, after the first signal is transmitted through the first transmission channel, the vector detection unit 301 may receive the first feedback signal at the first endpoint of the correction coupling channel, and the vector detection unit 301 may obtain the first signal vector by detecting the first feedback signal. In addition, after the first signal is transmitted through the second transmission channel and the correction coupling channel, the vector detection unit 301 may receive the second feedback signal at the first endpoint of the correction coupling channel, and the vector detection unit 301 may obtain the second signal vector by detecting the second feedback signal.

When the second signal is input onto the first transmission channel and the second transmission channel, after the first signal is transmitted through the first transmission channel and the correction coupling channel, the vector detection unit 301 may receive the third feedback signal at the second endpoint of the correction coupling channel, and the vector detection unit 301 may obtain the third signal vector by detecting the third feedback signal. In addition, after the second signal is transmitted through the second transmission channel, the vector detection unit 301 may receive the fourth feedback signal at the second endpoint of the correction coupling channel, and the vector detection unit 301 may obtain the fourth signal vector by detecting the fourth feedback signal.

A transmission direction of the second feedback signal between the first endpoint and the second endpoint of the correction coupling channel is from the second endpoint to the first endpoint, and a transmission direction of the third feedback signal between the first endpoint and the second endpoint of the correction coupling channel is from the first endpoint to the second endpoint. Therefore, transmission directions of the second feedback signal and the third feedback signal received by the vector detection unit 301 are opposite between the first endpoint and the second endpoint of the correction coupling channel.

In addition, the vector detection unit 301 may detect each received feedback signal once or for a plurality of times. The vector detection unit 301 obtains one signal vector when detecting the feedback signal once, or obtain a plurality of signal vectors when detecting the feedback signal for a plurality of times. For example, the vector detection unit 301 detects the first feedback signal once to obtain one first signal vector. Alternatively, the vector detection unit 301 detects the first feedback signal for a plurality of times to obtain a plurality of first signal vectors.

The processing unit 302 is configured to determine a deviation correction value between the first transmission channel and the second transmission channel based on the detected signal vectors, where the deviation correction value is used to correct a deviation between the first transmission channel and the second transmission channel.

When each detected signal vector includes one signal vector, the processing unit 302 may determine the deviation correction value between the first transmission channel and the second transmission channel based on one first signal vector, one second signal vector, one third signal vector, and one fourth signal vector. When each detected signal vector includes a plurality of signal vectors, the processing unit 302 may determine the deviation correction value between the first transmission channel and the second transmission channel based on a plurality of first signal vectors, a plurality of second signal vectors, a plurality of third signal vectors, and a plurality of fourth signal vectors.

In addition, each signal vector may include amplitude information and phase information. The deviation correction value may include an amplitude correction value between the first transmission channel and the second transmission channel and a phase correction value between the first transmission channel and the second transmission channel. The processing unit 302 may determine the amplitude correction value based on amplitude information in the detected signal vectors, and may determine the phase correction value based on phase information in the detected signal vectors.

Because the transmission directions of the second feedback signal and the third feedback signal are opposite on the correction coupling channel between the first endpoint and the second endpoint, the deviation correction value between the first transmission channel and the second transmission channel may be determined by cancelling a transmission deviation on the correction coupling channel, so that the deviation between the first transmission channel and the second transmission channel can be directly corrected based on the deviation correction value.

It should be noted that a manner of determining the deviation correction value between the first transmission channel and the second transmission channel based on the detected signal vectors and correcting the deviation between the first transmission channel and the second transmission channel is the same as that of determining the deviation correction value between the first transmission channel and the second transmission channel and correcting the deviation between the first transmission channel and the second transmission channel in the embodiment shown in FIG. 2. For details, refer to descriptions in the foregoing embodiment. Details are not described herein again in this embodiment of this application.

In this embodiment of this application, when the first transmission channel and the second transmission channel are both transmit channels, when the first signal and the second signal are separately input, a plurality of signal vectors are detected based on feedback signals that are output from the first transmission channel and the second transmission channel through the first endpoint and the second endpoint. Because the transmission directions of the second feedback signal and the third feedback signal are opposite on the correction coupling channel, the deviation correction value between the first transmission channel and the second transmission channel may be determined based on the plurality of detected signal vectors, so that a transmission deviation of the correction coupling channel is cancelled, and further performing correction based on the deviation correction value can improve accuracy of correction of the receive channels.

Figure 11:
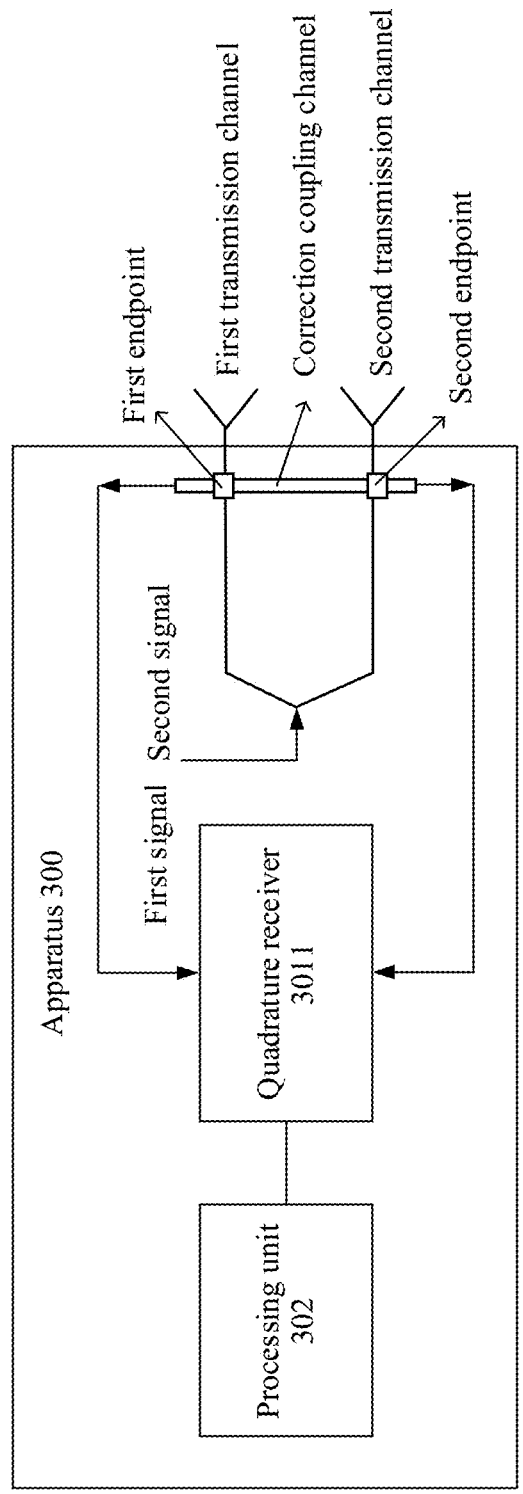
FIG. 11 is a schematic diagram depicting a structure of a ninth apparatus according to an embodiment of this application.

Further, as shown in FIG. 11, the vector detection unit 301 may include a quadrature receiver 3011. The quadrature receiver 3011 is connected to both the first endpoint and the second endpoint of the correction coupling channel.

When the first signal is input onto the first transmission channel and the second transmission channel, and the first signal vector and the second signal vector are detected, the quadrature receiver 3011 performs frequency mixing processing on the first signal and the first feedback signal, and the first signal and the second feedback signal, to obtain the first signal vector and the second signal vector respectively. When the second signal is input onto the first transmission channel and the second transmission channel, and the third signal vector and the fourth signal vector are detected, the quadrature receiver 3011 performs frequency mixing processing on the second signal and the third feedback signal, and the second signal and the fourth feedback signal, to obtain the third signal vector and the fourth signal vector respectively.

Further, the first transmission channel and the second transmission channel each may include an individual input port, or may include a same input port. An example in which the first transmission channel and the second transmission channel include a same input port is used for description in FIG. 11. If the first transmission channel and the second transmission channel each include an individual input port, and the first signal is input onto both the first transmission channel and the second transmission channel, the quadrature receiver 3011 separately receives the first feedback signal and the second feedback signal through the first endpoint. The quadrature receiver 3011 performs frequency mixing processing on the first signal and the first feedback signal to obtain the first signal vector, and performs frequency mixing processing on the first signal and the second feedback signal to obtain the second signal vector. Similarly, if the first transmission channel and the second transmission channel each include an individual input port, and the second signal is input onto both the first transmission channel and the second transmission channel, the quadrature receiver 3011 separately receives the third feedback signal and the fourth feedback signal through the second endpoint. The quadrature receiver 3011 performs frequency mixing processing on the second signal and the third feedback signal to obtain the third signal vector, and performs frequency mixing processing on the second signal and the fourth feedback signal to obtain the fourth signal vector.

If the first transmission channel and the second transmission channel include a same input port, when the first transmission channel is enabled and the second transmission channel is disabled, the quadrature receiver 3011 may receive the first feedback signal through the first endpoint, and the quadrature receiver 3011 performs frequency mixing processing on the first signal and the first feedback signal to obtain the first signal vector. When the first transmission channel is disabled and the second transmission channel is enabled, the quadrature receiver 3011 may receive the second feedback signal through the first endpoint, and the quadrature receiver 3011 performs frequency mixing processing on the first signal and the second feedback signal to obtain the second signal vector. Similarly, if the first transmission channel and the second transmission channel include a same input port, when the first transmission channel is enabled and the second transmission channel is disabled, the quadrature receiver 3011 may receive the third feedback signal through the second endpoint, and the quadrature receiver 3011 performs frequency mixing processing on the second signal and the third feedback signal to obtain the third signal vector. When the first transmission channel is disabled and the second transmission channel is enabled, the quadrature receiver 3011 may receive the fourth feedback signal through the second endpoint, and the quadrature receiver 3011 performs frequency mixing processing on the second signal and the fourth feedback signal to obtain the fourth signal vector.

Figure 12:
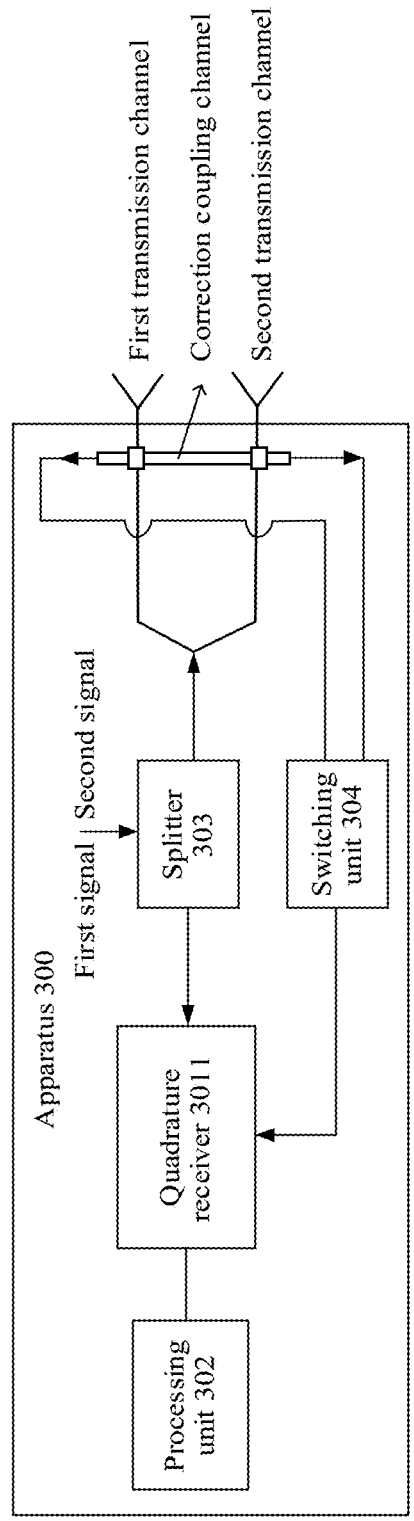
FIG. 12 is a schematic diagram depicting a structure of a tenth apparatus according to an embodiment of this application.

Further, with reference to FIG. 11, refer to FIG. 12. The apparatus further includes a splitter 303, and the splitter 303 is connected to the first transmission channel, the second transmission channel, and the quadrature receiver 3011. The splitter 303 is configured to input the first signal onto the first transmission channel and the quadrature receiver 3011, and input the second signal onto the second transmission channel and the quadrature receiver 3011. The quadrature receiver 3011 is connected to the first endpoint and the second endpoint of the correction coupling channel through the switching unit 304. When the quadrature receiver 3011 is connected to the first endpoint through the switching unit 304, the quadrature receiver 3011 may receive the first feedback signal and the second feedback signal that are output from the first endpoint. When the quadrature receiver 3011 is connected to the second endpoint through the switching unit 304, the quadrature receiver 3011 receives the third feedback signal and the fourth feedback signal that are output from the second endpoint. Optionally, the switching unit 304 may be the three-port switch or the three-port balun shown in FIG. 6. The port IN is connected to the splitter 303, and the port 1 and the port 2 are respectively connected to the first endpoint and the second endpoint.

The apparatus may be a radio frequency signal input apparatus. For example, the apparatus is a radio frequency chip or a radio frequency module. The first signal and the second signal may be external radio frequency signals. For example, the external radio frequency signals may be generated by an external LO. Alternatively, the apparatus further includes a signal generator connected to the splitter 303. The signal generator is configured to generate radio frequency signals, and the radio frequency signals include the first signal and the second signal. Optionally, the signal generator may be an LO.

Alternatively, the apparatus may be an intermediate frequency signal input apparatus. For example, the apparatus includes an intermediate frequency chip or an intermediate frequency module, and may further include a frequency mixer. The frequency mixer is configured to perform frequency mixing processing on an intermediate frequency signal and a correction signal, to obtain the first signal and the second signal. The correction signal may an external signal. For example, the external correction signal may be generated by an external LO. Alternatively, the apparatus further includes a signal generator that is connected to the splitter 303 through the frequency mixer. The signal generator is configured to generate a correction signal. Optionally, the signal generator may be an LO.

Alternatively, the apparatus may be a baseband signal input apparatus. For example, the apparatus includes a baseband chip or a baseband module. The first signal and the second signal are external signals. For example, the first signal and the second signal may be generated by an external LO. Alternatively, the apparatus further includes a signal generator connected to the splitter 303, and the signal generator is configured to generate the first signal and the second signal. Optionally, the signal generator may be an LO.

It should be noted that, when the apparatus is the radio frequency signal input apparatus, the intermediate frequency signal input apparatus, or the baseband signal input apparatus, a connection relationship between the splitter 303 and each of the signal generators is respectively consistent with that between the splitter 205 and each of the signal generator 207, the signal generator 209, and the signal generator 210 shown in FIG. 7 to FIG. 9. For details, refer to related descriptions about FIG. 7 to FIG. 9.

During actual application, the first transmission channel and the second transmission channel may be used as transmit channels or receive channels. The first transmission channel and the second transmission channel each may be switched by using a TRX module. When the TRX module is in a receive (RX) state, the first transmission channel and the second transmission channel are receive channels, or when the TRX module is in a transmit (TX) state, the first transmission channel and the second transmission channel are transmit channels. Therefore, an apparatus for correcting receive channels and an apparatus for correcting transmit channels may be integrated as one entity.

Figure 13:
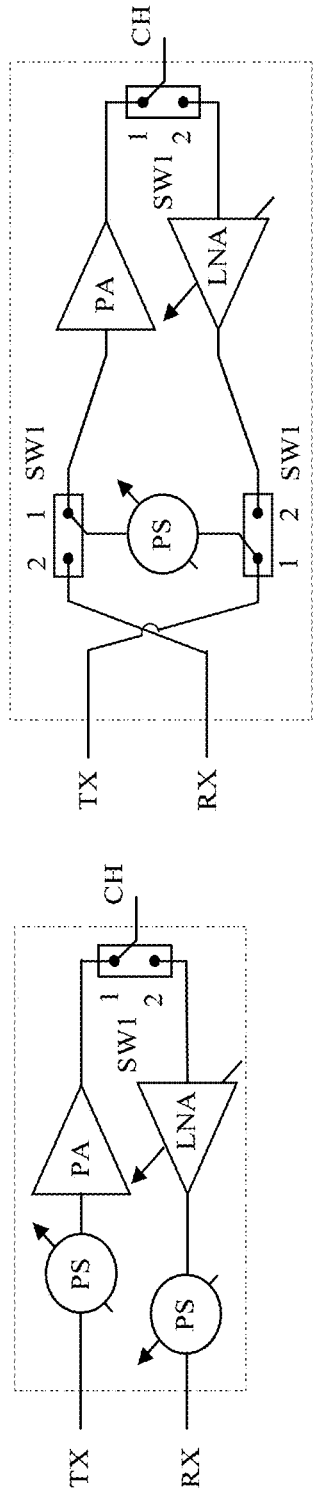
FIG. 13A and FIG. 13B are schematic diagrams depicting structures of transceiver (TRX) modules according to an embodiment of this application.

FIG. 13A and FIG. 13B are schematic diagrams depicting structures of TRX modules. An example in which a transmit channel includes a phase shifter (PS) and a power amplifier (PA), and a receive channel includes a PS and a low noise amplifier (LNA) is used for description. FIG. 13A shows a TRX module of a transmit/receive independent PS. When an SW1 is in a position 1, the TRX module is in a TX state. When the SW1 is in a position 2, the TRX module is in an RX state. SW shown in FIG. 13A and FIG. 13B represents a switch. FIG. 13B shows a TRX module of a transmit/receive shared PS. When a plurality of SW Is each are in a position 1, the TRX module is in a TX state. When the plurality of SW1s each are in a position 2, the TRX module is in an RX state.

Figure 14:
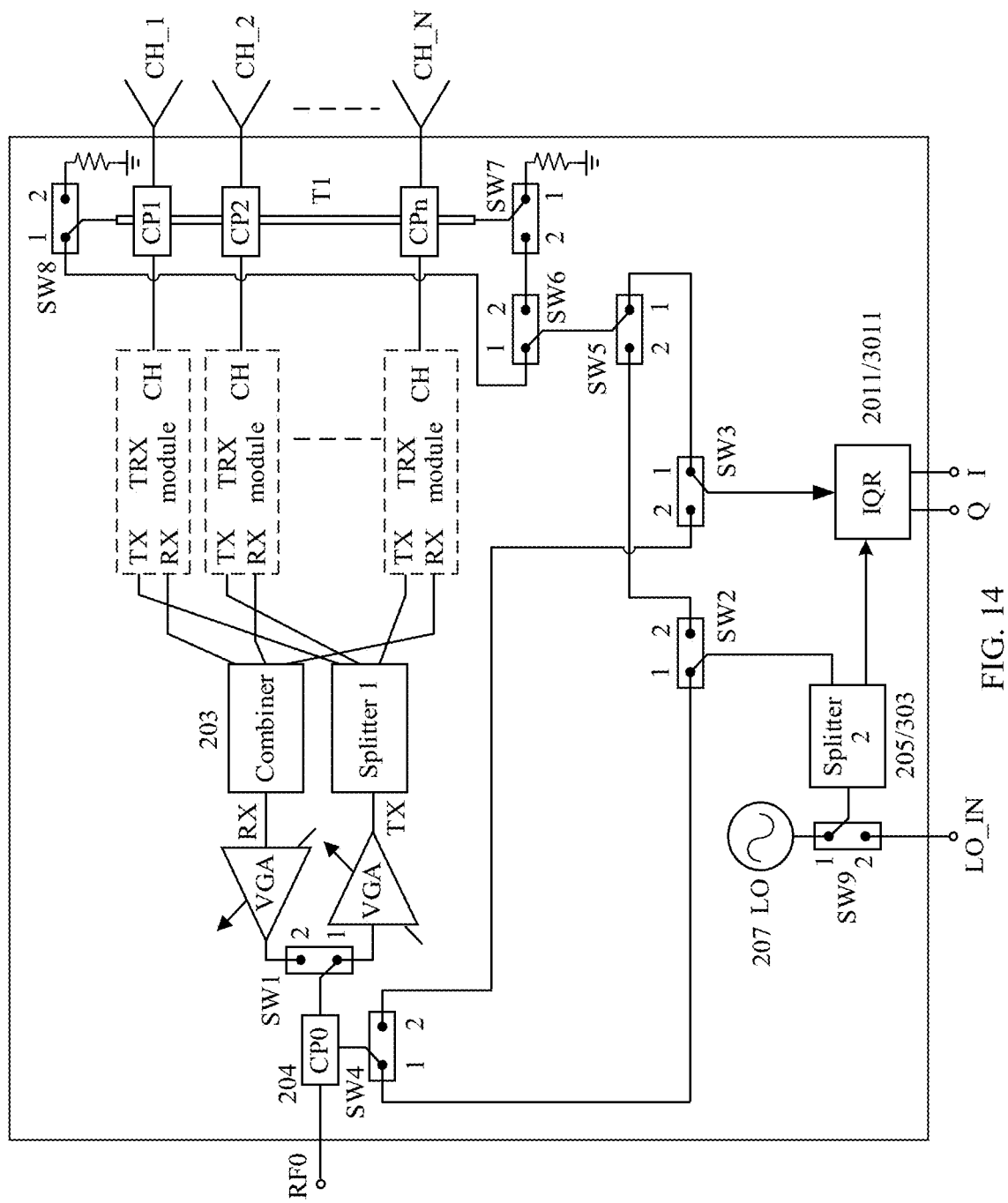
FIG. 14 is a schematic diagram depicting a structure of an eleventh apparatus according to an embodiment of this application.

For example, with reference to FIG. 13A and FIG. 13B, when the apparatus for correcting receive channels and the apparatus for correcting transmit channels each are a radio frequency signal input apparatus, an integrated apparatus may be shown in FIG. 14. In FIG. 14, there are a plurality of SWs (a SW1 to a SW9, where there are a plurality of SW1s, and the plurality of SW1s include the SW1s shown in FIG. 13A and FIG. 13B), IQR represents a quadrature receiver (that is, the quadrature receiver 2011 or 3011), CH_1 to CH_N represent a plurality of transmission channels (for example, CH_1 represents the first transmission channel, and CH_N represents the second transmission channel), T1 represents the correction coupling channel, CP1 may represent the first endpoint, and CPn may represent the second endpoint, and I and Q may represent an I component and a Q component of a signal vector output by the IQR. In FIG. 14, VGA represents a variable gain amplifier (VGA), the switching unit 206 or the switching unit 304 may include a SW6 to a SW8, and RF0 represents an input port of a radio frequency signal.

When the SW1 to an SW5 each are in a position 1, the apparatus is configured to correct a deviation between transmit channels. When the SW6 to the SW8 each are in a position 1, the IQR may receive a feedback signal coupled from the CP1 (that is, detect a feedback signal output from the first endpoint). When the SW6 to the SW8 each are in a position 2, the IQR may receive a feedback signal coupled from the CPn (that is, detect a feedback signal output from the second endpoint). When the SW9 is in a position 1, an LO is configured to input the first signal and the second signal. When the SW9 is in a position 2, the input first signal and second signal are external signals.

When the SW1 to the SW5 each are in a position 2, the apparatus is configured to correct a deviation between receive channels. When the SW6 to the SW8 each are in the position 1, the first signal is coupled from the CP1 (that is, fed from the first endpoint), and the IQR may receive feedback signals from the receive channels CH_1 and CH_N that are coupled from a CP0 (namely, the coupler 204 in FIG. 3). When the SW6 to the SW8 each are in the position 2, the IQR may receive feedback signals from the receive channels CH_1 and CH_N that are coupled from the CP0. When the SW9 is in the position 1, the LO is configured to generate the first signal and the second signal. When the SW9 is in the position 2, the first signal and the second signal are external signals.

Figure 15:
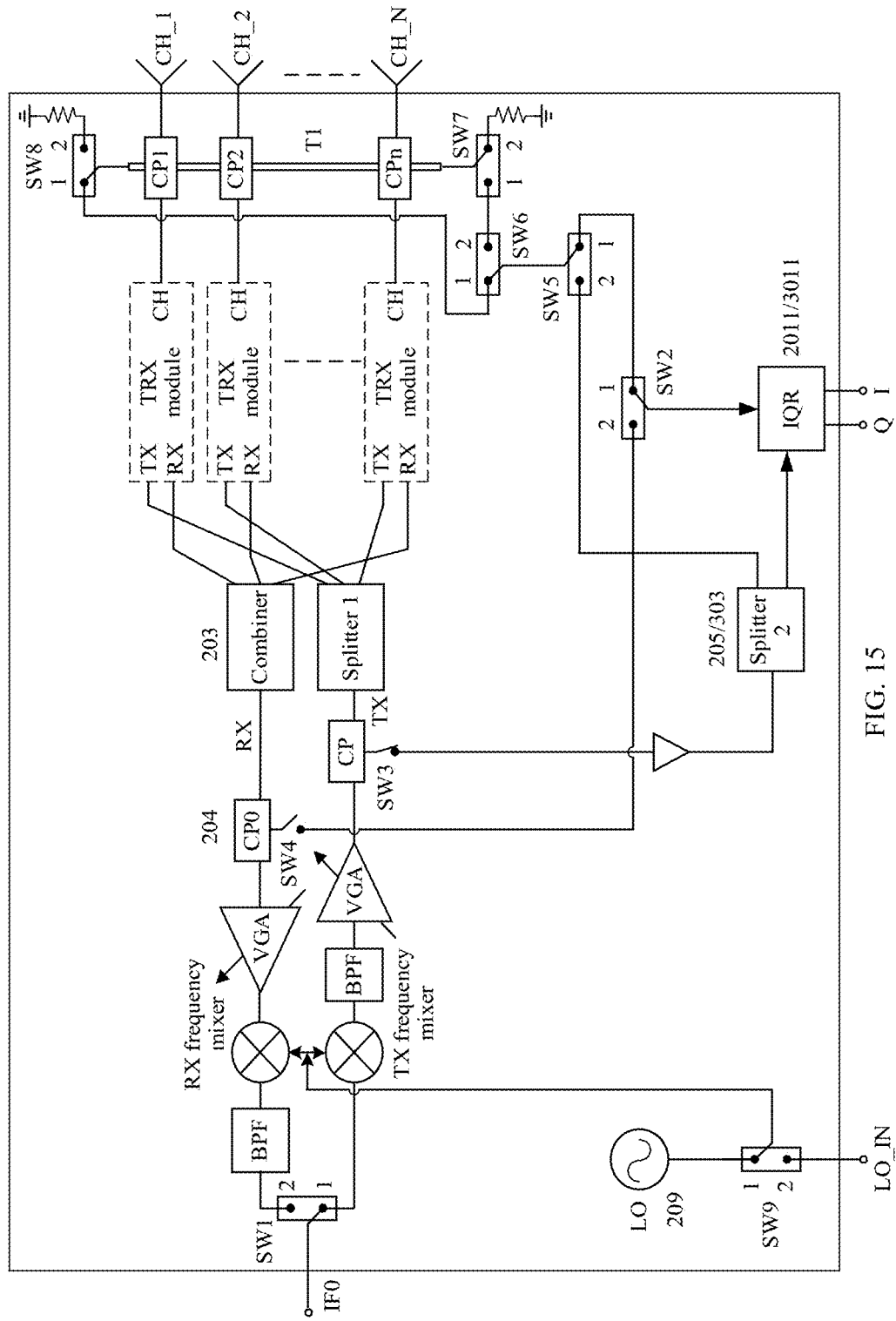
FIG. 15 is a schematic diagram depicting a structure of a twelfth apparatus according to an embodiment of this application.

For example, with reference to FIG. 13A and FIG. 13B, when the apparatus for correcting receive channels and the apparatus for correcting transmit channels each are an intermediate frequency signal input apparatus, an integrated apparatus may be shown in FIG. 15. In FIG. 15, there are a plurality of SWs (a SW1 to a SW9, where there are a plurality of SW1s, and the plurality of SW1s include the SW1s shown in FIG. 13A and FIG. 13B), IQR represents a quadrature receiver (namely, the quadrature receiver 2011 or 3011), CH_1 to CH_N represent a plurality of transmission channels (for example, CH_1 represents the first transmission channel, and CH_N represents the second transmission channel), T1 represents the correction coupling channel, CP1 may represent the first endpoint, and CPn may represent the second endpoint, TX frequency mixer represents a frequency mixer on a transmit channel, and RX frequency mixer represents a frequency mixer on a receive channel, and I and Q may represent an I component and a Q component of a signal vector output by the IQR. In FIG. 15, VGA represents a VGA, the switching unit 206 or the switching unit 304 may include a SW6 to a SW8, and IF0 represents an input port of an intermediate frequency signal.

When the SW1, a SW2, and a SW5 each are in a position 1, a SW3 is closed, and a SW4 is open, the apparatus is configured to correct a deviation between transmit channels. When the SW6 to the SW8 each are in a position 1, the IQR may receive a feedback signal coupled from the CP1 (that is, detect a feedback signal output from the first endpoint). When the SW6 to the SW8 each are in a position 2, the IQR may receive a feedback signal coupled from the CPn (that is, detect a feedback signal output from the second endpoint). When the SW9 is in a position 1, an LO is configured to generate a correction signal, and the TX frequency mixer inputs the first signal and the second signal to the transmit channels CH_1 and CH_N after processing an intermediate frequency signal and the correction signal. When the SW9 is in a position 2, a correction signal used by the TX frequency mixer is an external signal.

When the SW1, the SW2, and the SW5 each are in a position 2, and the SW3 and the SW4 are both closed, the apparatus is configured to correct a deviation between receive channels. When the SW6 to the SW8 each are in the position 1, the first signal is coupled from the CP1 (that is, fed from the first endpoint), and the IQR may receive feedback signals from the receive channels CH_1 and CH_N that are coupled from a CP0. When the SW6 to the SW8 each are in the position 2, the IQR may receive feedback signals from the receive channels CH_1 and CH_N. When the SW9 is in the position 1, the LO is configured to generate a correction signal, and the RX frequency mixer inputs the first signal and the second signal after processing an intermediate frequency signal and the correction signal. When the SW9 is in the position 2, a correction signal used by the RX frequency mixer is an external signal.

Figure 16:
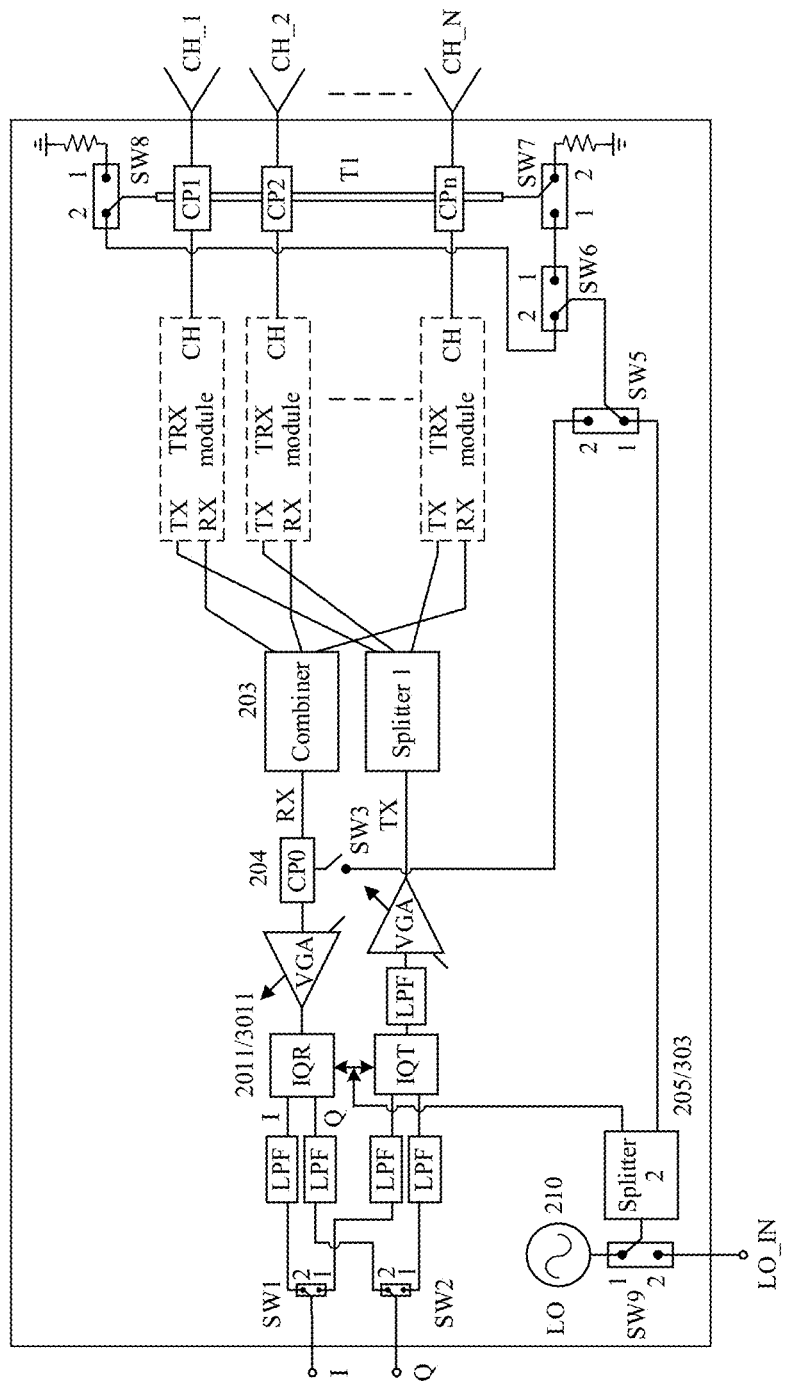
FIG. 16 is a schematic diagram depicting a structure of a thirteenth apparatus according to an embodiment of this application.

For example, with reference to FIG. 13A and FIG. 13B, when the apparatus for correcting receive channels and the apparatus for correcting transmit channels each are a baseband signal input apparatus, an integrated apparatus may be shown in FIG. 16. In FIG. 16, there are a plurality of SWs (a SW1 to a SW3 and a SW5 to a SW9, where there are a plurality of SW1s, and the plurality of SW1s include the SW1s shown in FIG. 13A and FIG. 13B), IQR represents a quadrature receiver, CH_1 to CH_N represent a plurality of transmission channels (for example, CH_1 represents the first transmission channel, and CH_N represents the second transmission channel), T1 represents the correction coupling channel, and CP1 may represent the first endpoint, and CPn may represent the second endpoint. In FIG. 16, LPF represents a low pass filter, IQT represents a quadrature transmitter, where I and Q may represent an I component and a Q component of a signal vector output by the IQR, or an I component and a Q component of a signal vector input into the IQT, and VGA represents a variable gain amplifier. The LPF, IQT, and IQR may be components in a baseband part. In this embodiment of this application, the IQR in the baseband part may be reused for correcting a deviation between transmission channels. The switching unit 206 or the switching unit 304 may include the SW6 to the SW8.

When the SW1, the SW2, and the SW5 each are in a position 1, and the SW3 is closed, the apparatus is configured to correct a deviation between transmit channels. When the SW6 to the SW8 each are in a position 1, the IQR may receive a feedback signal coupled from the CP1 (that is, detect a feedback signal output from the first endpoint). When the SW6 to the SW8 each are in a position 2, the IQR may receive a feedback signal coupled from the CPn (that is, detect a feedback signal output from the second endpoint). When the SW9 is in a position 1, an LO is configured to input the first signal and the second signal. When the SW9 is in a position 2, the input first signal and second signal are external signals.

When the SW1, the SW2, and the SW5 each are in a position 2, and the SW3 is open, the apparatus is configured to correct a deviation between receive channels. When the SW6 to the SW8 each are in the position 1, the first signal is coupled from the CP1 (that is, fed from the first endpoint), and the IQR may receive feedback signals from the receive channels CH_1 and CH_N. When the SW6 to the SW8 each are in the position 2, the second signal is coupled from the CPn (that is, fed from the second endpoint), and the IQR may receive feedback signals from the receive channels CH_1 and CH_N. When the SW9 is in the position 1, the LO is configured to generate the first signal and the second signal. When the SW9 is in the position 2, the first signal and the second signal are external signals.

Further, as shown in FIG. 17A and FIG. 17B, an apparatus 400 (the apparatus 400 may be the individual apparatus 200 or the individual apparatus 300, or may be an apparatus into which the apparatus 200 and the apparatus 300 are integrated) may be integrated into a semiconductor chip. A plurality of transmission channels may also be integrated into a semiconductor chip. The apparatus 400 and the plurality of transmission channels may be integrated into a same semiconductor chip or different semiconductor chips. FIG. 17A is a schematic diagram in which the apparatus 400 and the plurality of transmission channels are integrated into a semiconductor chip 0. FIG. 17B is a schematic diagram in which the apparatus 400 is integrated into a semiconductor chip 1, and the plurality of transmission channels are integrated into a semiconductor chip 2.

Further, the apparatus 400 may be alternatively integrated into a wireless communications device. For example, the wireless communications device may be a base station or a terminal. When the wireless communications device is a base station, a semiconductor chip into which a plurality of to-be-corrected transmission channels are integrated may be located outside the wireless communications device. When the wireless communications device is a terminal, the apparatus 400 and the plurality of transmission channels may be both integrated into the terminal, and may be integrated into a same semiconductor chip or different semiconductor chips.

In the foregoing solution, a transmission deviation of feedback signals on a correction coupling channel may be cancelled based on a characteristic that directions of the feedback signals transmitted are opposite on the correction coupling channel, thereby improving correction accuracy.

In conventional technologies, a large quantity of transmission channels is integrated into a radio frequency chip. For example, in the AOB and AIP combinations shown in FIG. 1A and FIG. 1B, 4×4 transmission channels are integrated into the radio frequency chip. Each transmission channel corresponds to one antenna (ANT), for receiving and transmission of a radio frequency signal.

Antennas are distributed on a chip (or a PCB) in different forms. To be specific, in the AOB combination, the antenna may have different distributions on the PCB, and in the AIP combination, the antenna may have different distributions on the chip. Further, the chip (or the PCB) may be considered as a quadrilateral, and all antennas may be distributed on one side of the quadrilateral (the chip or the PCB), or two parallel sides of the quadrilateral (the chip or the PCB), or all of the four sides of the quadrilateral (the chip or the PCB).

It should be noted that antennas are generally distributed near a side of the chip (or the PCB), that is, the antennas and a side of the quadrilateral (the chip or the PCB) may overlap in spatial positions, or the antennas are close to the side of the quadrilateral (the chip or the PCB). In both cases, it may be considered that the antennas are distributed on one or more sides of the quadrilateral (that is, the chip or the PCB).

Figure 18B:
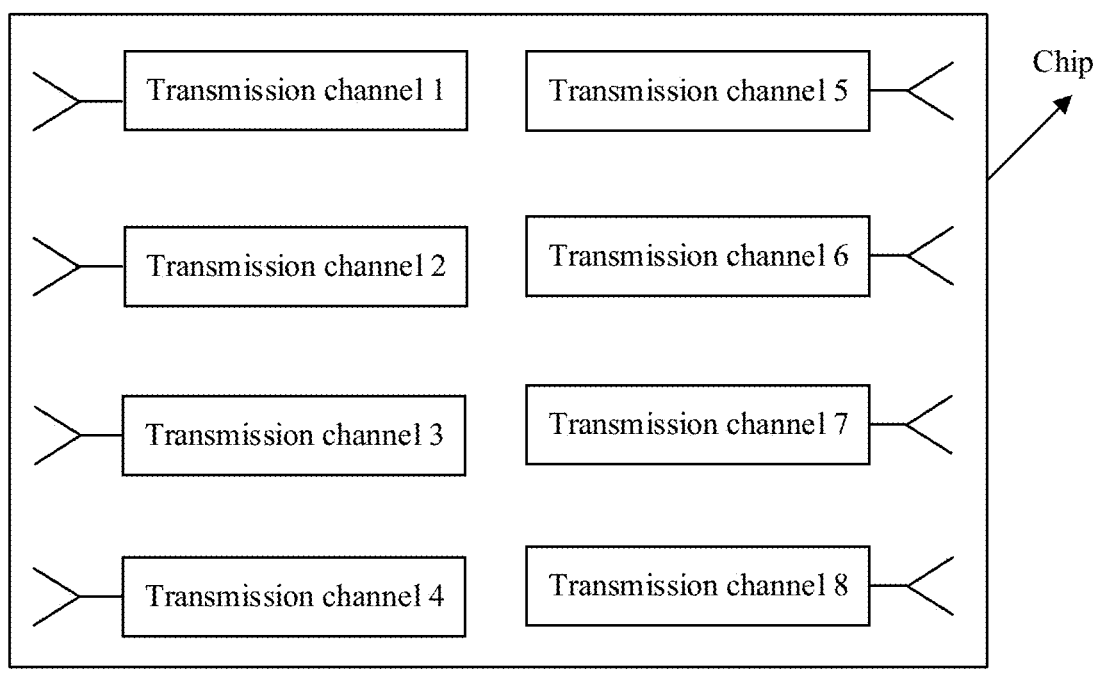
Figure 18C:
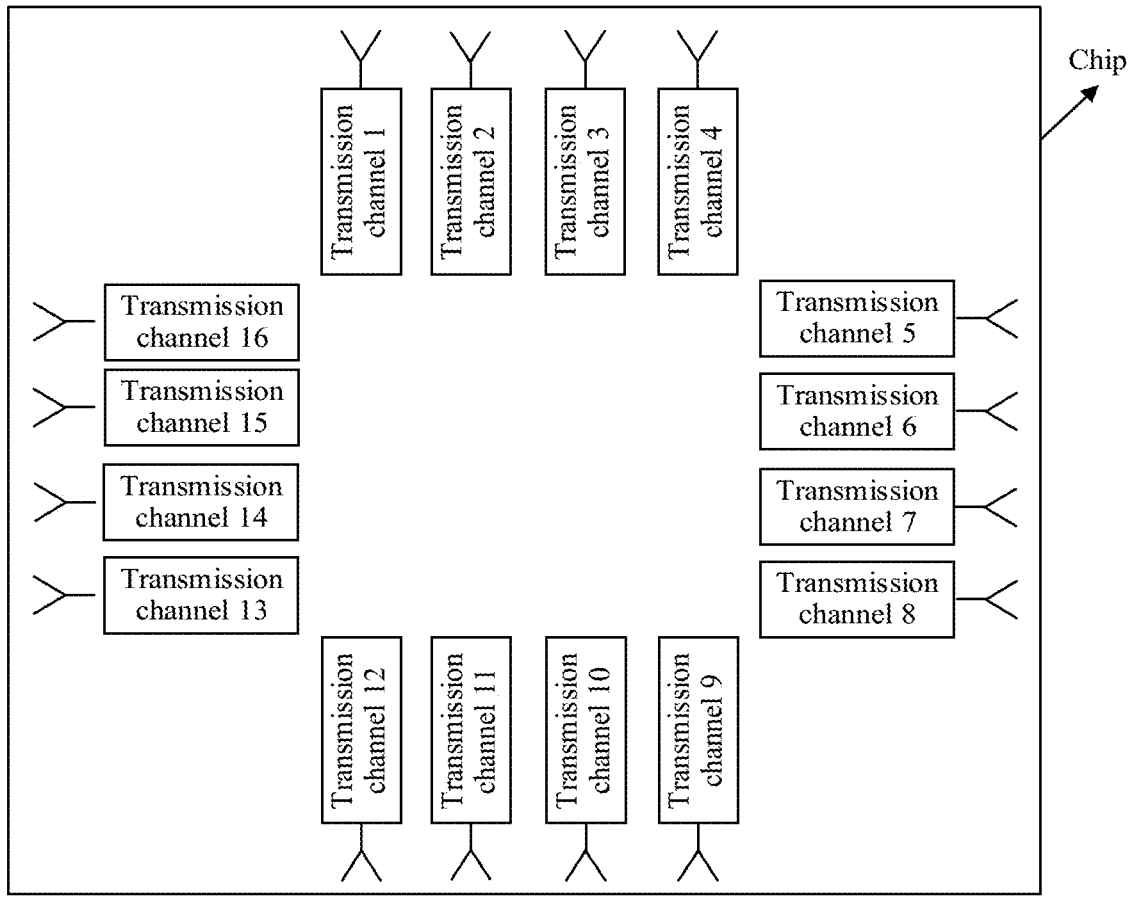

For example, if the chip and the antenna use the AOB combination, in a possible example, an antenna array including four antennas may be all distributed on one side of the AOB, as shown in FIG. 18A. In another possible example, an antenna array including eight antennas may be evenly distributed on two parallel sides of the PCB, and four antennas are distributed on each of the sides, as shown in FIG. 18B. In still another possible example, an antenna array including 16 antennas may be evenly distributed on four sides of the PCB, and four antennas are distributed on each of the sides, as shown in FIG. 18C.

In the example shown in FIG. 18A, if calibration is performed between transmission channels by using the foregoing solution, an error resulting from signal transmission attenuation on a coupling cable is small because a length of a correction coupling channel that needs to be laid is short. However, in the examples shown in FIG. 18B and FIG. 18C, because antennas are distributed on a plurality of sides of the PCB, a length of a correction coupling channel that needs to be laid is long as a plurality of antennas need to be connected. Consequently, signal transmission attenuation on a coupling cable greatly affects a relative deviation correction value between transmission channels, and accuracy of a calibration result is affected.

In addition, mm waves are used as a signal carrier in a 5G communications system. Transmission and reception of a millimeter wave signal may be implemented by using a plurality of antenna modules, and each antenna module may be considered as a micro antenna array. Further, a plurality of antenna modules may be distributed in different positions of a mainboard of a wireless communications device (for example, a terminal). Therefore, when a transmission channel 1 in an antenna module 1 and a transmission channel 2 in an antenna module 2 are calibrated, because the transmission channel 1 and the transmission channel 2 are located in different positions of a mainboard, a distance between the transmission channel 1 and the transmission channel 2 is long (that is, a distance between an antenna corresponding to the transmission channel 1 and an antenna corresponding to the transmission channel 2 is long). When the transmission channel 1 and the transmission channel 2 are calibrated by using the foregoing solution, transmission attenuation on a coupling cable greatly affects a relative deviation correction value between transmission channels as the coupling cable that needs to be laid along the mainboard is long, and accuracy of a calibration result is affected.

For the case in which a distance between transmission channels is long, an embodiment of this application provides another apparatus for correcting a deviation between a plurality of transmission channels, to accurately calibrate the transmission channels.

The following describes in detail the calibration solution provided in this embodiment of this application with reference to the accompanying drawings.

Figure 19:
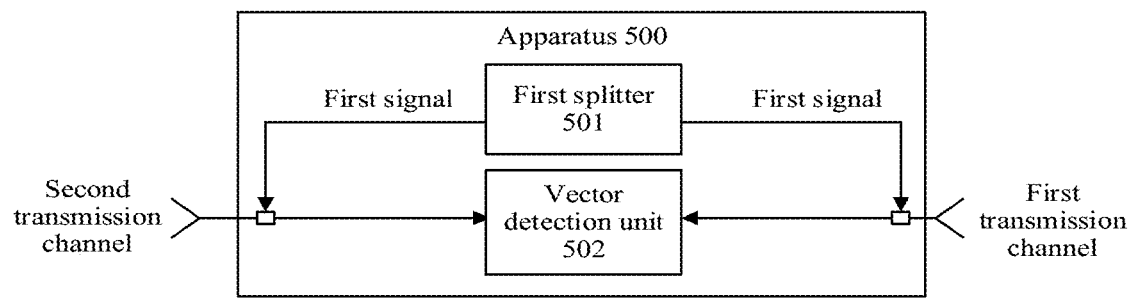
FIG. 19 is a schematic diagram depicting a structure of a fourteenth apparatus according to an embodiment of this application.

FIG. 19 is another apparatus for correcting a deviation between a plurality of transmission channels according to an embodiment of this application. The plurality of transmission channels includes a first transmission channel and a second transmission channel, and the first transmission channel and the second transmission channel are both receive channels. As shown in FIG. 19, the apparatus 500 includes a first splitter 501 and a vector detection unit 502.

The first splitter 501 is configured to feed a first signal onto the first transmission channel and the second transmission channel, where the first splitter 501 is located in a symmetrical position between the first transmission channel and the second transmission channel.

The vector detection unit 502 is configured to when the first splitter 501 feeds the first signal, detect a first signal vector based on a first feedback signal from the first transmission channel, and detect a second signal vector based on a second feedback signal from the second transmission channel, where the first signal vector and the second signal vector are used to determine a first deviation correction value between the first transmission channel and the second transmission channel, and the first deviation correction value is used to correct a deviation between the first transmission channel and the second transmission channel.

The vector detection unit 502 may be a unit configured to detect a signal amplitude and/or a signal phase, where the signal amplitude and the signal phase may constitute a vector. Optionally, the vector detection unit 502 may output two component signals. The two component signals may be used to determine the signal amplitude and the signal phase. For a manner in which the vector detection unit 502 determines a signal amplitude A and a signal phase θ, refer to related descriptions of the vector detection unit 201. Details are not described herein again. In addition, similar to the vector detection unit 201, the vector detection unit 502 may detect each received feedback signal once or for a plurality of times.

Figure 20:
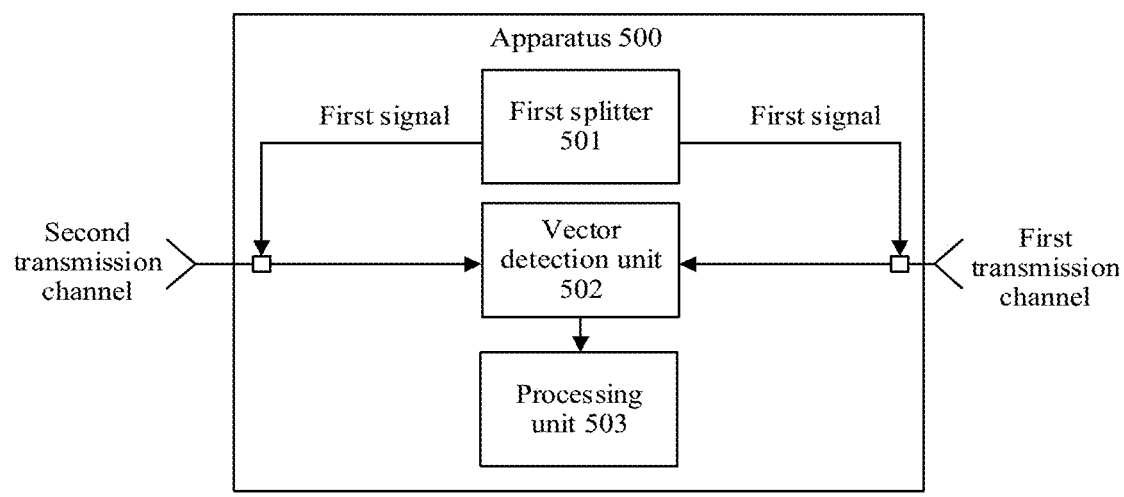
FIG. 20 is a schematic diagram depicting a structure of a fifteenth apparatus according to an embodiment of this application.

Further, the apparatus 500 may further include a processing unit 503, as shown in FIG. 20. The processing unit 503 is configured to determine the first deviation correction value based on the first signal vector and the second signal vector.

When each detected signal vector includes one signal vector, the processing unit 503 may determine the first deviation correction value based on one first signal vector and one second signal vector. When each detected signal vector includes a plurality of signal vectors, the processing unit 503 may determine the first deviation correction value based on a plurality of first signal vectors and a plurality of second signal vectors.

In addition, each signal vector may include amplitude information and phase information. The first deviation correction value may include an amplitude correction value between the first transmission channel and the second transmission channel and a phase correction value between the first transmission channel and the second transmission channel. The processing unit 503 may determine the amplitude correction value based on amplitude information in the detected signal vectors, and may determine the phase correction value based on phase information in the detected signal vectors.

As described above, a transmission channel (for example, the first transmission channel, the second transmission channel, a third transmission channel, or a fourth transmission channel) may include a plurality of components such as a phase shifter, a power amplifier, a low noise amplifier, and a filter. Therefore, a position of a transmission channel cannot be simply defined as a point. In this embodiment of this application, the position of the transmission channel may be understood as a position of an antenna corresponding to the transmission channel.

In the apparatus 500, the description that the first splitter 501 is located in a symmetrical position between the first transmission channel and the second transmission channel may be understood as follows. Assuming that the first transmission channel corresponds to a first antenna, and the second transmission channel corresponds to a second antenna, the first combiner 501 may be located on a perpendicular bisector of a line connecting the first antenna and the second antenna, that is, the first antenna and the second antenna are symmetrically distributed on two sides of the perpendicular bisector. In addition, in this embodiment of this application, for understanding a description that another combiner/splitter is located in a symmetrical position between two transmission channels, refer to the foregoing explanation. Details are not described hereinafter.

Because the first splitter 501 is located in the symmetrical position between the first transmission channel and the second transmission channel, during transmission of the first signal, it may be considered that the first signal transmitted from the first splitter 501 to the first transmission channel and the first signal transmitted from the first splitter 501 to the second transmission channel have a same degree of attenuation. Therefore, the processing unit 503 may subtract an amplitude component in the first signal vector from an amplitude component in the second signal vector to obtain the amplitude correction value in the first deviation correction value, and subtract a phase component in the first signal vector from a phase component in the second signal vector to obtain a phase correction value in the first deviation correction value.

For ease of understanding, an example in which each signal vector is detected once is used for description herein. If the first signal vector is $(A_1, \theta_1)$, and the second signal vector is $(A_2, \theta_2)$, the processing unit 503 may determine the amplitude correction value $\Delta A_{12}$ in the first deviation correction value based on $A_1$ and $A_2$, and determine the phase correction value $\Delta \theta_{12}$ in the first deviation correction value based on $\theta_1$ and $\theta_2$. For example, the processing unit 503 may determine $\Delta A_{12}$ according to the following Formula (5), and may determine $\Delta \theta_{12}$ according to the following Formula (6).

$$\Delta A_{12} = A_2 - A_1, \text{ and} \qquad (5)$$

$$\Delta \theta_{12} = \theta_2 - \theta_1. \qquad (6)$$

The foregoing Formulas (5) and (6) are merely examples. The processing unit 503 may alternatively determine, based on the detected signal vectors in another manner, the amplitude correction value and the phase correction value between the first transmission channel and the second transmission channel.

After the amplitude correction value and the phase correction value between the first transmission channel and the second transmission channel are determined, the first transmission channel or the second transmission channel may be compensated based on the amplitude correction value, to correct an amplitude deviation between the first transmission channel and the second transmission channel, and/or the first transmission channel or the second transmission channel may be compensated based on the phase correction value, to correct a phase deviation between the first transmission channel and the second transmission channel. For example, a PS is disposed on the first transmission channel and/or the second transmission channel, and the amplitude correction value and the phase correction value between the first transmission channel and the second transmission channel are set by using the PS.

In this embodiment of this application, when the first transmission channel and the second transmission channel are both receive channels, the first splitter 501 located in the symmetrical position between the first transmission channel and the second transmission channel feeds the first signal onto the first transmission channel and the second transmission channel. Because of the position relationship between the first splitter 501 and the two transmission channels, the first signal transmitted from the first splitter 501 to the first transmission channel and the first signal transmitted from the first splitter 501 to the second transmission channel have a same degree of attenuation. In other words, feedback signals output by the first transmission channel and the second transmission channel do not have deviations resulting from path losses. Therefore, directly determining the first deviation correction value between the first transmission channel and the second transmission channel based on detected signal vectors of feedback signals can improve accuracy of correction between receive channels.

The plurality of transmission channels may further include a first correction coupling channel and a second correction coupling channel. A first endpoint of the first correction coupling channel is connected to the first transmission channel, and a second endpoint of the second correction coupling channel is connected to the second transmission channel. The first splitter 501 is further configured to feed the first signal onto the first transmission channel through the first endpoint, and feed the first signal onto the second transmission channel through the second endpoint.

In other words, different from the first transmission channel and the second transmission channel in the foregoing apparatus 200 and apparatus 300, the first transmission channel and the second transmission channel are not connected to one correction coupling channel, but are connected to two different correction coupling channels respectively. In this manner, a length of the correction coupling channel can be reduced, so that a large error resulting from severe signal attenuation on a transmission cable can be avoided when two transmission channels far away from each other are calibrated.

The description that the first splitter 501 is located in a symmetrical position between the first transmission channel and the second transmission channel may be understood as follows. A first distance between the first splitter and the first endpoint is (approximately) equal to a second distance between the first splitter and the second endpoint on a transmission path of the first signal. When the first distance is (approximately) equal to the second distance, it may be considered that the first signal transmitted from the first splitter 501 to the first transmission channel and the first signal transmitted from the first splitter 501 to the second transmission channel have a same degree of attenuation.

Figure 21:
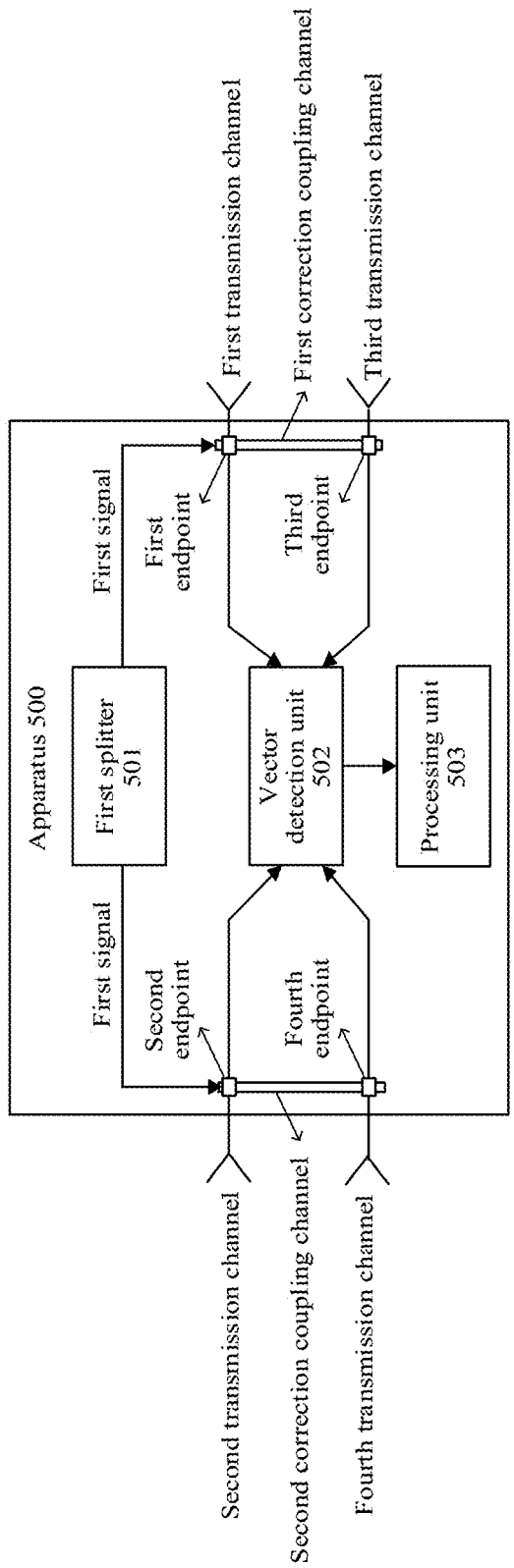
FIG. 21 is a schematic diagram depicting a structure of a sixteenth apparatus according to an embodiment of this application.

The plurality of transmission channels further include a third transmission channel and a fourth transmission channel. As shown in FIG. 21, a third endpoint of the first correction coupling channel is connected to the third transmission channel, and a fourth endpoint of the second correction coupling channel is connected to the fourth transmission channel. The first correction coupling channel feeds the first signal onto the third transmission channel through the third endpoint, and the second correction coupling channel feeds the first signal onto the fourth transmission channel through the fourth endpoint. The first splitter 501 is also located in a symmetrical position between the third transmission channel and the fourth transmission channel.

The vector detection unit 502 is further configured to, when the first signal is fed onto the third transmission channel, detect a third signal vector based on a third feedback signal from the third transmission channel, and when the first signal is fed onto the fourth transmission channel, detect a fourth signal vector based on a fourth feedback signal from the fourth transmission channel. The third signal vector and the fourth signal vector are used to determine a second deviation correction value between the third transmission channel and the fourth transmission channel. The second deviation correction value is used to correct a deviation between the third transmission channel and the fourth transmission channel.

That is, in the apparatus 500, each correction coupling channel may be connected to a plurality of transmission channels. Because the first splitter 501 is also located in the symmetrical position between the third transmission channel and the fourth transmission channel, the third transmission channel and the fourth transmission channel may also be calibrated in the same manner of calibrating the deviation between the first transmission channel and the second transmission channel.

If the four transmission channels need to be calibrated, the apparatus 500 shown in FIG. 21 also needs to calibrate the first transmission channel and the third transmission channel, and calibrate the second transmission channel and the fourth transmission channel, in addition to calibrating the first transmission channel and the second transmission channel, and calibrating the third transmission channel and the fourth transmission channel.

Figure 22:
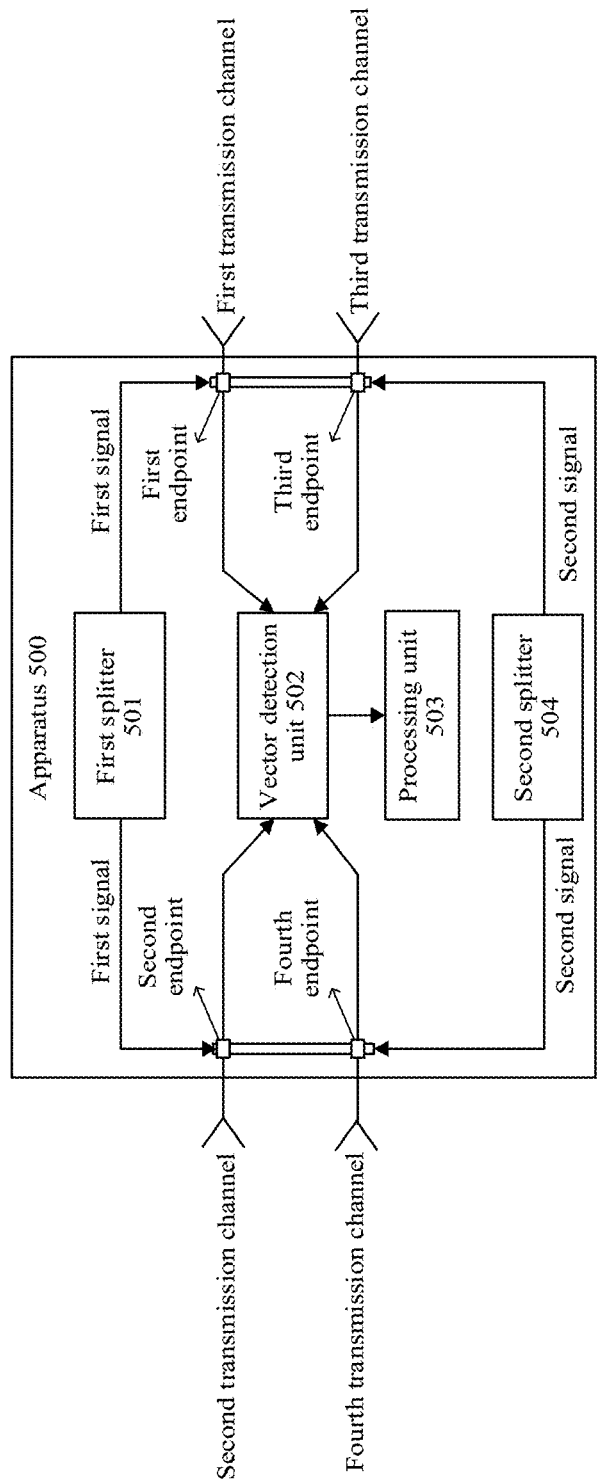
FIG. 22 is a schematic diagram depicting a structure of a seventeenth apparatus according to an embodiment of this application.

As shown in FIG. 22, the apparatus 500 further includes a second splitter 504 configured to feed a second signal onto the third transmission channel through the third endpoint, and feed the second signal onto the fourth transmission channel through the fourth endpoint. The second splitter 504 is located in a symmetrical position between the third transmission channel and the fourth transmission channel. The first correction coupling channel feeds the second signal onto the first transmission channel through the first endpoint, and the second correction coupling channel feeds the second signal onto the second transmission channel through the second endpoint.

The vector detection unit 502 is further configured to, when the second splitter 504 feeds the second signal, detect a fifth signal vector based on a fifth feedback signal from the first transmission channel, detect a sixth signal vector based on a sixth feedback signal from the second transmission channel, detect a seventh signal vector based on a seventh feedback signal from the third transmission channel, and detect an eighth signal vector based on an eighth feedback signal from the fourth transmission channel. Transmission directions of the third feedback signal and the fifth feedback signal are opposite on the first correction coupling channel, and transmission directions of the fourth feedback signal and the sixth feedback signal are opposite on the second correction coupling channel. The first signal vector, the third signal vector, the fifth signal vector, and the seventh signal vector are used to correct a deviation between the first transmission channel and the third transmission channel. The second signal vector, the fourth signal vector, the sixth signal vector, and the eighth signal vector are used to correct a deviation between the second transmission channel and the fourth transmission channel.

Because the transmission directions of the third feedback signal and the fifth feedback signal are opposite on the first correction coupling channel, a deviation correction value between the first transmission channel and the third transmission channel may be directly obtained by cancelling a transmission deviation of the first correction coupling channel. Similarly, because the transmission directions of the fourth feedback signal and the sixth feedback signal are opposite on the second correction coupling channel, a deviation correction value between the second transmission channel and the fourth transmission channel may be directly obtained by cancelling a transmission deviation of the second correction coupling channel.

For a manner of correcting the first transmission channel and the third transmission channel by the apparatus 500, and for a manner of correcting the second transmission channel and the fourth transmission channel by the apparatus 500, refer to the manner of correcting the first transmission channel and the second transmission channel by the foregoing apparatus 200. Details are not described herein again.

Figure 23:
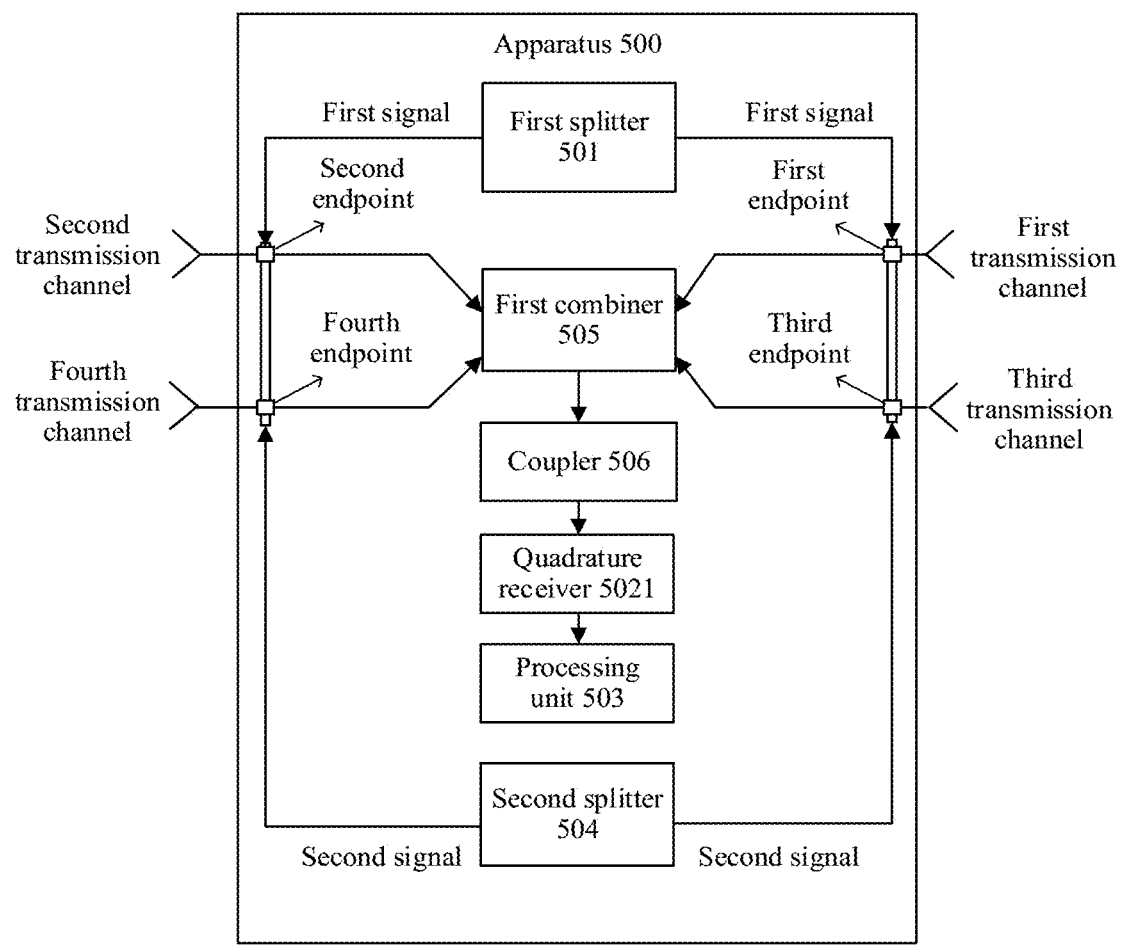
FIG. 23 is a schematic diagram depicting a structure of an eighteenth apparatus according to an embodiment of this application.

Further, in the apparatus 500 shown in FIG. 22, the vector detection unit 502 may include a quadrature receiver 5021. The first transmission channel, the second transmission channel, the third transmission channel, and the fourth transmission channel are combined by using a first combiner 505. The quadrature receiver 5021 is connected to the first combiner 505 through a coupler 506, as shown in FIG. 23.

When the first signal is fed into the first endpoint and the second endpoint, the quadrature receiver 5021 performs frequency mixing processing on the first signal and the first feedback signal, the first signal and the second feedback signal, the first signal and the third feedback signal, and the first signal and the fourth feedback signal, to obtain the first signal vector, the second signal vector, the third signal vector, and the fourth signal vector respectively. When the second signal is fed into the third endpoint and the fourth endpoint, the quadrature receiver 5021 performs frequency mixing processing on the second signal and the fifth feedback signal, the second signal and the sixth feedback signal, the second signal and the seventh feedback signal, and the second signal and the eighth feedback signal, to obtain the fifth signal vector, the sixth signal vector, the seventh signal vector, and the eighth signal vector respectively.

When the first signal is fed, the first transmission channel, the second transmission channel, the third transmission channel, and the fourth transmission channel may be alternately enabled (in other words, at each moment, only one transmission channel is enabled and the other transmission channels are disabled). In this case, the vector detection unit 502 may include one quadrature receiver 5021. The quadrature receiver 5021 is configured to receive, in time division mode, the first feedback signal, the second feedback signal, the third feedback signal, and the fourth feedback signal that are coupled by the coupler 506 from the first combiner 505, and perform frequency mixing processing on the first signal and each of the four feedback signals, to obtain the first signal vector, the second signal vector, the third signal vector, and the fourth signal vector respectively. Alternatively, the first transmission channel, the second transmission channel, the third transmission channel, and the fourth transmission channel may be all enabled. In this case, the vector detection unit 502 may include four quadrature receivers 5021 configured to respectively receive the first feedback signal, the second feedback signal, the third feedback signal, and the fourth feedback signal that are coupled by the coupler 506 from the first combiner 505. Each of the quadrature receivers 5021 performs frequency mixing processing on the first signal and one of the feedback signals. The first signal vector, the second signal vector, the third signal vector, and the fourth signal vector are obtained through processing by the four quadrature receivers 5021.

Similarly, when the second signal is fed, the first transmission channel, the second transmission channel, the third transmission channel, and the fourth transmission channel may be alternately enabled (in other words, at each moment, only one transmission channel is enabled and the other transmission channels are disabled). In this case, the vector detection unit 502 may include one quadrature receiver 5021. The quadrature receiver 5021 is configured to receive, in time division mode, the fifth feedback signal, the sixth feedback signal, the seventh feedback signal, and the eighth feedback signal that are coupled by the coupler 506 from the first combiner 505, and perform frequency mixing processing on the second signal and each of the four feedback signals, to obtain the fifth signal vector, the sixth signal vector, the seventh signal vector, and the eighth signal vector respectively. Alternatively, the first transmission channel, the second transmission channel, the third transmission channel, and the fourth transmission channel may be all enabled. In this case, the vector detection unit 502 may include four quadrature receivers 5021 configured to respectively receive the fifth feedback signal, the sixth feedback signal, the seventh feedback signal, and the eighth feedback signal that are coupled by the coupler 506 from the first combiner 505. Each of the quadrature receivers 5021 performs frequency mixing processing on the second signal and one of the feedback signals. The fifth signal vector, the sixth signal vector, the seventh signal vector, and the eighth signal vector are obtained through processing by the four quadrature receivers 5021.

Certainly, in this embodiment of this application, a specific form of the vector detection unit 502 is not limited to a quadrature receiver. The foregoing quadrature receiver is merely a specific example of the vector detection unit 502. In another implementation, the vector detection unit 502 may be alternatively implemented by using a phase detector (PD).

Figure 24:
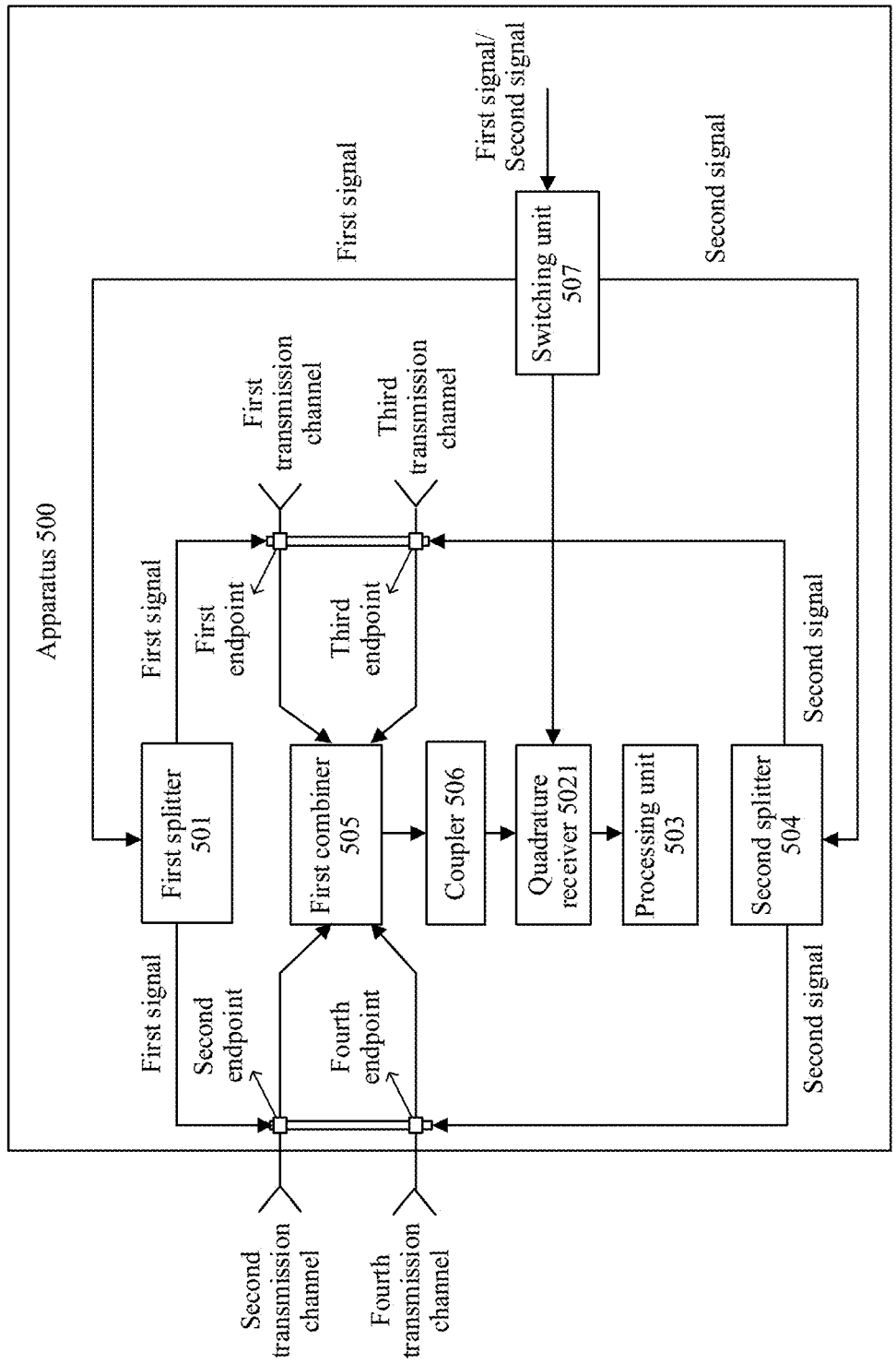
FIG. 24 is a schematic diagram depicting a structure of a nineteenth apparatus according to an embodiment of this application.

Further, with reference to FIG. 23, as shown in FIG. 24, the apparatus 500 may further include a switching unit 507 configured to receive the first signal and the second signal, and output the first signal to the first splitter 501 and the quadrature receiver 5021, or output the second signal to the second splitter 504 and the quadrature receiver 5021.

The switching unit 507 may implement that the first signal is input into the first splitter 501, or implement that the second signal is input into the second splitter 504, so that signals are fed from different endpoints of a correction coupling channel, and deviations between transmission channels are calibrated based on feedback signals output by the four transmission channels.

Figure 25:
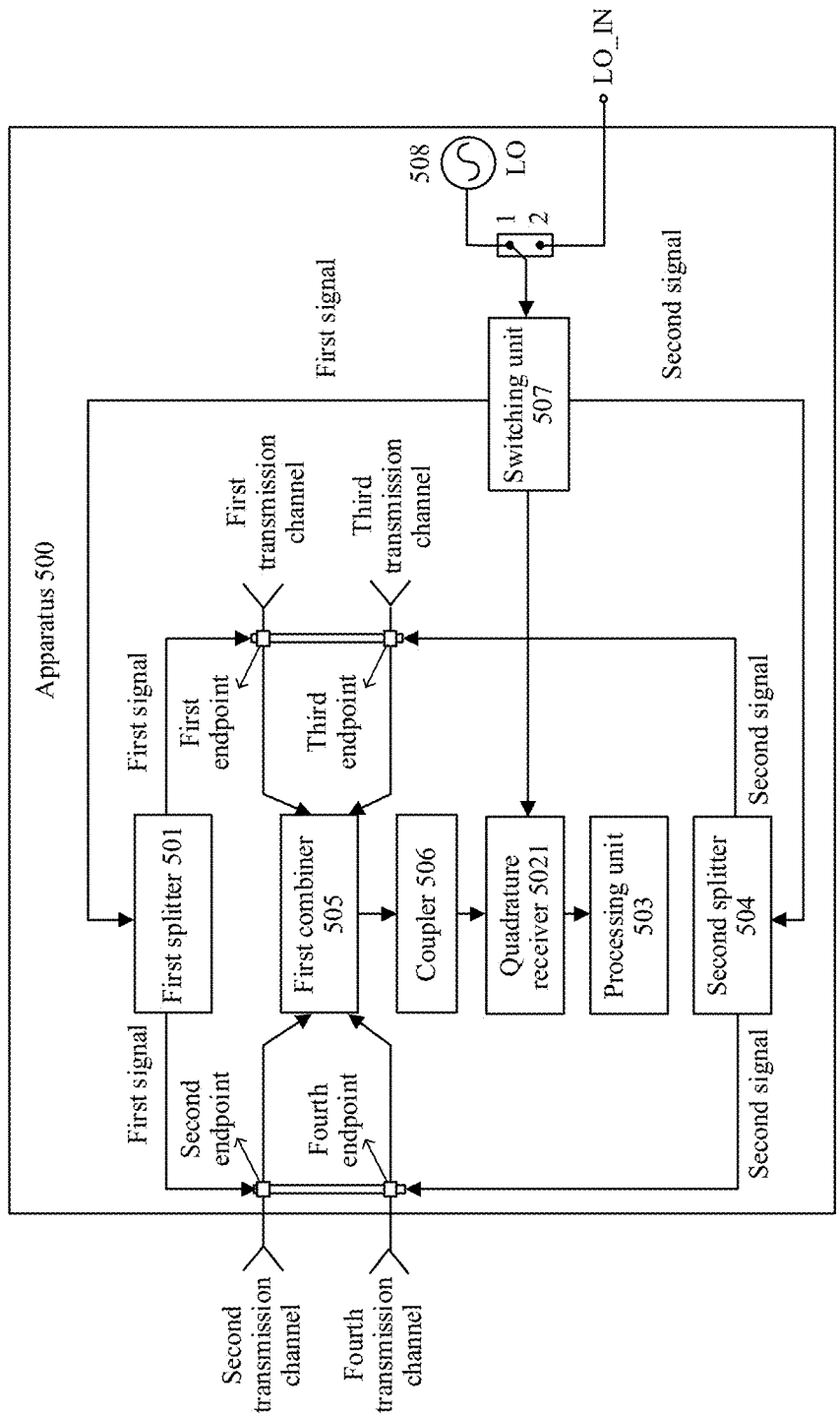
FIG. 25 is a schematic diagram depicting a structure of a twentieth apparatus according to an embodiment of this application.

Similar to the apparatus 200 or the apparatus 300, with reference to FIG. 24, as shown in FIG. 25, the apparatus 500 may be a radio frequency signal input apparatus. For example, the apparatus 500 is a radio frequency chip or a radio frequency module. The first signal and the second signal may be external radio frequency signals. For example, the external radio frequency signals may be generated by an external LO. Alternatively, the apparatus 500 further includes a signal generator 508 connected to the switching unit 507. The signal generator 508 is configured to generate radio frequency signals, and the radio frequency signals include the first signal and the second signal. Optionally, the signal generator may be an LO. In FIG. 25, an example in which the signal generator 508 is an LO is used for description, and LO_IN represents an input port of an external LO.

Figure 26:
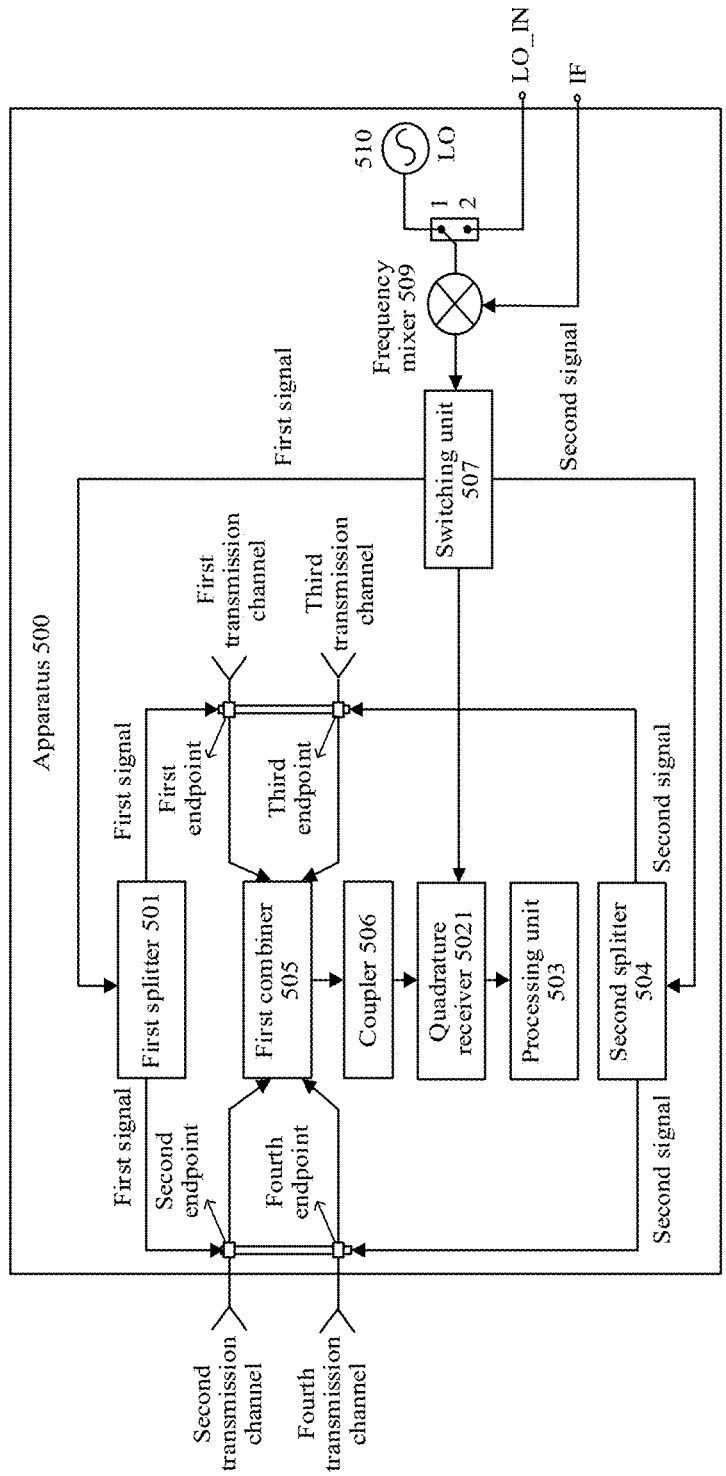
FIG. 26 is a schematic diagram depicting a structure of a twenty-first apparatus according to an embodiment of this application.

Alternatively, with reference to FIG. 24, as shown in FIG. 26, the apparatus 500 may be an intermediate frequency signal input apparatus. For example, the apparatus 500 includes an intermediate frequency chip or an intermediate frequency module, and may further include a frequency mixer 509. The frequency mixer 509 is configured to perform frequency mixing processing on an intermediate frequency signal and a correction signal, to obtain the first signal and the second signal. The correction signal may an external signal. For example, the external correction signal may be generated by an external LO. Alternatively, the apparatus further includes a signal generator 510 that is connected to the switching unit 507 through the frequency mixer 509. The signal generator 510 is configured to generate a correction signal. Optionally, the signal generator 510 may be an LO.

Figure 27:
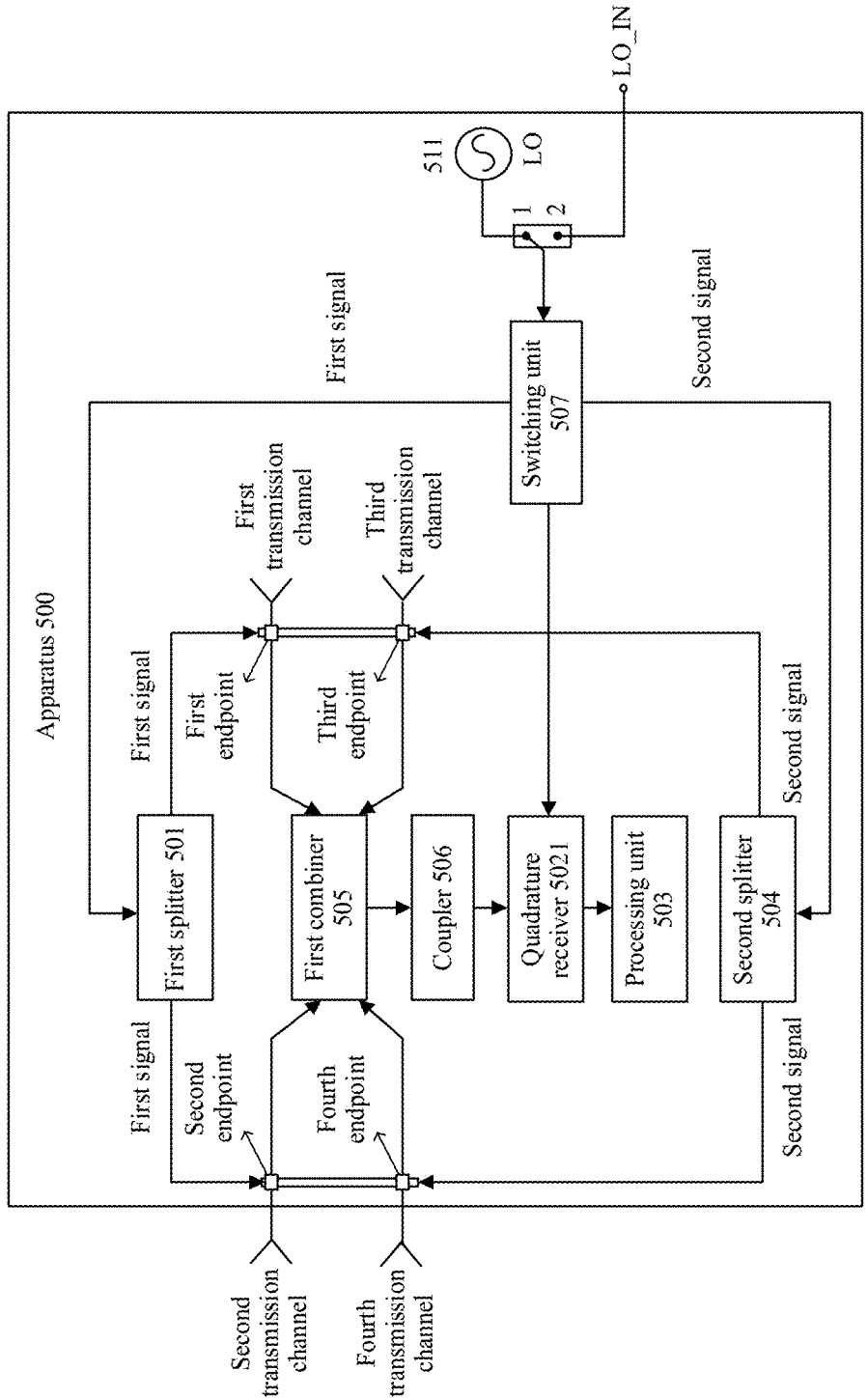
FIG. 27 is a schematic diagram depicting a structure of a twenty-second apparatus according to an embodiment of this application.

Alternatively, with reference to FIG. 24, as shown in FIG. 27, the apparatus 500 may be a baseband signal input apparatus. For example, the apparatus 500 includes a baseband chip or a baseband module. The first signal and the second signal are external signals. For example, the first signal and the second signal may be generated by an external LO. Alternatively, the apparatus further includes a signal generator 511 connected to the switching unit 507, and the signal generator 511 is configured to generate the first signal and the second signal. In FIG. 27, an example in which the signal generator 511 is an LO is used for description, and LO_IN represents an input port of an external LO.

During actual application, the baseband signal input apparatus may generally include a baseband module, an intermediate frequency module, and a radio frequency module. When the apparatus is the baseband signal input apparatus, the first signal and the second signal may be provided by the radio frequency module, the intermediate frequency module, or the baseband module. This is not limited in this embodiment of this application.

In addition, the apparatus 500 may be integrated into a semiconductor chip, and the plurality of transmission channels may also be integrated into a semiconductor chip. The apparatus 500 and the plurality of transmission channels may be integrated into a same semiconductor chip or different semiconductor chips (for example, the first transmission channel is integrated into an antenna module 1, and the second transmission channel is integrated into an antenna module 2).

Further, the apparatus 500 may be alternatively integrated into a wireless communications device. For example, the wireless communications device may be a base station or a terminal. When the wireless communications device is a base station, a semiconductor chip into which a plurality of to-be-corrected transmission channels are integrated may be located outside the wireless communications device. When the wireless communications device is a terminal, the apparatus 500 and the plurality of transmission channels may be both integrated into the terminal, and may be integrated into a same semiconductor chip or different semiconductor chips.

It should be noted that, in the apparatus 500, for a manner of calibrating the first transmission channel and the third transmission channel and a specific structure of a corresponding calibration apparatus, and for a manner of calibrating the second transmission channel and the fourth transmission channel and a specific structure of a corresponding calibration apparatus, refer to related descriptions of the manner of calibrating the first transmission channel and the second transmission channel in the apparatus 200. Details are not described herein again.

Figure 28:
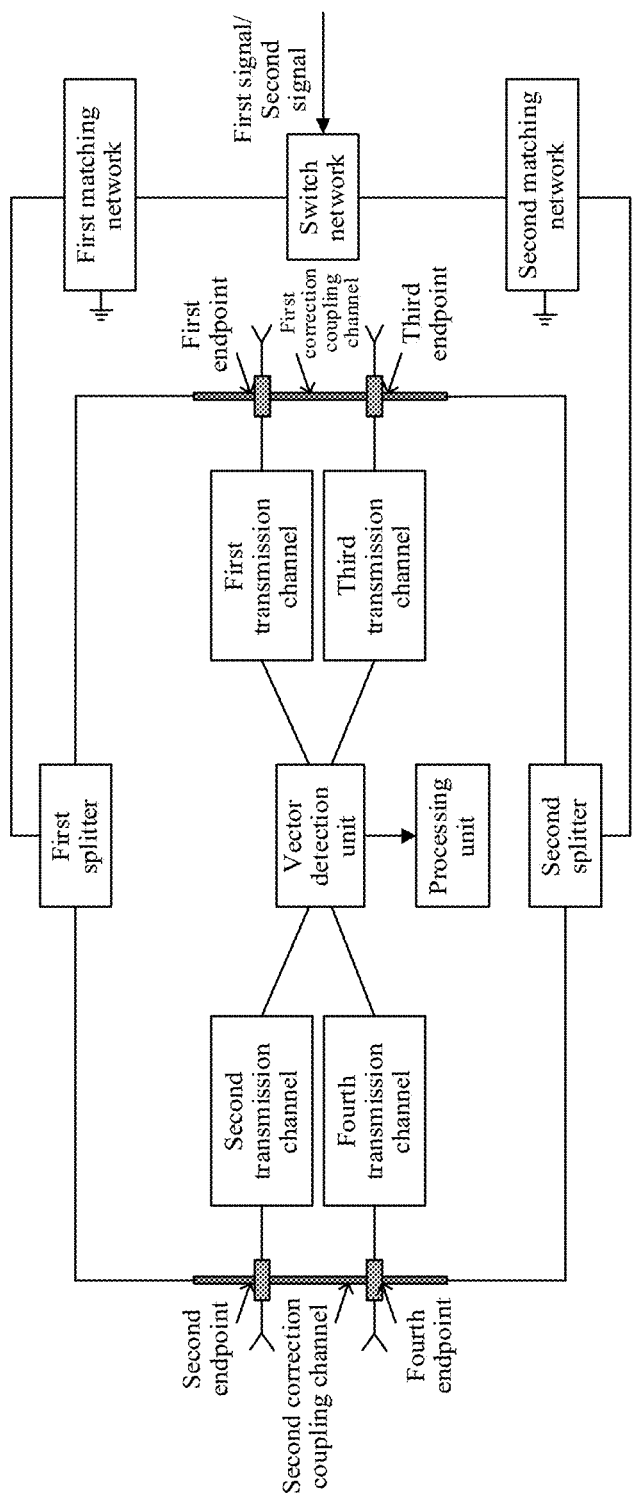
FIG. 28 is a schematic diagram depicting a structure of a twenty-third apparatus according to an embodiment of this application.

For example, an embodiment of this application further provides an apparatus for correcting a deviation between a plurality of transmission channels. The apparatus may be considered as a specific example of the apparatus 500. Refer to FIG. 28. The apparatus includes a switch network, a first matching network, a second matching network, a first splitter, a second splitter, a first correction coupling channel, a second correction coupling channel, a first transmission channel, a second transmission channel, a third transmission channel, a fourth transmission channel, a vector detection unit, and a processing unit.

A first endpoint of the first correction coupling channel is coupled to the first transmission channel, and a third endpoint of the first correction coupling channel is coupled to the third transmission channel. A second endpoint of the second correction coupling channel is coupled to the second transmission channel, and a fourth endpoint of the second correction coupling channel is coupled to the fourth transmission channel. On a signal transmission path, a first length of a coupling cable from the first splitter to the first endpoint is equal to a second length of a coupling cable from the first splitter to the second endpoint, and a third length of a coupling cable from the second splitter to the third endpoint is equal to a fourth length of a coupling cable from the second splitter to the fourth endpoint.

The apparatus shown in FIG. 28 may be configured to calibrate deviations between the first transmission channel, the second transmission channel, the third transmission channel, and the fourth transmission channel. The first transmission channel to the fourth transmission channel are all used as receive channels. An operating mode of the apparatus is controlled by the switch network. Further, through switching of the switch network, the switch network may output a first signal to the first splitter (referred to as an operating mode 1 in this embodiment of this application), or output a second signal to the second splitter (referred to as an operating mode 2 in this embodiment of this application). That is, flow directions of signals in the apparatus may be controlled by using the switch network.

In the operating mode 1, after transmitted through the switch network, the first matching network, and the first splitter, the first signal is fed onto the first correction coupling channel from the first endpoint and fed onto the second correction coupling channel from the second endpoint. A first feedback signal and a third feedback signal are output after the signal fed onto the first correction coupling channel is transmitted through the first transmission channel and the third transmission channel respectively, and a second feedback signal and a fourth feedback signal are output after the signal fed onto the second correction coupling channel is transmitted through the second transmission channel and the fourth transmission channel respectively. The vector detection unit separately obtains the four feedback signals.

In addition, a combined signal is output to the second matching network after the second splitter combines a signal output by the third endpoint of the first correction coupling channel and a signal output by the fourth endpoint of the second correction coupling channel, and flows into the reference ground via the second matching network. That is, in the operating mode 1, a circuit is broken between the switch network and the second matching network.

During specific implementation, the first signal may be generated by a signal source, and the signal source may output the first signal to the vector detection unit for being used to process feedback signals.

In the operating mode 2, after transmitted through the switch network, the second matching network, and the second splitter, the second signal is fed onto the first correction coupling channel from the third endpoint and fed onto the second correction coupling channel from the fourth endpoint. A fifth feedback signal and a seventh feedback signal are output after the signal fed onto the first correction coupling channel is transmitted through the first transmission channel and the third transmission channel respectively, and a sixth feedback signal and an eighth feedback signal are output after the signal fed onto the second correction coupling channel is transmitted through the second transmission channel and the fourth transmission channel respectively. The vector detection unit separately obtains the four feedback signals.

In addition, a combined signal is output to the first matching network after the first splitter combines a signal output by the first endpoint of the first correction coupling channel and a signal output by the second endpoint of the second correction coupling channel, and flows into the reference ground via the first matching network. That is, in the operating mode 2, a circuit is broken between the switch network and the first matching network.

During specific implementation, the second signal may be generated by a signal source, and the signal source may output the second signal to the vector detection unit for being used to process feedback signals. The second signal may be a signal same as the first signal.

In the apparatus shown in FIG. 28, the switch network, the first matching network, and the second matching network may be considered as the switching unit 507 in the apparatus 500.

In the apparatus shown in FIG. 28, a specific processing process of the vector detection unit is as follows: performing a frequency mixing operation on the first signal and the first feedback signal, a frequency mixing operation on the first signal and the second feedback signal, a frequency mixing operation on the first signal and the third feedback signal, and a frequency mixing operation on the first signal and the fourth feedback signal, to obtain a first signal vector, a second signal vector, a third signal vector, and a fourth signal vector respectively, and performing a frequency mixing operation on the second signal and the fifth feedback signal, a frequency mixing operation on the second signal and the sixth feedback signal, a frequency mixing operation on the second signal and the seventh feedback signal, and a frequency mixing operation on the second signal and the eighth feedback signal, to obtain a fifth signal vector, a sixth signal vector, a seventh signal vector, and an eighth signal vector respectively.

It is assumed that the first signal vector is $(A_1, \theta_1)$, the second signal vector is $(A_2, \theta_2)$, the third signal vector is $(A_3, \theta_3)$, the fourth signal vector is $(A_4, \theta_4)$, the fifth signal vector is $(A_5, \theta_5)$, the sixth signal vector is $(A_6, \theta_6)$, the seventh signal vector is $(A_7, \theta_7)$, and the eighth signal vector is $(A_8, \theta_8)$. In this case, the processing unit may determine an amplitude correction value $\Delta A_{13}$ between the first transmission channel and the third transmission channel based on $A_1$, $A_3$, $A_5$, and $A_7$, and determine a phase correction value $\Delta \theta_{13}$ between the first transmission channel and the third transmission channel based on $\theta_1$, $\theta_3$, $\theta_5$, and $\theta_7$. For example, the processing unit may determine $\Delta A_{13}$ according to the following Formula (7), and may determine $\Delta \theta_{13}$ according to the following Formula (8):

$$\Delta A_{13} = \frac{1}{2}(A_3 - A_1 + A_7 - A_5), \text{ and} \quad (7)$$

$$\Delta \theta_{13} = \frac{1}{2}(\theta_3 - \theta_1 + \theta_7 - \theta_5). \quad (8)$$

The processing unit may determine an amplitude correction value $\Delta A_{24}$ between the second transmission channel and the fourth transmission channel based on $A_2$, $A_4$, $A_6$, and $A_8$, and determine a phase correction value $\Delta \theta_{24}$ between the second transmission channel and the fourth transmission channel based on $\theta_2$, $\theta_4$, $\theta_6$, and $\theta_8$. For example, the processing unit may determine $\Delta A_{24}$ according to the following Formula (9), and may determine $\Delta \theta_{24}$ according to the following Formula (10):

$$\Delta A_{24} = \frac{1}{2}(A_4 - A_2 + A_8 - A_6), \text{ and} \quad (9)$$

$$\Delta \theta_{24} = \frac{1}{2}(\theta_4 - \theta_2 + \theta_8 - \theta_6). \quad (10)$$

The processing unit may determine an amplitude correction value $\Delta A_{12}$ between the first transmission channel and the second transmission channel based on $A_1$ and $A_2$, and determine a phase correction value $\Delta \theta_{12}$ between the first transmission channel and the second transmission channel based on $\theta_1$ and $\theta_2$. For example, the processing unit may determine $\Delta A_{12}$ according to the following Formula (11), and may determine $\Delta \theta_{12}$ according to the following Formula (12):

$$\Delta A_{12} = A_2 - A_1, \text{ and} \quad (11)$$

$$\Delta \theta_{12} = \theta_2 - \theta_1. \quad (12)$$

The processing unit may determine an amplitude correction value $\Delta A_{34}$ between the third transmission channel and the fourth transmission channel based on $A_3$ and $A_4$, and determine a phase correction value $\Delta \theta_{34}$ between the third transmission channel and the fourth transmission channel based on $\theta_3$ and $\theta_4$. For example, the processing unit may determine $\Delta A_{34}$ according to the following Formula (13), and may determine $\Delta \theta_{34}$ according to the following Formula (14):

$$\Delta A_{34} = A_4 - A_3, \text{ and} \quad (13)$$

$$\Delta \theta_{34} = \theta_4 - \theta_3. \quad (14)$$

It should be noted that the first correction coupling channel may be connected to one or more transmission channels in the apparatus 500, and an example in which the first correction coupling channel is connected to only two transmission channels (the first transmission channel and the third transmission channel) is used for description in the apparatus 500, and the second correction coupling channel may be connected to one or more transmission channels in the apparatus 500, and an example in which the second correction coupling channel is connected to only two transmission channels (the second transmission channel and the fourth transmission channel) is used for description in the apparatus 500.

If the first correction coupling channel and the second correction coupling channel each are further connected to more transmission channels, the apparatus 500 may be further configured to calibrate all the transmission channels connected to the first correction coupling channel and the second correction coupling channel. A specific manner is similar to the foregoing manner of calibration between the first transmission channel to the fourth transmission channel. Details are not described herein again.

Figure 29:
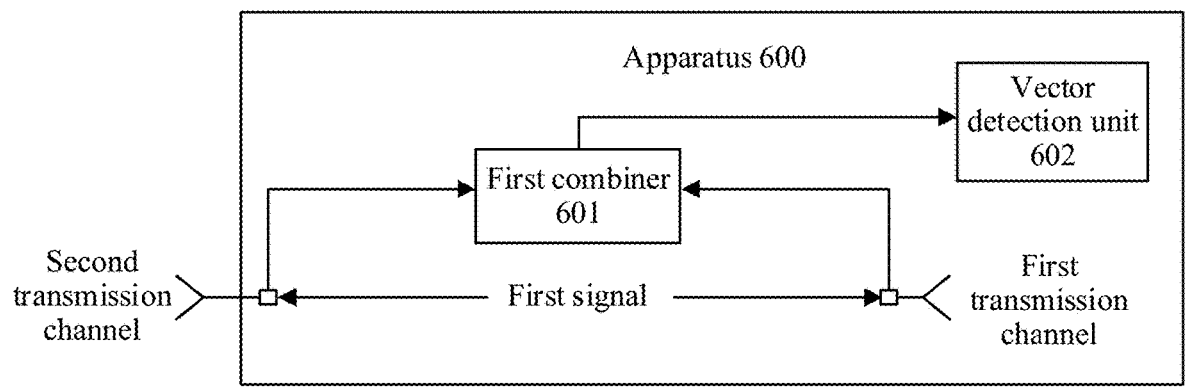
FIG. 29 is a schematic diagram depicting a structure of a twenty-fourth apparatus according to an embodiment of this application.

FIG. 29 is another apparatus for correcting a deviation between a plurality of transmission channels according to an embodiment of this application. The plurality of transmission channels includes a first transmission channel and a second transmission channel, and the first transmission channel and the second transmission channel are both transmit channels. As shown in FIG. 29, the apparatus 600 includes a first combiner 601 and a vector detection unit 602.

The first combiner 601 is configured to, when a first signal is input, output a combined signal to the vector detection unit 602 after combining a first feedback signal output by the first transmission channel and a second feedback signal output by the second transmission channel. The first combiner 601 is located in a symmetrical position between the first transmission channel and the second transmission channel.

The vector detection unit 602 is configured to detect a first signal vector based on the first feedback signal, and detect a second signal vector based on the second feedback signal. The first signal vector and the second signal vector are used to determine a first deviation correction value between the first transmission channel and the second transmission channel, and the first deviation correction value is used to correct a deviation between the first transmission channel and the second transmission channel.

The vector detection unit 602 may be a unit configured to detect a signal amplitude and/or a signal phase, where the signal amplitude and the signal phase may constitute a vector. Optionally, the vector detection unit 602 may output two component signals. The two component signals may be used to determine the signal amplitude and the signal phase. For a manner in which the vector detection unit 602 determines a signal amplitude A and a signal phase θ, refer to related descriptions of the vector detection unit 201. Details are not described herein again. In addition, similar to the vector detection unit 201, the vector detection unit 602 may detect each received feedback signal once or for a plurality of times.

Figure 30:
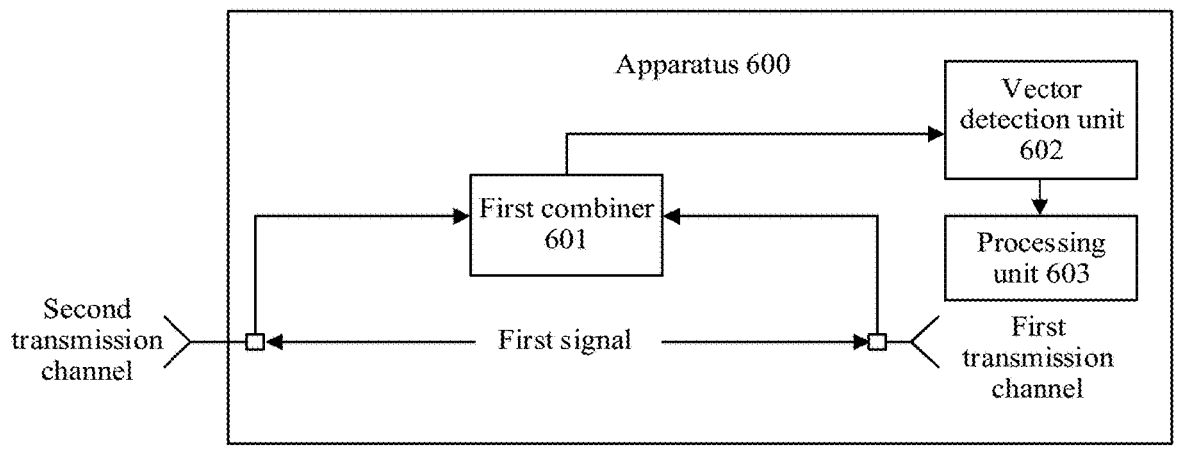
FIG. 30 is a schematic diagram depicting a structure of a twenty-fifth apparatus according to an embodiment of this application.

Further, the apparatus 600 may further include a processing unit 603, as shown in FIG. 30. The processing unit 603 is configured to determine the first deviation correction value based on the first signal vector and the second signal vector.

When each detected signal vector includes one signal vector, the processing unit 603 may determine the first deviation correction value based on one first signal vector and one second signal vector. When each detected signal vector includes a plurality of signal vectors, the processing unit 603 may determine the first deviation correction value based on a plurality of first signal vectors and a plurality of second signal vectors.

It should be noted that a manner of determining the first deviation correction value between the first transmission channel and the second transmission channel based on detected signal vectors and correcting the deviation between the first transmission channel and the second transmission channel is the same as that of determining the first deviation correction value between the first transmission channel and the second transmission channel and correcting the deviation between the first transmission channel and the second transmission channel in the embodiment shown in FIG. 19. For details, refer to descriptions in the foregoing embodiment. Details are not described herein again in this embodiment of this application.

In the apparatus 600, the description that the first combiner 601 is located in a symmetrical position between the first transmission channel and the second transmission channel may be understood as follows. Assuming that the first transmission channel corresponds to a first antenna, and the second transmission channel corresponds to a second antenna, the first combiner 601 may be located on a perpendicular bisector of a line connecting the first antenna and the second antenna, that is, the first antenna and the second antenna are symmetrically distributed on two sides of the perpendicular bisector. In addition, in this embodiment of this application, for understanding a description that another combiner/splitter is located in a symmetrical position between two transmission channels, refer to the foregoing explanation. Details are not described hereinafter.

In this embodiment of this application, when the first transmission channel and the second transmission channel are both transmit channels, the first combiner 601 located in the symmetrical position between the first transmission channel and the second transmission channel outputs the combined signal to the vector detection unit 602 after combining the first feedback signal output by the first transmission channel and the second feedback signal output by the second transmission channel. Because of the position relationship between the first combiner 601 and the two transmission channels, the first signal transmitted from the first transmission channel to the first combiner 601 and the first signal transmitted from the second transmission channel to the first combiner 601 have a same degree of attenuation. In other words, feedback signals output by the first transmission channel and the second transmission channel do not have deviations resulting from path losses. Therefore, directly determining the first deviation correction value between the first transmission channel and the second transmission channel based on detected signal vectors of feedback signals can improve accuracy of correction between receive channels.

The plurality of transmission channels further includes a first correction coupling channel and a second correction coupling channel. A first endpoint of the first correction coupling channel is connected to the first transmission channel, and a second endpoint of the second correction coupling channel is connected to the second transmission channel. The first combiner 601 is further configured to output the combined signal to the vector detection unit 602 after combining the first feedback signal output through the first endpoint and the second feedback signal output through the second endpoint.

In other words, different from the first transmission channel and the second transmission channel in the foregoing apparatus 200 and apparatus 300, the first transmission channel and the second transmission channel are not connected to one correction coupling channel, but are connected to two different correction coupling channels. In this manner, a length of the correction coupling channel can be reduced, so that a large error resulting from severe signal attenuation on a transmission cable can be avoided when two transmission channels far away from each other are calibrated.

The first combiner 601 is located in the symmetrical position between the first transmission channel and the second transmission channel. In this case, a first distance between the first endpoint and the first combiner 601 is (approximately) equal to a second distance between the second endpoint and the first combiner 601 on a transmission path of the first signal. When the first distance is (approximately) equal to the second distance, it may be considered that the first signal transmitted from the first transmission channel to the first combiner 601 and the first signal transmitted from the second transmission channel to the first combiner 601 have a same degree of attenuation.

Figure 31:
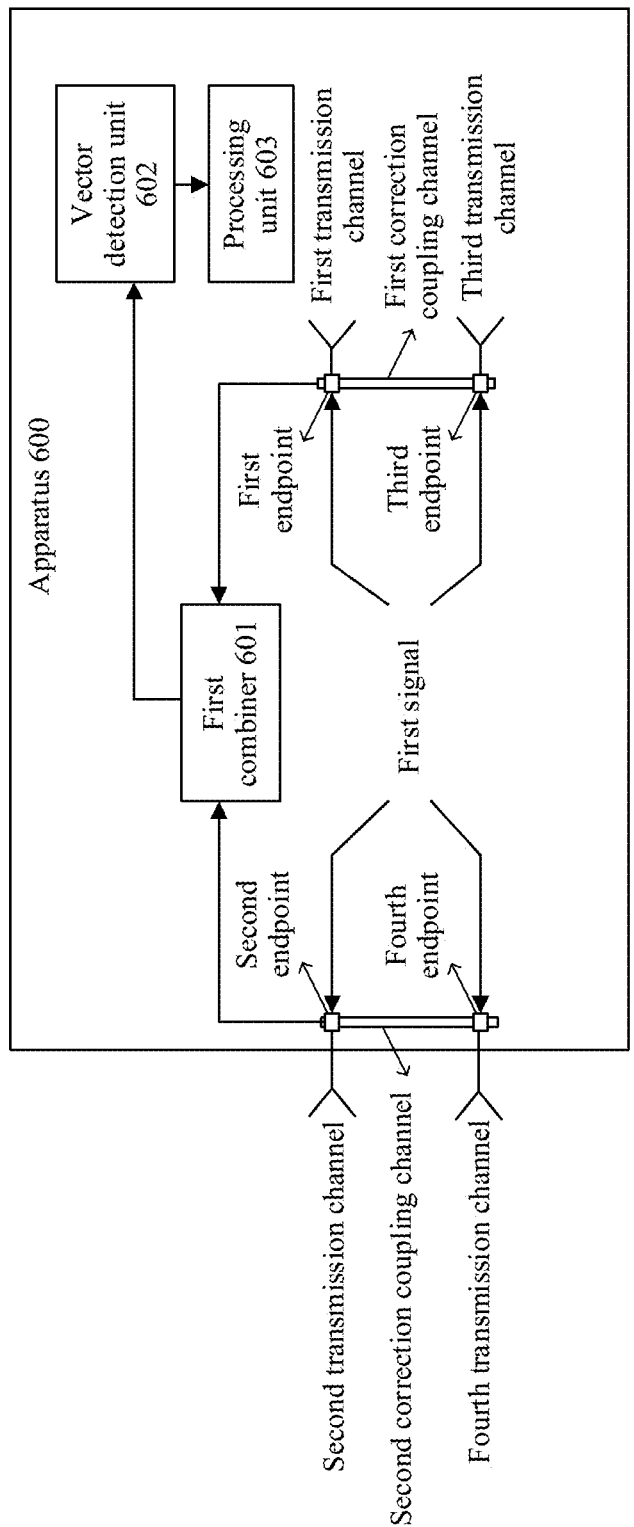
FIG. 31 is a schematic diagram depicting a structure of a twenty-sixth apparatus according to an embodiment of this application.

The plurality of transmission channels may further include a third transmission channel and a fourth transmission channel. As shown in FIG. 31, the plurality of transmission channels further includes a third transmission channel and a fourth transmission channel, a third endpoint of the first correction coupling channel is connected to the third transmission channel, and a fourth endpoint of the second correction coupling channel is connected to the fourth transmission channel. When the first signal is input, the third endpoint outputs a third feedback signal, and the fourth endpoint outputs a fourth feedback signal. The first combiner 601 is further configured to output a combined signal to the vector detection unit 602 after combining the third feedback signal output through the first endpoint and the fourth feedback signal output through the second endpoint. The first combiner 601 is also located in a symmetrical position between the third transmission channel and the fourth transmission channel.

The vector detection unit 602 is further configured to detect a third signal vector based on the third feedback signal, and detect a fourth signal vector based on the fourth feedback signal. The third signal vector and the fourth signal vector are used to determine a second deviation correction value between the third transmission channel and the fourth transmission channel, and the second deviation correction value is used to correct a deviation between the third transmission channel and the fourth transmission channel.

That is, in the apparatus 600, each correction coupling channel may be connected to a plurality of transmission channels. Because the first combiner 601 is also located in the symmetrical position between the third transmission channel and the fourth transmission channel, the third transmission channel and the fourth transmission channel may also be calibrated in the same manner of calibrating the deviation between the first transmission channel and the second transmission channel.

If the four transmission channels need to be calibrated, the apparatus 600 shown in FIG. 31 also needs to calibrate the first transmission channel and the third transmission channel, and calibrate the second transmission channel and the fourth transmission channel, in addition to calibrating the first transmission channel and the second transmission channel, and calibrating the third transmission channel and the fourth transmission channel.

Figure 32:
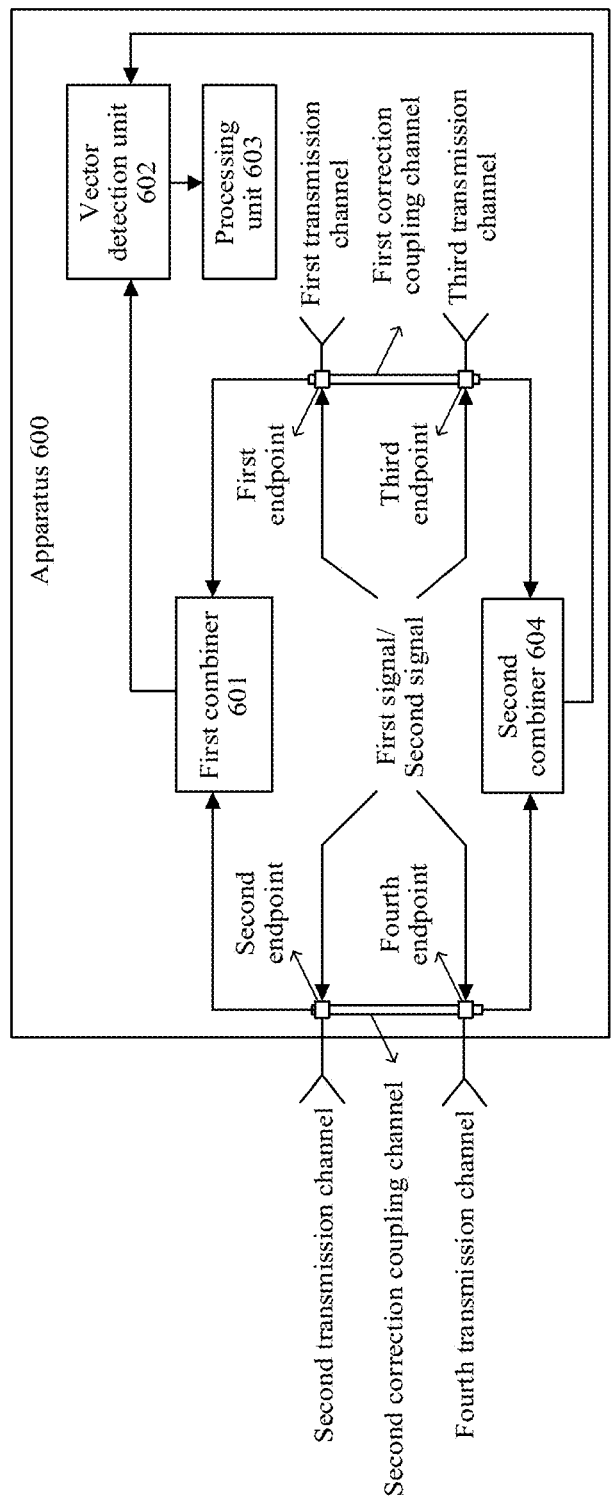
FIG. 32 is a schematic diagram depicting a structure of a twenty-seventh apparatus according to an embodiment of this application.

As shown in FIG. 32, the apparatus 600 further includes a second combiner 604. The second combiner 604 is configured to, when the second signal is input, output a combined signal to the vector detection unit 602 after combining a fifth feedback signal and a sixth feedback signal that are output through the third endpoint and combining a seventh feedback signal and an eighth feedback signal that are output through the fourth endpoint. The second combiner 604 is located in a symmetrical position between the third transmission channel and the fourth transmission channel. The fifth feedback signal, the sixth feedback signal, the seventh feedback signal, and the eighth feedback signal are signals that are output by inputting the second signal onto the first transmission channel, the second transmission channel, the third transmission channel, and the fourth transmission channel. Transmission directions of the third feedback signal and the fifth feedback signal are opposite on the first correction coupling channel. Transmission directions of the fourth feedback signal and the sixth feedback signal are opposite on the second correction coupling channel.

The vector detection unit 602 is further configured to detect a fifth signal vector based on the fifth feedback signal, detect a sixth signal vector based on the sixth feedback signal, detect a seventh signal vector based on the seventh feedback signal, and detect an eighth signal vector based on the eighth feedback signal. The first signal vector, the third signal vector, the fifth signal vector, and the seventh signal vector are used to correct a deviation between the first transmission channel and the third transmission channel. The second signal vector, the fourth signal vector, the sixth signal vector, and the eighth signal vector are used to correct a deviation between the second transmission channel and the fourth transmission channel.

Because the transmission directions of the third feedback signal and the fifth feedback signal are opposite on the first correction coupling channel, a deviation correction value between the first transmission channel and the third transmission channel may be directly obtained by cancelling a transmission deviation of the first correction coupling channel. Similarly, because the transmission directions of the fourth feedback signal and the sixth feedback signal are opposite on the second correction coupling channel, a deviation correction value between the second transmission channel and the fourth transmission channel may be directly obtained by cancelling a transmission deviation of the second correction coupling channel.

For a manner of correcting the first transmission channel and the third transmission channel by the apparatus 600, and for a manner of correcting the second transmission channel and the fourth transmission channel by the apparatus 600, refer to the manner of correcting the first transmission channel and the second transmission channel by the foregoing apparatus 300. Details are not described herein again.

Figure 33:
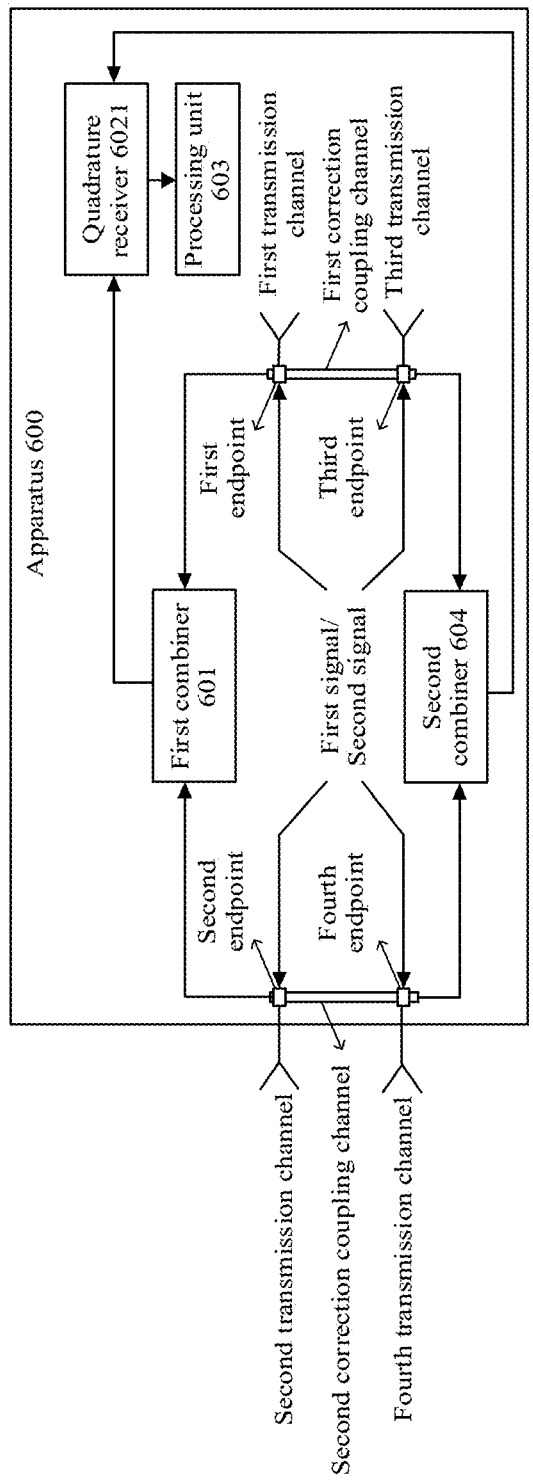
FIG. 33 is a schematic diagram depicting a structure of a twenty-eighth apparatus according to an embodiment of this application.

Further, in the apparatus 600 shown in FIG. 32, the vector detection unit 602 may include a quadrature receiver 6021. As shown in FIG. 33, the quadrature receiver 6021 is connected to both the first combiner 601 and the second combiner 604. When the first signal is input, the quadrature receiver 6021 performs frequency mixing processing on the first signal and the first feedback signal, the first signal and the second feedback signal, the first signal and the third feedback signal, and the first signal and the fourth feedback signal, to obtain the first signal vector, the second signal vector, the third signal vector, and the fourth signal vector respectively. When the second signal is input, the quadrature receiver 6021 performs frequency mixing processing on the second signal and the fifth feedback signal, the second signal and the sixth feedback signal, the second signal and the seventh feedback signal, and the second signal and the eighth feedback signal, to obtain the fifth signal vector, the sixth signal vector, the seventh signal vector, and the eighth signal vector respectively. In addition, the first combiner 601 and the second combiner 604 may be combined by using another combiner, and then connected to the quadrature receiver 6021 through a coupler.

When the first signal is input, the first transmission channel, the second transmission channel, the third transmission channel, and the fourth transmission channel may be alternately enabled (in other words, at each moment, only one transmission channel is enabled and the other transmission channels are disabled). In this case, the vector detection unit 602 may include one quadrature receiver 6021. The quadrature receiver 6021 is configured to receive, in time division mode, the first feedback signal, the second feedback signal, the third feedback signal, and the fourth feedback signal that are coupled from the first combiner 601, and perform frequency mixing processing on the first signal and each of the four feedback signals, to obtain the first signal vector, the second signal vector, the third signal vector, and the fourth signal vector respectively. Alternatively, the first transmission channel, the second transmission channel, the third transmission channel, and the fourth transmission channel may be all enabled. In this case, the vector detection unit 602 may include four quadrature receivers 6021 configured to respectively receive the first feedback signal, the second feedback signal, the third feedback signal, and the fourth feedback signal that are coupled from the first combiner 601. Each of the quadrature receivers 6021 performs frequency mixing processing on the first signal and one of the feedback signals. The first signal vector, the second signal vector, the third signal vector, and the fourth signal vector are obtained through processing by the four quadrature receivers 6021.

Similarly, when the second signal is input, the first transmission channel, the second transmission channel, the third transmission channel, and the fourth transmission channel may be alternately enabled (in other words, at each moment, only one transmission channel is enabled and the other transmission channels are disabled). In this case, the vector detection unit 602 may include one quadrature receiver 6021. The quadrature receiver 6021 is configured to receive, in time division mode, the fifth feedback signal, the sixth feedback signal, the seventh feedback signal, and the eighth feedback signal that are coupled from the second combiner 604, and perform frequency mixing processing on the second signal and each of the four feedback signals, to obtain the fifth signal vector, the sixth signal vector, the seventh signal vector, and the eighth signal vector respectively. Alternatively, the first transmission channel, the second transmission channel, the third transmission channel, and the fourth transmission channel may be all enabled. In this case, the vector detection unit 602 may include four quadrature receivers 6021 configured to receive the fifth feedback signal, the sixth feedback signal, the seventh feedback signal, and the eighth feedback signal that are coupled from the second combiner 604. Each of the quadrature receivers 6021 performs frequency mixing processing on the second signal and one of the feedback signals. The fifth signal vector, the sixth signal vector, the seventh signal vector, and the eighth signal vector are obtained through processing by the four quadrature receivers 6021.

Certainly, in this embodiment of this application, a specific form of the vector detection unit 602 is not limited to a quadrature receiver. The foregoing quadrature receiver is merely a specific example of the vector detection unit 602. In another implementation, the vector detection unit 602 may be alternatively implemented by using a PD.

Figure 34:
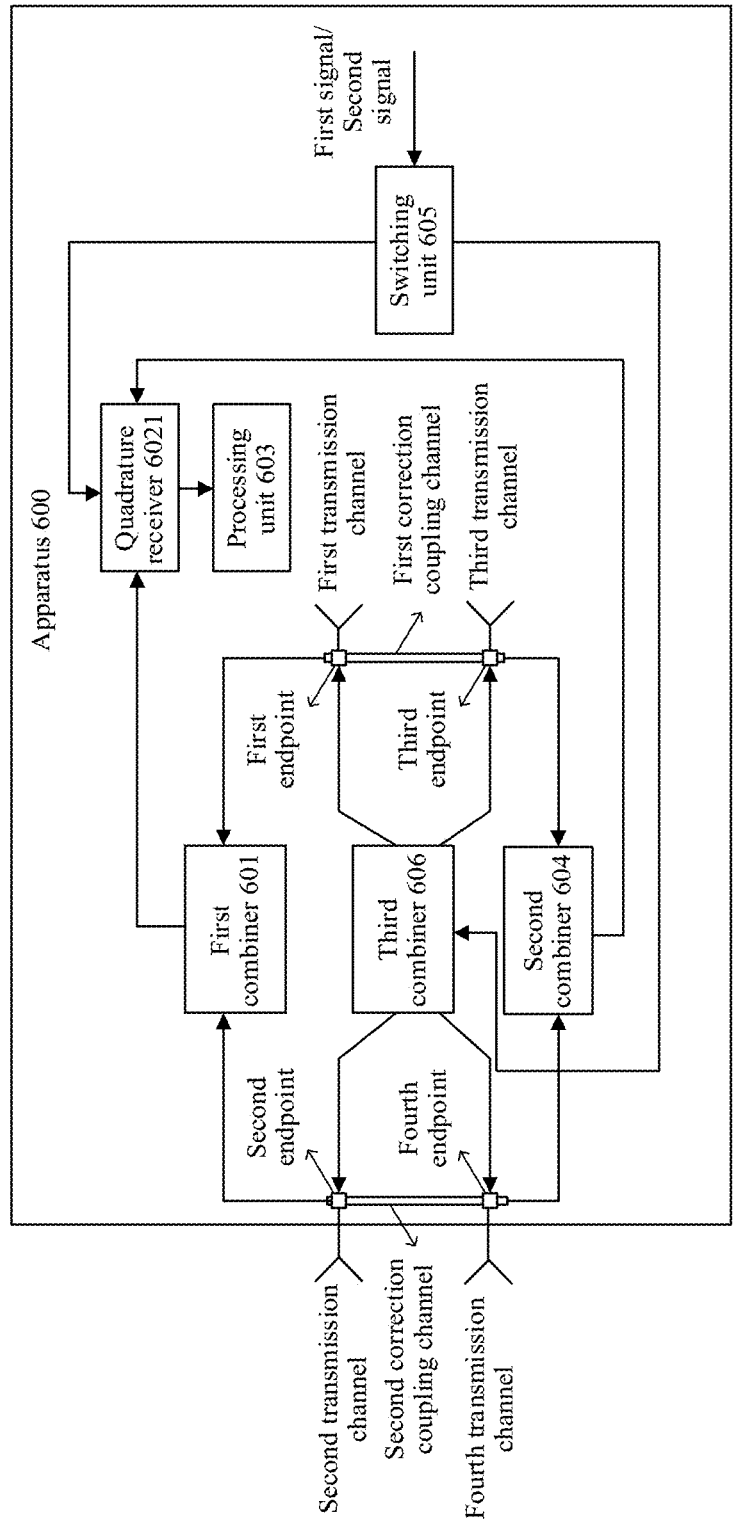
FIG. 34 is a schematic diagram depicting a structure of a twenty-ninth apparatus according to an embodiment of this application.

Further, with reference to FIG. 33, as shown in FIG. 34, the apparatus 600 may further include a switching unit 605. The switching unit 605 is configured to receive the first signal and the second signal, and output the first signal to a third combiner 606 and the quadrature receiver 6021, or output the second signal to the third combiner 606 and the quadrature receiver 6021. The first transmission channel, the second transmission channel, the third transmission channel, and the fourth transmission channel are combined by using the third combiner 606.

The switching unit 605 may input the first signal onto the four transmission channels, or input the second signal onto the four transmission channels, and further provide the first signal and the second signal to the quadrature receiver 6021 for frequency mixing processing.

The apparatus 600 may be a radio frequency signal input apparatus. For example, the apparatus 600 is a radio frequency chip or a radio frequency module. The first signal and the second signal may be external radio frequency signals. For example, the external radio frequency signals may be generated by an external LO. Alternatively, the apparatus 600 further includes a signal generator connected to the switching unit 605. The signal generator is configured to generate radio frequency signals, and the radio frequency signals include the first signal and the second signal. Optionally, the signal generator may be an LO.

Alternatively, the apparatus 600 may be an intermediate frequency signal input apparatus. For example, the apparatus 600 includes an intermediate frequency chip or an intermediate frequency module, and may further include a frequency mixer. The frequency mixer is configured to perform frequency mixing processing on an intermediate frequency signal and a correction signal, to obtain the first signal and the second signal. The correction signal may an external signal. For example, the external correction signal may be generated by an external LO. Alternatively, the apparatus 600 further includes a signal generator that is connected to the switching unit 605 through the frequency mixer. The signal generator is configured to generate a correction signal. Optionally, the signal generator may be an LO.

Alternatively, the apparatus 600 may be a baseband signal input apparatus. For example, the apparatus 600 includes a baseband chip or a baseband module. The first signal and the second signal are external signals. For example, the first signal and the second signal may be generated by an external LO. Alternatively, the apparatus 600 further includes a signal generator connected to the switching unit 605, and the signal generator is configured to generate the first signal and the second signal. Optionally, the signal generator may be an LO.

It should be noted that, when the apparatus 600 is the radio frequency signal input apparatus, the intermediate frequency signal input apparatus, or the baseband signal input apparatus, a connection relationship between the switching unit 605 and each of the signal generators is respectively consistent with that between the switching unit 507 and each of the signal generator 508, the signal generator 510, and the signal generator 511 shown in FIG. 25 to FIG. 27. For details, refer to related descriptions about FIG. 25 to FIG. 27.

In addition, the apparatus 600 may be integrated into a semiconductor chip, and the plurality of transmission channels may also be integrated into a semiconductor chip. The apparatus 600 and the plurality of transmission channels may be integrated into a same semiconductor chip or different semiconductor chips (for example, the first transmission channel is integrated into an antenna module 1, and the second transmission channel is integrated into an antenna module 2).

Further, the apparatus 600 may be alternatively integrated into a wireless communications device. For example, the wireless communications device may be a base station or a terminal. When the wireless communications device is a base station, a semiconductor chip into which a plurality of to-be-corrected transmission channels are integrated may be located outside the wireless communications device. When the wireless communications device is a terminal, the apparatus 600 and the plurality of transmission channels may be both integrated into the terminal, and may be integrated into a same semiconductor chip or different semiconductor chips.

It should be noted that, in the apparatus 600, for a manner of calibrating the first transmission channel and the third transmission channel and a specific structure of a corresponding calibration apparatus, and for a manner of calibrating the second transmission channel and the fourth transmission channel and a specific structure of a corresponding calibration apparatus, refer to related descriptions of the manner of calibrating the first transmission channel and the second transmission channel in the apparatus 300. Details are not described herein again.

Figure 35:
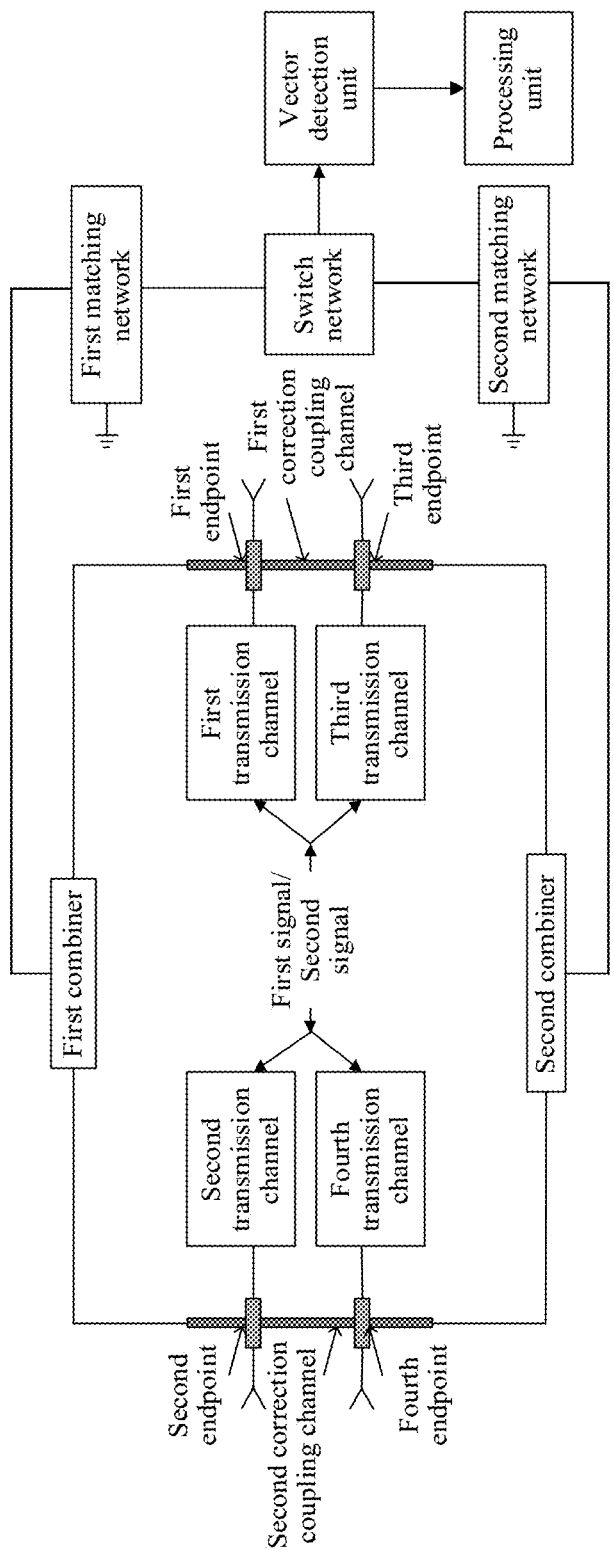
FIG. 35 is a schematic diagram depicting a structure of a thirtieth apparatus according to an embodiment of this application.

For example, an embodiment of this application further provides an apparatus for correcting a deviation between a plurality of transmission channels. The apparatus may be considered as a specific example of the apparatus 600. Refer to FIG. 35. The apparatus includes a first transmission channel, a second transmission channel, a third transmission channel, a fourth transmission channel, a first correction coupling channel, a second correction coupling channel, a first combiner, a second combiner, a first matching network, a second matching network, a switch network, a vector detection unit, and a processing unit.

A first endpoint of the first correction coupling channel is coupled to the first transmission channel, a third endpoint of the first correction coupling channel is coupled to the third transmission channel. A second endpoint of the second correction coupling channel is coupled to the second transmission channel, and a fourth endpoint of the second correction coupling channel is coupled to the fourth transmission channel. On a signal transmission path, a first length of a coupling cable from the first endpoint to the first combiner is equal to a second length of a coupling cable from the second endpoint to the first combiner, and a third length of a coupling cable from the third endpoint to the second combiner is equal to a fourth length of a coupling cable from the fourth endpoint to the second combiner.

The apparatus shown in FIG. 35 may be configured to calibrate deviations between the first transmission channel, the second transmission channel, the third transmission channel, and the fourth transmission channel. The first transmission channel to the fourth transmission channel are all used as transmit channels. An operating mode of the apparatus is controlled by the switch network. Further, through switching of the switch network, the switch network may output, to the vector detection unit, the four feedback signals obtained through transmission of a first signal on the first transmission channel to the fourth transmission channel after the first combiner (which is referred to as an operating mode 3 in this embodiment of this application), or may output a combined signal to the vector detection unit after the second combiner combines four feedback signals obtained through transmission of a second signal on the first transmission channel to the fourth transmission channel (which is referred to as an operating mode 4 in this embodiment of this application).

In the operating mode 3, the four feedback signals are output after the first signal are transmitted through the first transmission channel to the fourth transmission channel. The four feedback signals are output to the vector detection unit through the first combiner, and the vector detection unit may obtain the four feedback signals.

In addition, a signal output by the switch network further flows into the reference ground via the second matching network. That is, in the operating mode 3, a circuit is broken between the second combiner and the second matching network.

During specific implementation, the first signal may be generated by a signal source, and the signal source may output the first signal to the vector detection unit for being used to process feedback signals.

In the operating mode 4, the four feedback signals are output after the second signal are transmitted through the first transmission channel to the fourth transmission channel. The four feedback signals are output to the vector detection unit through the second combiner, and the vector detection unit may obtain the four feedback signals.

In addition, a signal output by the switch network further flows into the reference ground via the first matching network. That is, in the operating mode 4, a circuit is broken between the first combiner and the first matching network.

During specific implementation, the second signal may be generated by a signal source, and the signal source may output the second signal to the vector detection unit for being used to process feedback signals. The second signal may be a signal same as the first signal.

In the apparatus shown in FIG. 35, the switch network, the first matching network, and the second matching network may be considered as the switching unit 605 in the apparatus 600.

In the apparatus shown in FIG. 35, a specific processing process of the vector detection unit is as follows: performing a frequency mixing operation on the first signal and the first feedback signal, a frequency mixing operation on the first signal and the second feedback signal, a frequency mixing operation on the first signal and the third feedback signal, and a frequency mixing operation on the first signal and the fourth feedback signal, to obtain a first signal vector, a second signal vector, a third signal vector, and a fourth signal vector respectively, and performing a frequency mixing operation on the second signal and the fifth feedback signal, a frequency mixing operation on the second signal and the sixth feedback signal, a frequency mixing operation on the second signal and the seventh feedback signal, and a frequency mixing operation on the second signal and the eighth feedback signal, to obtain a fifth signal vector, a sixth signal vector, a seventh signal vector, and an eighth signal vector respectively.

For a specific processing process of the processing unit and formulas, refer to related descriptions in the apparatus shown in FIG. 28. Details are not described herein again.

It should be noted that the first correction coupling channel may be connected to one or more transmission channels in the apparatus 600, and an example in which the first correction coupling channel is connected to only two transmission channels (the first transmission channel and the third transmission channel) is used for description in the apparatus 600, and the second correction coupling channel may be connected to one or more transmission channels in the apparatus 600, and an example in which the second correction coupling channel is connected to only two transmission channels (the second transmission channel and the fourth transmission channel) is used for description in the apparatus 600.

If the first correction coupling channel and the second correction coupling channel each are further connected to more transmission channels, the apparatus 600 may be further configured to calibrate all the transmission channels connected to the first correction coupling channel and the second correction coupling channel. A specific manner is similar to the foregoing manner of calibration between the first correction coupling channel to the fourth transmission channel. Details are not described herein again.

During actual application, the first transmission channel and the second transmission channel may be used as transmit channels or receive channels. The first transmission channel and the second transmission channel each may be switched by using a TRX module. For a specific structure of the TRX module, refer to related descriptions about FIG. 13A and FIG. 13B. Details are not described herein again. When the TRX module is in an RX state, the first transmission channel and the second transmission channel are receive channels, or when the TRX module is in a TX state, the first transmission channel and the second transmission channel are transmit channels. Therefore, the apparatus 500 for correcting receive channels and the apparatus 600 for correcting transmit channels may be integrated as one entity.

Figure 36:
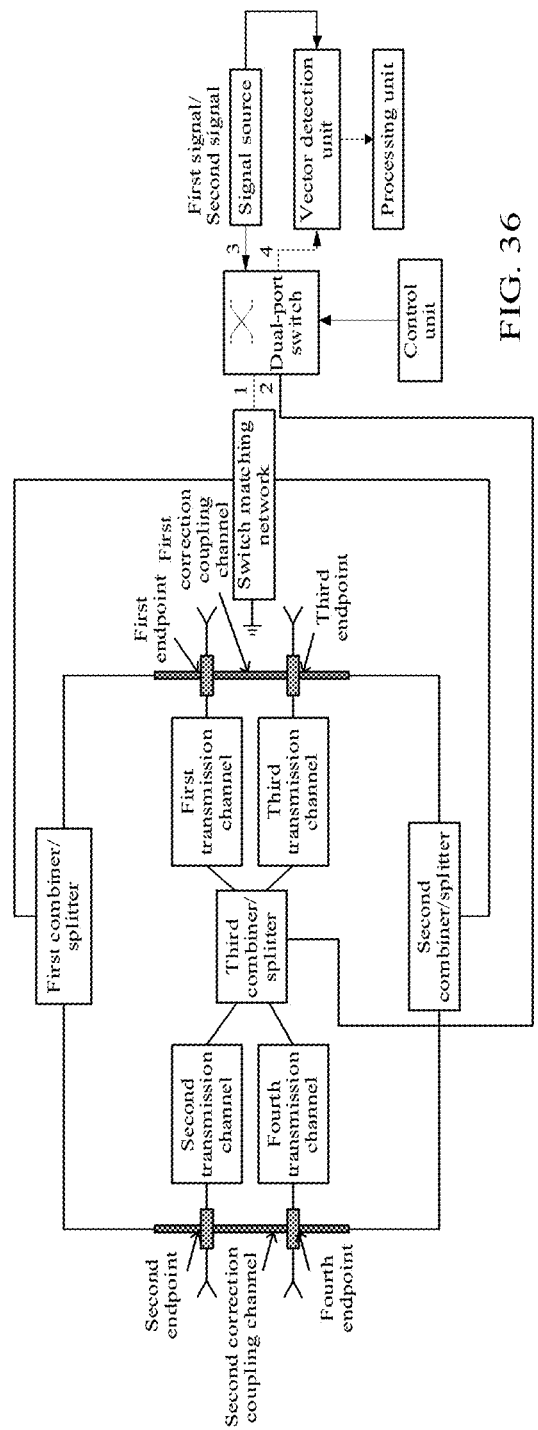
FIG. 36 is a schematic diagram depicting a structure of a thirty-first apparatus according to an embodiment of this application.

For example, if the apparatus for calibrating receive channels shown in FIG. 28 and the apparatus for calibrating transmit channels shown in FIG. 35 are integrated into one apparatus, the apparatus may be shown in FIG. 36.

A first transmission channel to a fourth transmission channel may be used as receive channels or transmit channels. The control unit controls a dual-port switch to implement receive and transmit channel calibration functions.

When receive channels are calibrated, the control unit controls a first signal/second signal input from a port 3 of the dual-port switch to be output to a switch matching network through a port 1, and the switch matching network controls the first signal to be output to a first splitter (an operating mode 1) or controls the second signal to be output to a second splitter (an operation mode 2). After the first signal/second signal is transmitted through the four transmission channels, feedback signals are output to a port 2 of the dual-port switch through a third combiner, the control unit controls the feedback signals input from the port 2 to be output to a vector detection unit through a port 4, and the vector detection unit and a processing unit perform subsequent processing on the feedback signals for calibration between the four receive channels. The switch matching network may be considered as a combination of the switch network, the first matching network, and the second matching network in FIG. 28.

When transmit channels are calibrated, the control unit controls a first signal/second signal input from a port 3 of the dual-port switch to be output to a third splitter through a port 2, and the first signal/second signal is transmitted to the four transmission channels, and the four transmission channels output four feedback signals. The switch matching network controls the four feedback signals to be output from a first combiner (an operating mode 3) or output from a second combiner (an operating mode 4). The feedback signals are output to a port 1 of the dual-port switch via the switch matching network. The control unit controls the feedback signals input from the port 1 to be output to a vector detection unit through a port 4. The vector detection unit and a processing unit perform subsequent processing on the feedback signals for calibration between the four transmit channels. The switch matching network may be considered as a combination of the switch network, the first matching network, and the second matching network in FIG. 35.

In the apparatus shown in FIG. 36, the combiner/splitter may be implemented by using a power combiner/power splitter (combiner/splitter (CS)). The switch matching network may include a CS, a switch, and the reference ground.

Figure 37:
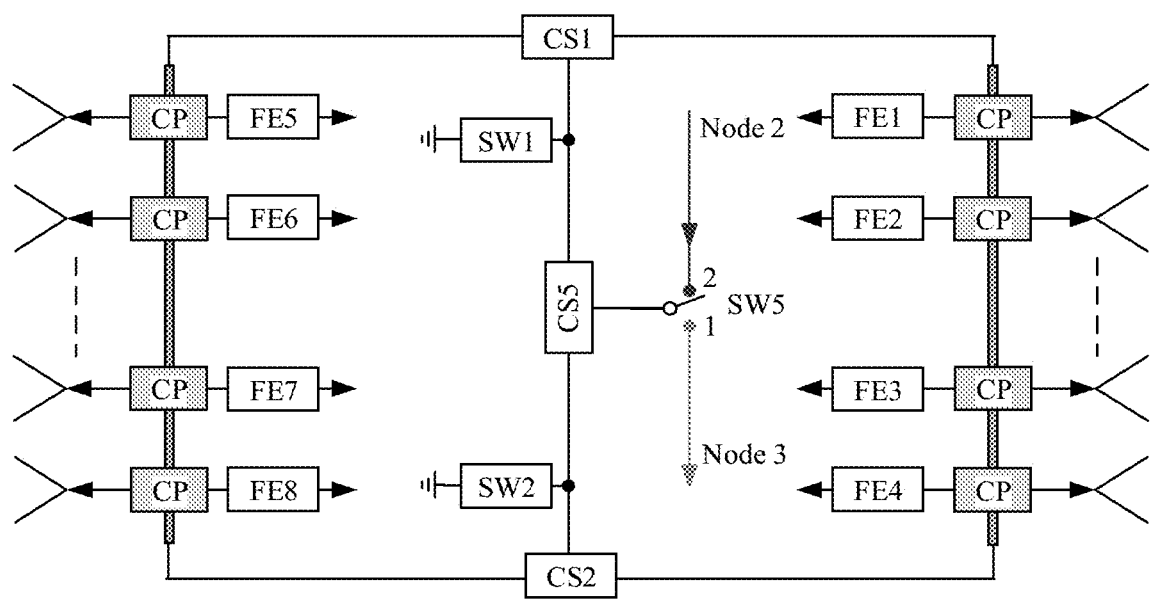
FIG. 37 is a schematic diagram depicting a structure of a thirty-second apparatus according to an embodiment of this application.

FIG. 37 shows a simplified example of the apparatus shown in FIG. 36.

When receive channels are calibrated, a switch SW1 and a switch SW2 are open alternately, and a switch SW5 is in a position 2. When the SW2 is closed, the first signal is input from a node 2 (Node 2). After transmitted through a CS5, the first signal is transmitted through a CS1 in the operating mode 1, and then is received through each enabled transmission channel (FE) through a CP. When the SW1 is closed, the second signal is input from the node 2 (Node 2). After transmitted through the CS5, the second signal is transmitted through a CS2 in the operating mode 2, and then is received through each enabled transmission channel (FE) through a CP. The vector detection unit and the processing unit may correspondingly process the feedback signals output by the transmission channels for calibration between the transmission channels.

When transmit channels are calibrated, the SW1 and the SW2 are open alternately, and the SW5 is in the position 1. When the SW2 is closed, the first signal is transmitted from an enabled transmission channel (FE), and the first signal is fed into a transmission cable through a CP, and then reaches a node 3 (Node 3) through the CS1 and the CS5. When the SW1 is closed, the second signal is transmitted from an enabled transmission channel (FE), and the second signal is fed into a transmission cable through a CP, and then reaches the node 3 through a CS2 and the CS5. The vector detection unit and the processing unit may correspondingly process feedback signals output by the node 3 (Node 3) for calibration between the transmission channels.

For the apparatus shown in FIG. 37, it may be understood as follows For transmission channels (for example, an FE1 to an FE4) connected to a same correction coupling channel, the apparatus 200 and the apparatus 300 (or an apparatus into which the apparatus 200 and the apparatus 300 are integrated) may be used for calibration. In some implementations, the apparatus 500 and the apparatus 600 may be used for calibration between transmission channels connected to a same correction coupling channel. In addition, to implement calibration between all transmission channels, the apparatus 500 and the apparatus 600 may be used (or a device integrating the apparatus 500 and the apparatus 600) for calibration between transmission channels connected to two correction coupling channels.

It may be understood that the CS1 may be considered as the first splitter in the apparatus 500, and the FE1 and an FE5 may be considered as the first transmission channel and the second transmission channel in the apparatus 500. Therefore, calibration between the FE1 and the FE5 can be implemented by using the apparatus 500. In combination with calibration between the FE1 to the FE4 and calibration between the FE5 to an FE8, calibration between the eight transmission channels FE1 to FE8 can be implemented.

It may be understood that the CS1 may be considered as the first combiner in the apparatus 600, and the FE1 and an FE5 may be considered as the first transmission channel and the second transmission channel in the apparatus 600. Therefore, calibration between the FE1 and the FE5 can be implemented by using the apparatus 600. In combination with calibration between the FE1 to the FE4 and calibration between the FE5 to an FE8, calibration between the eight transmission channels FE1 to FE8 can be implemented.

Figure 38:
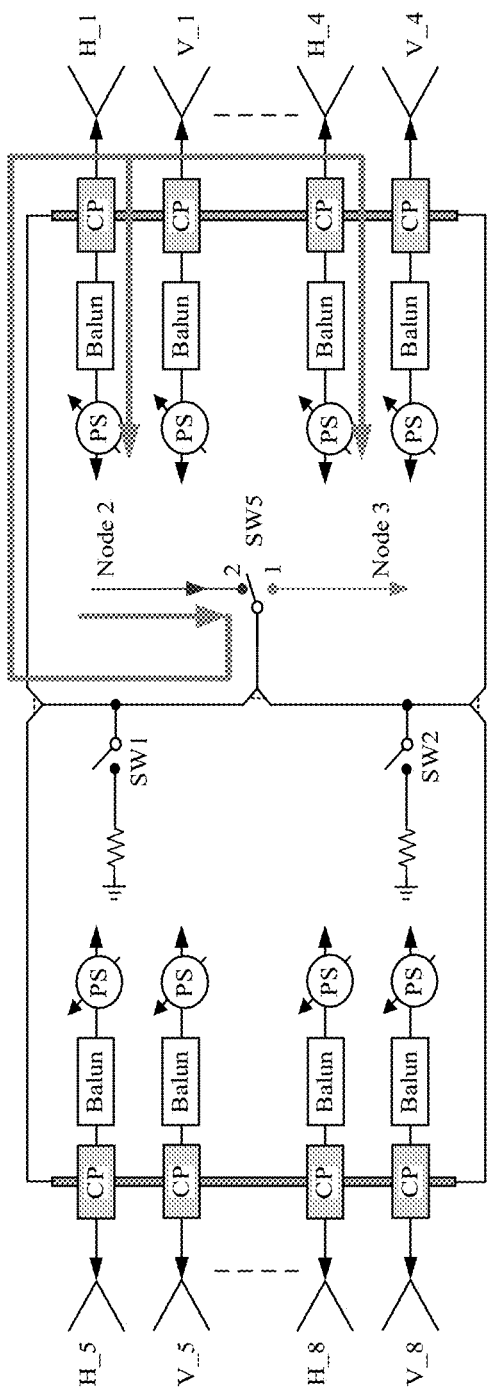
FIG. 38 is a schematic diagram depicting a structure of a thirty-third apparatus according to an embodiment of this application.

For example, if calibration is performed between the receive channel FE1 and a receive channel FE3, a flow direction of a signal in the apparatus shown in FIG. 37 may be shown in FIG. 38. With reference to the apparatus shown in FIG. 38, the transmission channels may be implemented by using the TRX module shown in FIG. 39.

Figure 39:
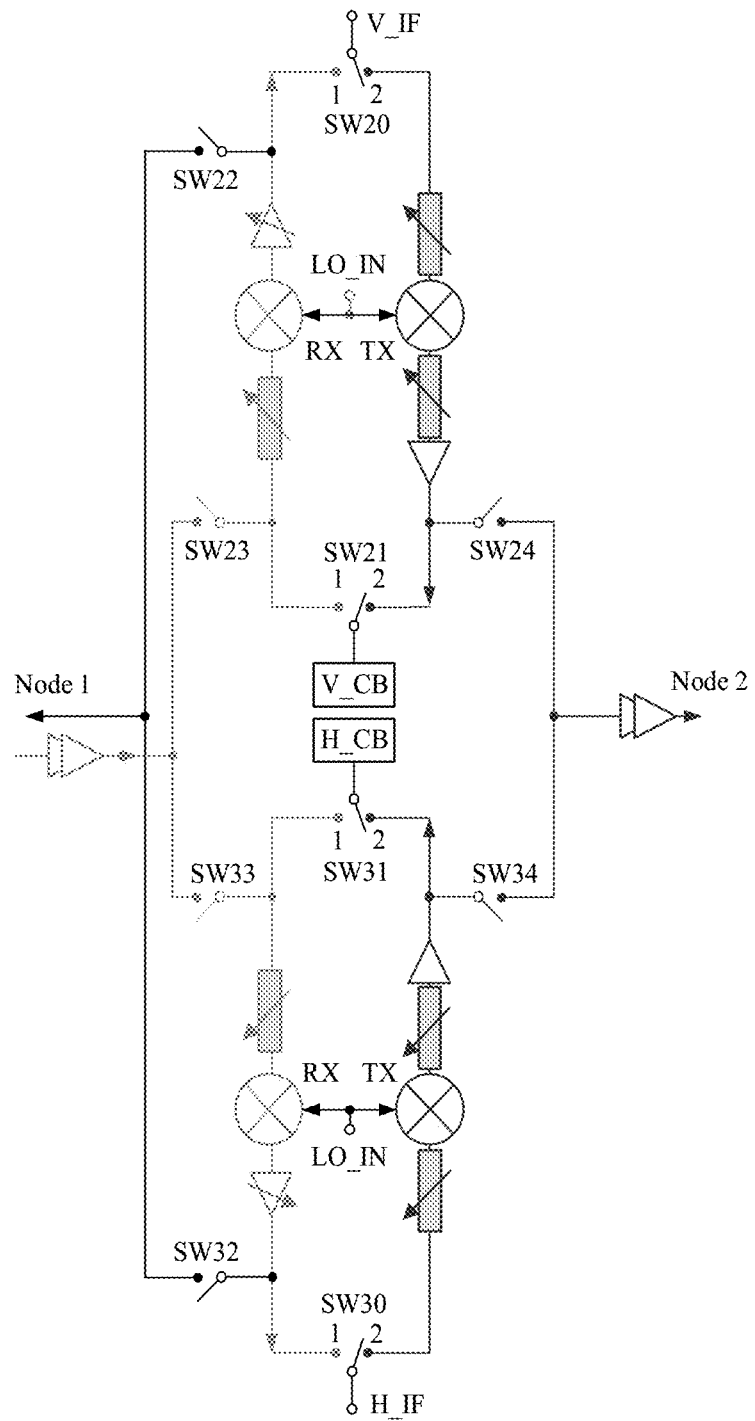
FIG. 39 is a schematic diagram depicting a structure of another TRX module according to an embodiment of this application.
Figure 40:
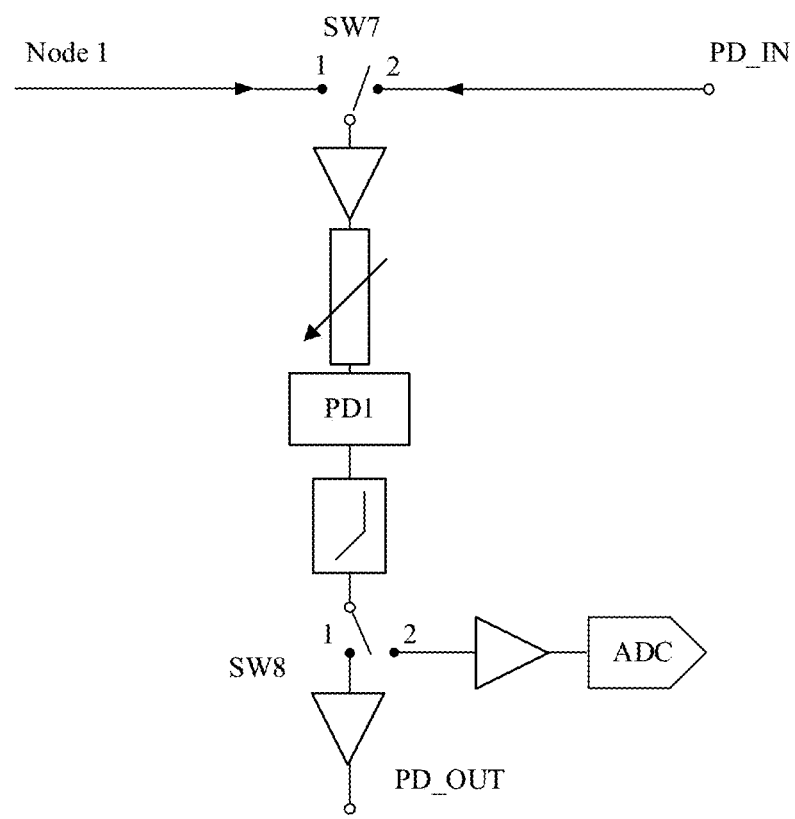
FIG. 40 is a schematic diagram depicting a structure of a vector detection unit according to an embodiment of this application.

Further, in FIG. 39, the apparatus is an intermediate frequency signal input apparatus, a SW20 and a SW30 each are in a position 2, and V_IF and H_IF may be used as sources of the first signal or the second signal. After an operation such as frequency mixing is performed on V_IF and H_IF, V_IF and H_IF are combined and output to a node 2 (Node 2) shown in FIG. 38, and then fed into enabled FEs (for example, the FE1 and the FE3) through CPs. Signals output by PSs are output to V_CB and H_CB shown in FIG. 39. A SW21 and a SW31 each are in a position 1, and a switch SW22 and a switch SW33 are closed. Therefore, feedback signals output by all FEs are input to the vector detection unit through a node 1 (Node 1) shown in FIG. 39. The vector detection unit may use the structure shown in FIG. 40. A PD1 may output, after detection, a corresponding signal vector for calibration between the FE1 and the FE3.

It can be learned from the descriptions of the apparatus 500 and the apparatus 600 that the apparatus 500 and the apparatus 600 may be used to calibrate two transmission channels for the case in which the first transmission channel and the second transmission channel are located in different antenna modules.

Similarly, in the example antenna array distribution shown in FIG. 18B, the apparatus 500 and the apparatus 600 may be used to calibrate transmission channels distributed on two sides of a chip or a PCB. Since coupling channels do not need to be laid long when the apparatus 500 or the apparatus 600 is used, errors resulting from signal attenuation can be reduced during calibration.

In addition, in the example antenna array distribution shown in FIG. 18C, calibration may also be performed by using the apparatus provided in the embodiments of this application.

Figure 41:
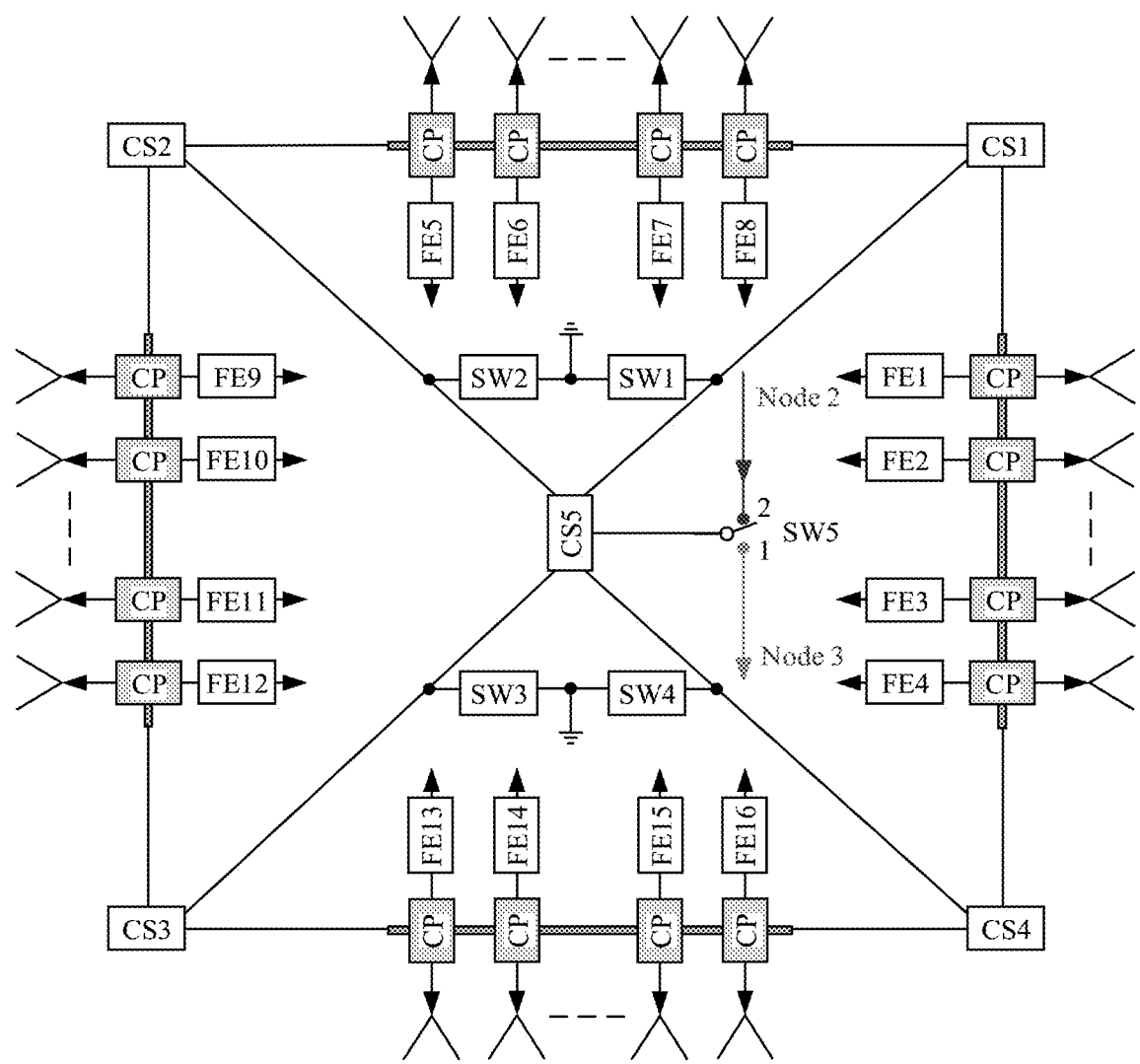
FIG. 41 is a schematic diagram depicting a structure of a thirty-fourth apparatus according to an embodiment of this application.

For example, an apparatus shown in FIG. 41 may be used to calibrate transmission channels distributed on four sides of a chip or a PCB.

When receive channels are calibrated, a switch SW1 to a switch SW4 are open alternately, and a switch SW5 is in a position 2. A first signal and a second signal are input from a node 2 (Node 2). After transmitted through a CS5, the first signal/second signal is transmitted through a CS1 to a CS4 in operating submodes alternately, and then received through each enabled transmission channel FE through a CP. The vector detection unit and the processing unit may correspondingly process feedback signals output by the transmission channels for calibration between the transmission channels.

When transmit channels are calibrated, the switch SW1 to the switch SW4 are open alternately, and the switch SW5 is in a position 1. The first signal/second signal is transmitted from each enabled transmission channel FE, where the first signal/second signal is fed into a transmission cable through a CP, and then transmitted through the CS1 to the CS4 alternately in operating submodes, and then reaches a node 3 (Node 3) through the CS5. The vector detection unit and the processing unit may correspondingly process feedback signals output by the node 3 (Node 3) for calibration between the transmission channels.

For the apparatus shown in FIG. 41, it may be understood as follows For transmission channels (for example, an FE1 to an FE4) connected to a same correction coupling channel, the apparatus 200 and the apparatus 300 may be used for calibration. In some implementations, the apparatus 500 and the apparatus 600 may be used for calibration between transmission channels connected to a same correction coupling channel. In addition, to implement calibration between all transmission channels, the apparatus 500 and the apparatus 600 may be used for calibration between transmission channels connected to two neighboring correction coupling channels.

For example, the CS1 may be considered as the first splitter in the apparatus 500, and the FE1 and an FE8 may be considered as the first transmission channel and the second transmission channel in the apparatus 500. Therefore, calibration between the FE1 and the FE8 can be implemented by using the apparatus 500. In combination with calibration between the FE1 to the FE4 and calibration between the FE5 to an FE8, calibration between the eight transmission channels FE1 to FE8 can be implemented. Similarly, calibration between 16 transmission channels FE1 to FE8 can be implemented in a similar manner.

For example, the CS1 may be considered as the first combiner in the apparatus 600, and the FE1 and the FE8 may be considered as the first transmission channel and the second transmission channel in the apparatus 600. Therefore, calibration between the FE1 and the FE8 can be implemented by using the apparatus 600. In combination with calibration between the FE1 to the FE4 and calibration between the FE5 to an FE8, calibration between the eight transmission channels FE1 to FE8 can be implemented. Similarly, calibration between 16 transmission channels FE1 to FE8 can be implemented in a similar manner.

Definitely, a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

The invention claimed is:

1. An apparatus for correcting a deviation between a plurality of transmission channels that comprises a first transmission channel and a second transmission channel, the apparatus comprising:
   a first antenna corresponding to the first transmission channel;
   a second antenna corresponding to the second transmission channel;
   a third antenna corresponding to a third transmission channel;
   a fourth antenna corresponding to a fourth transmission channel;
   a first splitter located at a symmetrical position between the first antenna and the second antenna and configured to feed a first signal onto the first antenna and the second antenna; and
   a vector detector coupled to the first splitter and configured to detect, when the first splitter feeds the first signal, a first signal vector based on a first feedback signal from the first transmission channel and a second signal vector based on a second feedback signal from the second transmission channel,
   wherein the first signal vector and the second signal vector are for determining a first deviation correction value between the first transmission channel and the second transmission channel,
   wherein the first deviation correction value is for correcting a deviation between the first transmission channel and the second transmission channel,
   wherein the transmission channels further comprise a first correction coupling channel and a second correction coupling channel, wherein a first endpoint of the first correction coupling channel is coupled to the first antenna, wherein a second endpoint of the second correction coupling channel is coupled to the second antenna, and wherein the first splitter is further configured to:
      further feed the first signal onto the first transmission channel through the first endpoint; and
      further feed the first signal onto the second transmission channel through the second endpoint;
   wherein the third antenna is coupled to a third endpoint of the first correction coupling channel,
   wherein the fourth antenna is coupled to a fourth endpoint of the second correction coupling channel,
   wherein the first correction coupling channel is configured to feed the first signal onto the third transmission channel through the third endpoint,
   wherein the second correction coupling channel is configured to feed the first signal onto the fourth transmission channel through the fourth endpoint, and
   wherein the vector detector is further configured to:
      detect a third signal vector based on a third feedback signal from the third transmission channel when the first signal is fed onto the third transmission channel; and
      detect a fourth signal vector based on a fourth feedback signal from the fourth transmission channel when the first signal is fed onto the fourth transmission channel,
   wherein the third signal vector and the fourth signal vector determine a second deviation correction value between the third transmission channel and the fourth transmission channel, and wherein the second deviation correction value is for correcting a deviation between the third transmission channel and the fourth transmission channel.

2. The apparatus of claim 1, wherein the apparatus is an intermediate frequency signal input apparatus.

3. The apparatus of claim 2, wherein a first distance between the first splitter and the first endpoint is equal to a second distance between the first splitter and the second endpoint on a transmission path of the first signal.

4. The apparatus of claim 1, further comprising a processor coupled to the vector detector and configured to determine the first deviation correction value based on the first signal vector and the second signal vector.

5. The apparatus of claim 1, further comprising:
a switch coupled to the first splitter; and
a signal generator coupled to the switch and configured to generate a correction signal.

6. The apparatus of claim 5, further comprising:
a second splitter located at a symmetrical position between the third antenna and the fourth antenna, coupled to the vector detector, and configured to:
feed a second signal onto the third transmission channel through the third endpoint; and
feed the second signal onto the fourth transmission channel through the fourth endpoint,
wherein the first correction coupling channel is configured to feed the second signal onto the first transmission channel through the first endpoint,
wherein the second correction coupling channel is configured to feed the second signal onto the second transmission channel through the second endpoint, and
wherein when the second splitter feeds the second signal, the vector detector is further configured to:
detect a fifth signal vector based on a fifth feedback signal from the first transmission channel;
detect a sixth signal vector based on a sixth feedback signal from the second transmission channel;
detect a seventh signal vector based on a seventh feedback signal from the third transmission channel; and
detect an eighth signal vector based on an eighth feedback signal from the fourth transmission channel,
wherein transmission directions of the third feedback signal and the fifth feedback signal are opposite on the first correction coupling channel,
wherein transmission directions of the fourth feedback signal and the sixth feedback signal are opposite on the second correction coupling channel,
wherein the first signal vector, the third signal vector, the fifth signal vector, and the seventh signal vector correct a deviation between the first transmission channel and the third transmission channel, and
wherein the second signal vector, the fourth signal vector, the sixth signal vector, and the eighth signal vector correct a deviation between the second transmission channel and the fourth transmission channel.

7. The apparatus of claim 6, further comprising:
a first combiner coupled to the vector detector and configured to combine signals from the first transmission channel, the second transmission channel, the third transmission channel, and the fourth transmission channel; and a coupler,
wherein the vector detector comprises a quadrature receiver coupled to the first combiner through the coupler and configured to:
when the first signal is fed into the first endpoint and the second endpoint:
perform first frequency mixing processing on the first signal and the first feedback signal to obtain the first signal vector;
perform second frequency mixing processing on the first signal and the second feedback signal to obtain the second signal vector;
perform third frequency mixing processing on the first signal and the third feedback signal to obtain the third signal vector; and
perform fourth frequency mixing processing on the first signal and the fourth feedback signal to obtain the fourth signal vector; and
when the second signal is fed into the third endpoint and the fourth endpoint:
perform fifth frequency mixing processing on the second signal and the fifth feedback signal to obtain the fifth signal vector;
perform sixth frequency mixing processing on the second signal and the sixth feedback signal to obtain the sixth signal vector;
perform seventh frequency mixing processing on the second signal and the seventh feedback signal to obtain the seventh signal vector; and
perform eighth frequency mixing processing on the second signal and the eighth feedback signal to obtain the eighth signal vector.

8. The apparatus of claim 7, wherein the switch is configured to:
receive the first signal and the second signal; and
output the first signal to the first splitter and the quadrature receiver or the second signal to the second splitter and the quadrature receiver.

9. The apparatus of claim 8, wherein the apparatus is a radio frequency (RF) signal input apparatus, and wherein the first signal and the second signal are external RF signals.

10. The apparatus of claim 8, wherein the apparatus is an intermediate frequency signal input apparatus, wherein the apparatus further comprises a frequency mixer coupled to the switch and configured to perform ninth frequency mixing processing on an intermediate frequency signal and the correction signal to obtain the first signal and the second signal, and wherein the correction signal is an external signal.

11. The apparatus of claim 8, wherein the apparatus is a baseband signal input apparatus, and wherein the first signal and the second signal are external signals.

12. The apparatus of claim 1, wherein the apparatus and the transmission channels are integrated into a same semiconductor chip.

13. A method for correcting a deviation between a plurality of transmission channels and implemented by an apparatus, the method comprising:
feeding, by a first splitter of the apparatus, a first signal onto a first antenna corresponding to a first transmission channel of the transmission channels and onto a second antenna corresponding to a second transmission channel of the transmission channels, wherein the first splitter is located at a symmetrical position between the first antenna and the second antenna; and
detecting, by a vector detector coupled to the first splitter and when the first splitter feeds the first signal, a first signal vector based on a first feedback signal from the first transmission channel and a second signal vector based on a second feedback signal from the second transmission channel, wherein the first signal vector and the second signal vector are for determining a first deviation correction value between the first transmission channel and the second transmission channel, and wherein the first deviation correction value is for correcting a deviation between the first transmission channel and the second transmission channel;

feeding, by a first correction coupling channel of the transmission channels, the first signal onto a third transmission channel through a third endpoint of the first correction coupling channel;

feeding, by a second correction coupling channel of the transmission channels, the first signal onto a fourth transmission channel through a fourth endpoint of the second correction coupling channel;

detecting, by the vector detector, a third signal vector based on a third feedback signal from the third transmission channel when the first signal is fed onto the third transmission channel; and detecting, by the vector detector, a fourth signal vector based on a fourth feedback signal from the fourth transmission channel when the first signal is fed onto the fourth transmission channel, wherein the third signal vector and the fourth signal vector are for determining a second deviation correction value between the third transmission channel and the fourth transmission channel, and wherein the second deviation correction value is for correcting a deviation between the third transmission channel and the fourth transmission channel.

14. The method of claim 13, further comprising:
further feeding, by the first splitter, the first signal onto the first transmission channel through a first endpoint of the first correction coupling channel of the transmission channels, wherein the first endpoint is coupled to the first antenna; and
further feeding, by the first splitter, the first signal onto the second transmission channel through a second endpoint of the second correction coupling channel of the transmission channels, wherein the second endpoint is coupled to the second antenna.

15. The method of claim 14, wherein a first distance between the first splitter and the first endpoint is equal to a second distance between the first splitter and the second endpoint on a transmission path of the first signal.

16. The method of claim 13, further comprising generating, using a signal generator coupled to a switch, a correction signal.

17. The method of claim 13, further comprising determining the first deviation correction value based on the first signal vector and the second signal vector.

18. The apparatus of claim 8, wherein the signal generator is configured to generate radio frequency (RF) signals, wherein the RF signals comprise the first signal and the second signal.

19. The apparatus of claim 8, wherein the apparatus is an intermediate frequency signal input apparatus and further comprises a frequency mixer coupled to the switch and configured to perform ninth frequency mixing processing on an intermediate frequency signal and the correction signal to obtain the first signal and the second signal.

20. The apparatus of claim 8, wherein the signal generator is further configured to generate the first signal and the second signal.

* * * * *